United States Patent
Combs

(10) Patent No.: US 10,331,454 B2
(45) Date of Patent: Jun. 25, 2019

(54) SYSTEM AND METHOD FOR LOAD BALANCING IN OUT-OF-ORDER CLUSTERED DECODING

(71) Applicant: Intel Corporation, Santa Clara, CA (US)

(72) Inventor: Jonathan D. Combs, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 15/280,460

(22) Filed: Sep. 29, 2016

(65) Prior Publication Data

US 2018/0088956 A1 Mar. 29, 2018

(51) Int. Cl.
G06F 9/38 (2018.01)

(52) U.S. Cl.
CPC .......... *G06F 9/3802* (2013.01); *G06F 9/3822* (2013.01); *G06F 9/3836* (2013.01)

(58) Field of Classification Search
CPC .................................................... G06F 9/3855
See application file for complete search history.

(56) References Cited

U.S. PATENT DOCUMENTS

| 5,870,578 | A * | 2/1999 | Mahalingaiah | G06F 9/3836 |
| | | | | 712/210 |
| 2012/0036340 | A1* | 2/2012 | Chaussade | G06F 9/30145 |
| | | | | 712/228 |
| 2012/0089812 | A1* | 4/2012 | Smith | G06F 9/4843 |
| | | | | 712/21 |
| 2013/0205118 | A1* | 8/2013 | Buyuktosunoglu | G06F 9/3844 |
| | | | | 712/206 |
| 2015/0324239 | A1* | 11/2015 | Venkumahanti | G06F 9/30098 |
| | | | | 718/104 |

OTHER PUBLICATIONS

Intel Corporation, "IA-32 Intel® Architecture Software Developer's Manual—vol. 2: Instruction Set Reference", 978 pages, 2003.
PCT International Search Report and Written Opinion in PCT Application Serial No. PCT/US2017/049335 dated Sep. 20, 2018 (15 pages).

* cited by examiner

*Primary Examiner* — Andrew Caldwell
*Assistant Examiner* — Michael J Metzger
(74) *Attorney, Agent, or Firm* — Alliance IP, LLC

(57) ABSTRACT

A processor includes a back end to execute decoded instructions and a front end. The front end includes two decode clusters and circuitry to receive data elements representing undecoded instructions, in program order, and to direct subsets of the data elements to the decode clusters. An IP generator directs one subset of data elements to the first cluster, detects a condition indicating that a load balancing action should be taken, and directs a subset of data elements immediately following the first subset in program order to the first or second decode cluster dependent on the action taken. The action may include annotating a BTB entry, inserting a fake branch in the BTB, forcing a cluster switch, or suppressing a cluster switch. The detected condition may be a predicated taken branch or an annotation thereof, or a heuristic based on a queue state, a count of uops, or a latency value.

17 Claims, 34 Drawing Sheets

FIG. 3B

```
 127   120 119   112 111   104 103              24 23   16 15   8 7      0
| bbbb bbbb | bbbb bbbb | bbbb bbbb |  •  •  •  | bbbb bbbb | bbbb bbbb | bbbb bbbb |
```
UNSIGNED PACKED BYTE REPRESENTATION 344

```
 127   120 119   112 111   104 103              24 23   16 15   8 7      0
| sbbb bbbb | sbbb bbbb | sbbb bbbb |  •  •  •  | sbbb bbbb | sbbb bbbb | sbbb bbbb |
```
SIGNED PACKED BYTE REPRESENTATION 345

```
 127              112 111                                    16 15       0
| wwww wwww wwww wwww |        •  •  •        | wwww wwww wwww wwww |
```
UNSIGNED PACKED WORD REPRESENTATION 346

```
 127              112 111                                    16 15       0
| swww wwww wwww wwww |        •  •  •        | swww wwww wwww wwww |
```
SIGNED PACKED WORD REPRESENTATION 347

```
 127                              92 91   32 31                          0
| dddd dddd dddd dddd dddd dddd dddd dddd |•••| dddd dddd dddd dddd dddd dddd dddd dddd |
```
UNSIGNED PACKED DOUBLEWORD REPRESENTATION 348

```
 127                              92 91   32 31                          0
| sddd dddd dddd dddd dddd dddd dddd dddd |•••| sddd dddd dddd dddd dddd dddd dddd dddd |
```
SIGNED PACKED DOUBLEWORD REPRESENTATION 349

FIG. 3C

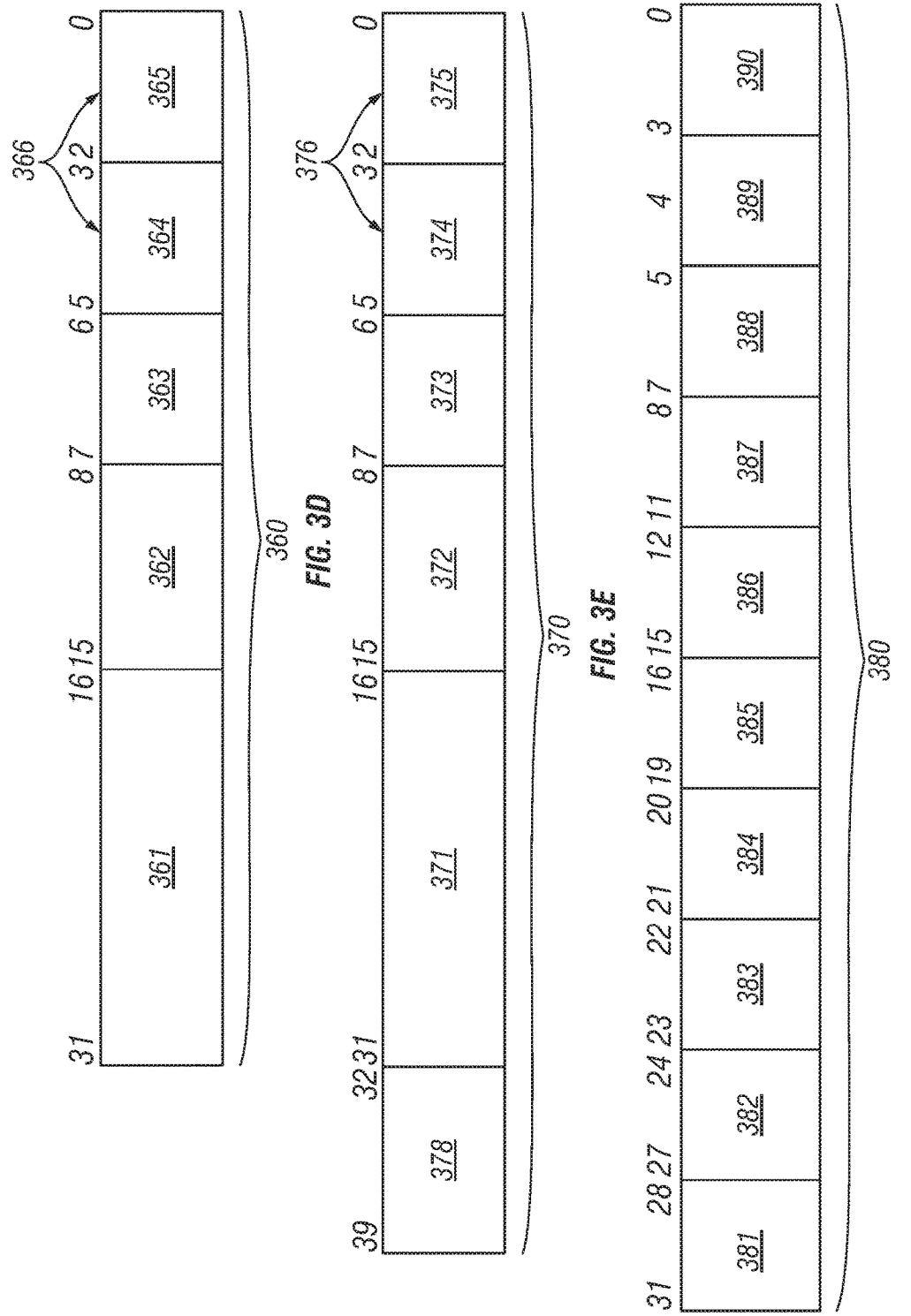

2500

| 2510 | 2520 | 2530 | 2540 |
|---|---|---|---|
| BRANCH ADDR. A | TARGET ADDR. A | HIGH | REAL |
| BRANCH ADDR. B | TARGET ADDR. B | LOW | REAL |
| BRANCH ADDR. C | NEXT ADDR. C | HIGH | FAKE |
| ... | ... | ... | ... |
| BRANCH ADDR. D | TARGET ADDR. D | LOW | REAL |
| BRANCH ADDR. E | NEXT ADDR. E | MEDIUM | FAKE |

*FIG. 25*

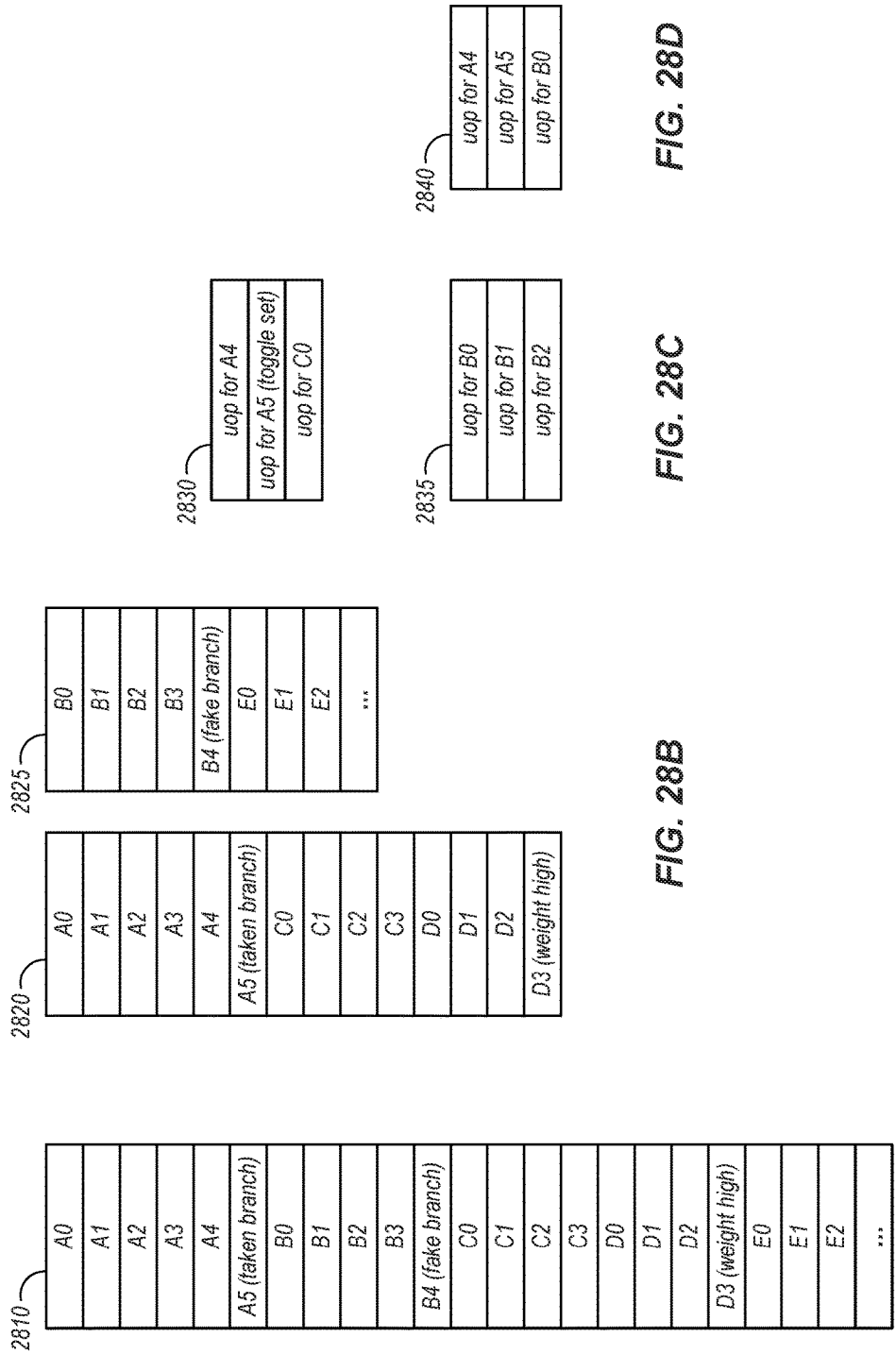

SYSTEM AND METHOD FOR LOAD BALANCING IN OUT-OF-ORDER CLUSTERED DECODING

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another. Pipelining of applications may be implemented in systems in order to more efficiently execute applications. Instructions as they are received on a processor may be decoded into terms or instruction words that are native, or more native, for execution on the processor. Processors may be implemented in a system on chip.

DESCRIPTION OF THE FIGURES

Embodiments are illustrated by way of example and not limitation in the Figures of the accompanying drawings:

FIG. 3B illustrates possible in-register data storage formats, in accordance with embodiments of the present disclosure;

FIG. 3C illustrates various signed and unsigned packed data type representations in multimedia registers, in accordance with embodiments of the present disclosure;

FIG. 3D illustrates an embodiment of an operation encoding format;

FIG. 3E illustrates another possible operation encoding format having forty or more bits, in accordance with embodiments of the present disclosure;

FIG. 3F illustrates yet another possible operation encoding format, in accordance with embodiments of the present disclosure;

FIG. 25 is an illustration of an example branch target buffer in which entries are annotated with information usable to trigger a load balancing action between decode clusters, according to embodiments of the present disclosure;

FIGS. 28A-28D illustrate an example of the application of out-of-order clustered decoding with load balancing, according to embodiments of the present disclosure.

DETAILED DESCRIPTION

Figure 1A:
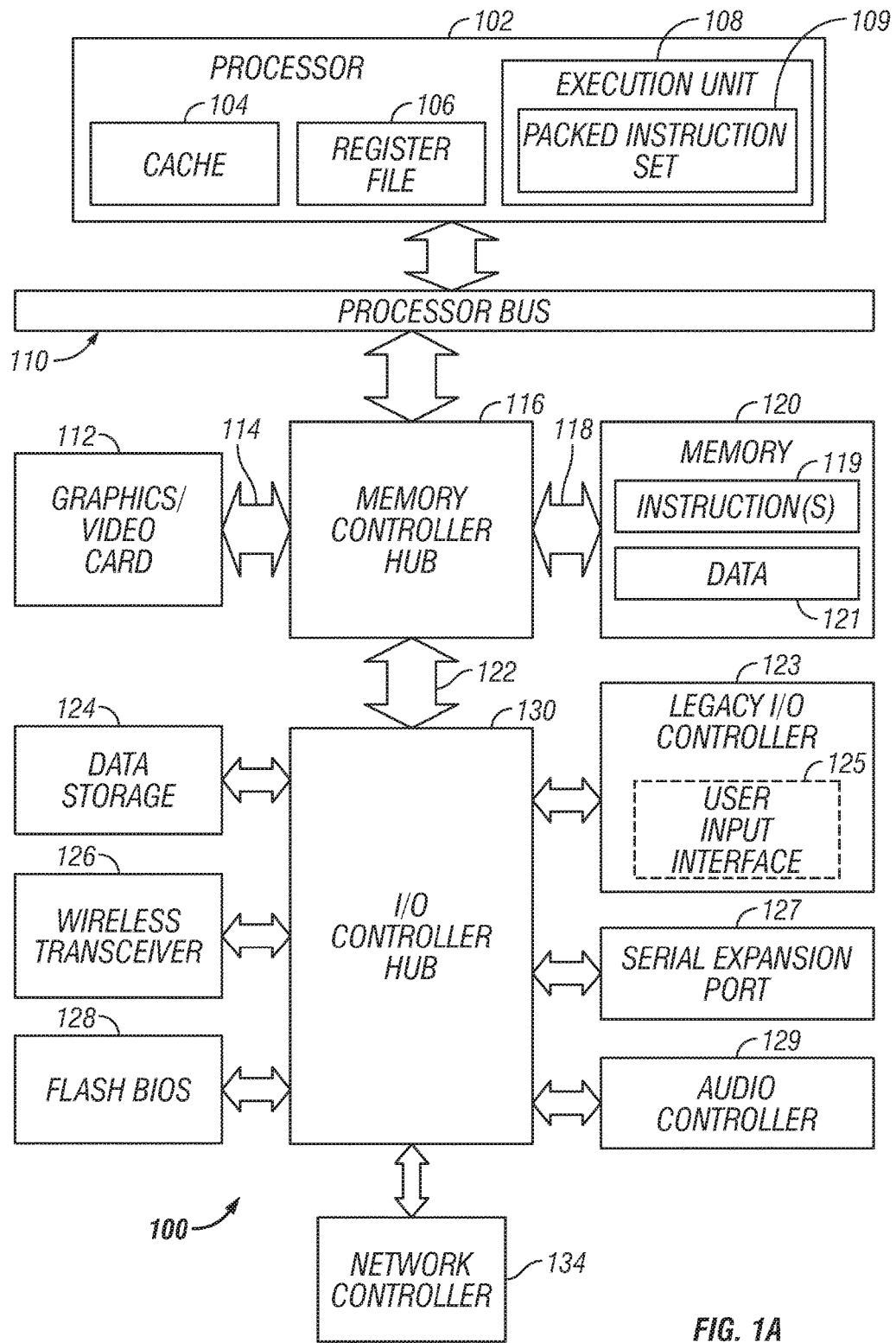
FIG. 1A is a block diagram of an exemplary computer system formed with a processor that may include execution units to execute an instruction, in accordance with embodiments of the present disclosure.

The following description describes a processing apparatus and processing logic for load balancing in out-of-order clustered decoding. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the operations of the present disclosure. Some embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, operations of embodiments of the present disclosure might be performed by specific hardware components that contain fixed-function logic for performing the operations, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file). In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MIIVIX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used.

Thus, embodiments of the present disclosure are not limited to any specific combination of hardware circuitry and software.

Embodiments are not limited to computer systems. Some embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions 119 and/or data 121 represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for storage of instructions 119 and data 121 and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller 129, firmware hub (flash BIOS) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
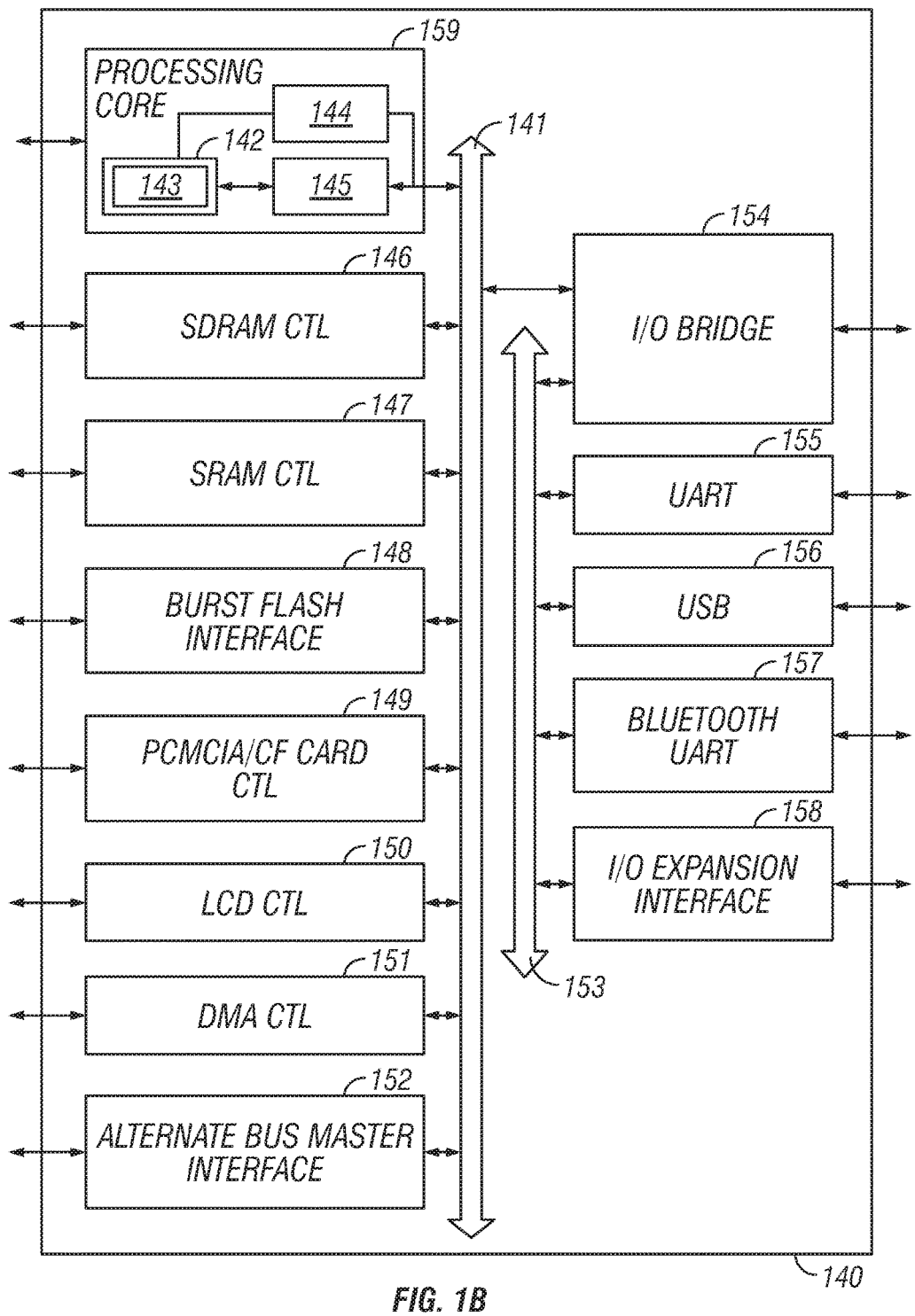
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
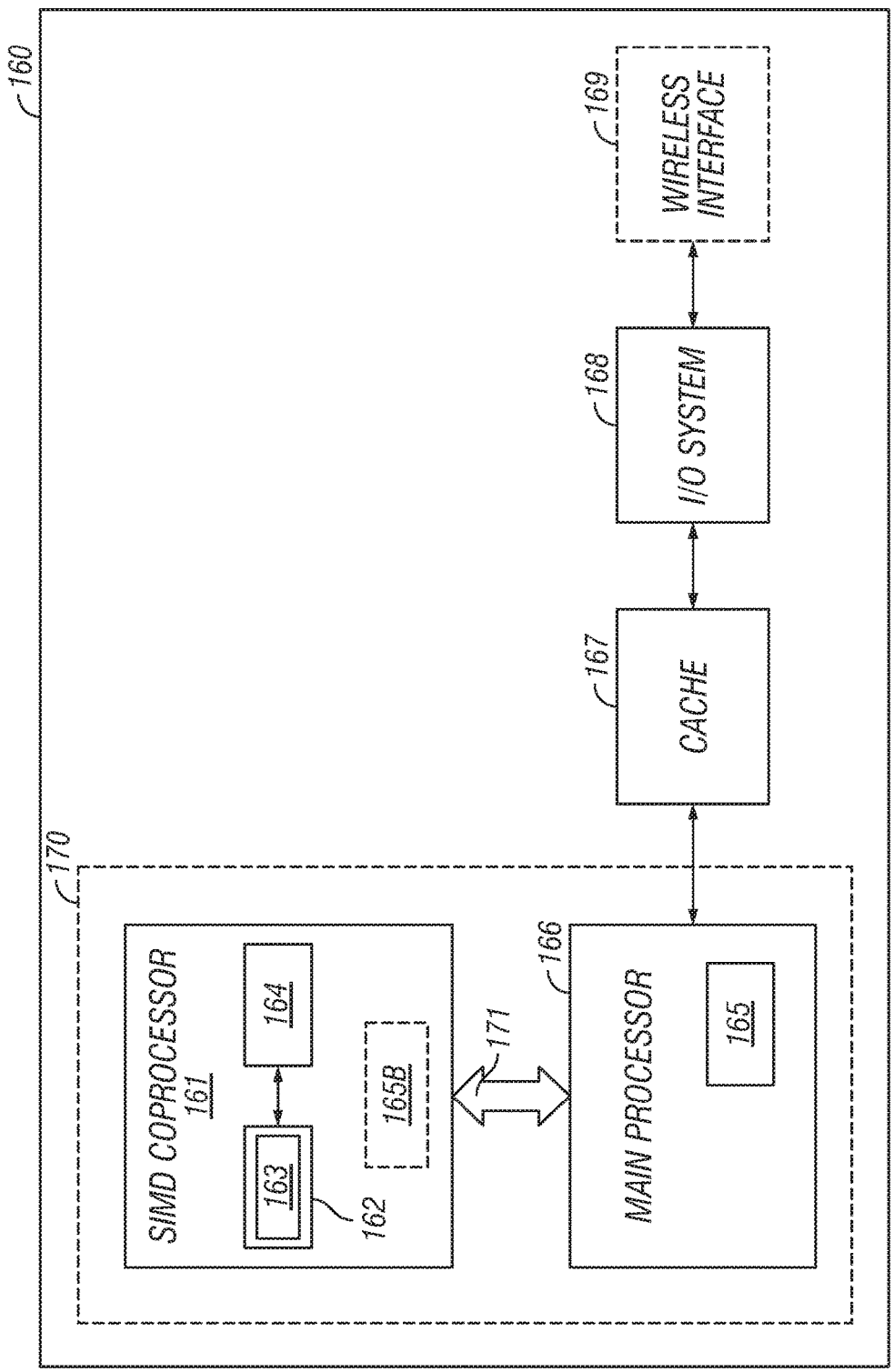
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 171. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
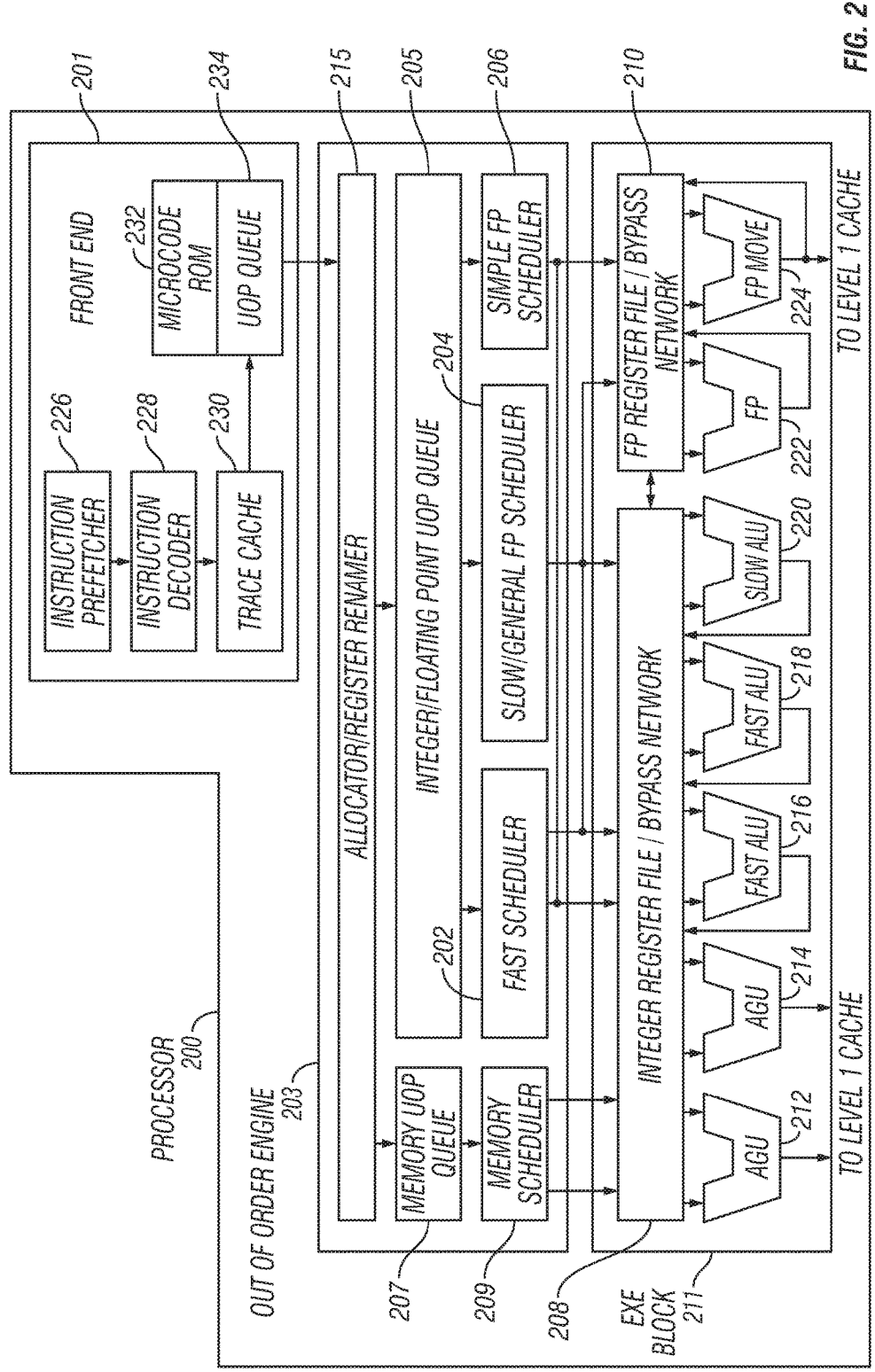
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic in allocator/register renamer 215 allocates the machine buffers and resources that each uop needs in order to execute. The register renaming logic in allocator/register renamer 215 renames logic registers onto entries in a register file. The allocator 215 also allocates an entry for each uop in one of the two uop queues, one for memory operations (memory uop queue 207) and one for non-memory operations (integer/floating point uop queue 205), in front of the instruction schedulers: memory scheduler 209, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MA/IX' registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point data may be contained in the same register file or different register files. Furthermore, in one embodiment, floating point and integer data may be stored in different registers or the same registers.

Figure 3A:
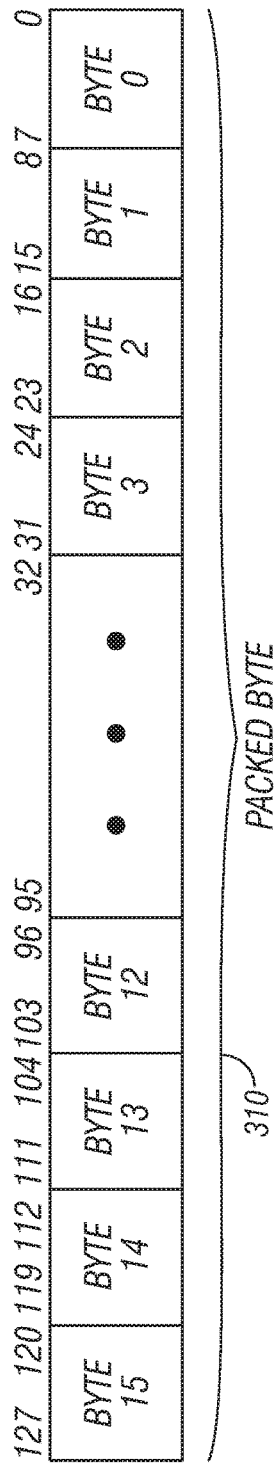
FIG. 3A illustrates various packed data type representations in multimedia registers, in accordance with embodiments of the present disclosure.
Figure 3A:
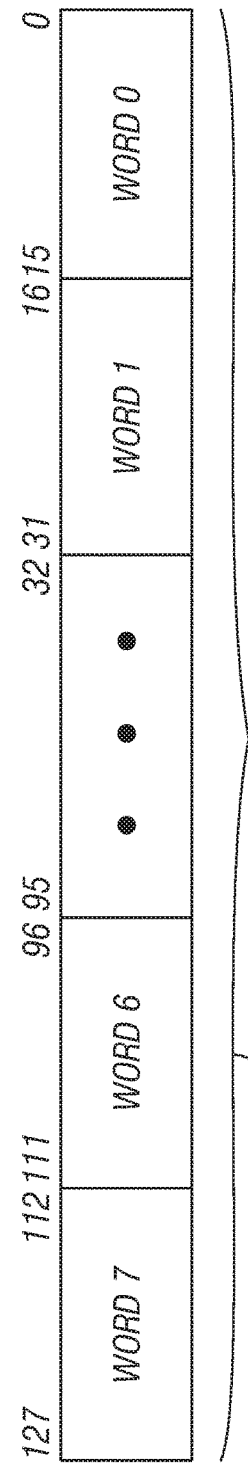
Figure 3A:
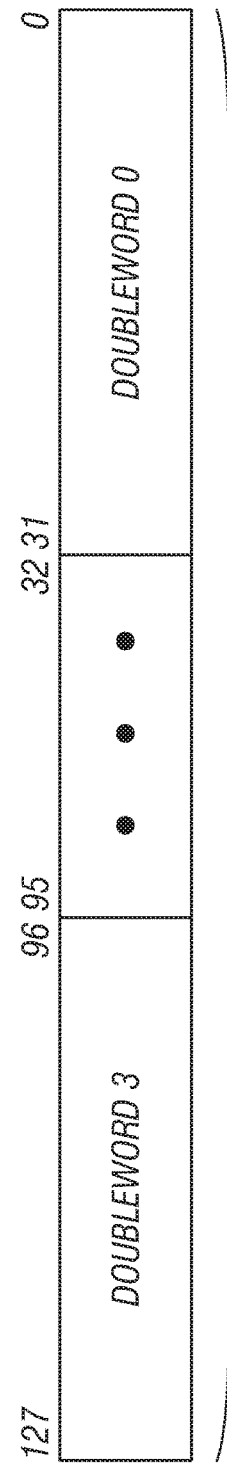

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

Figure 3B:
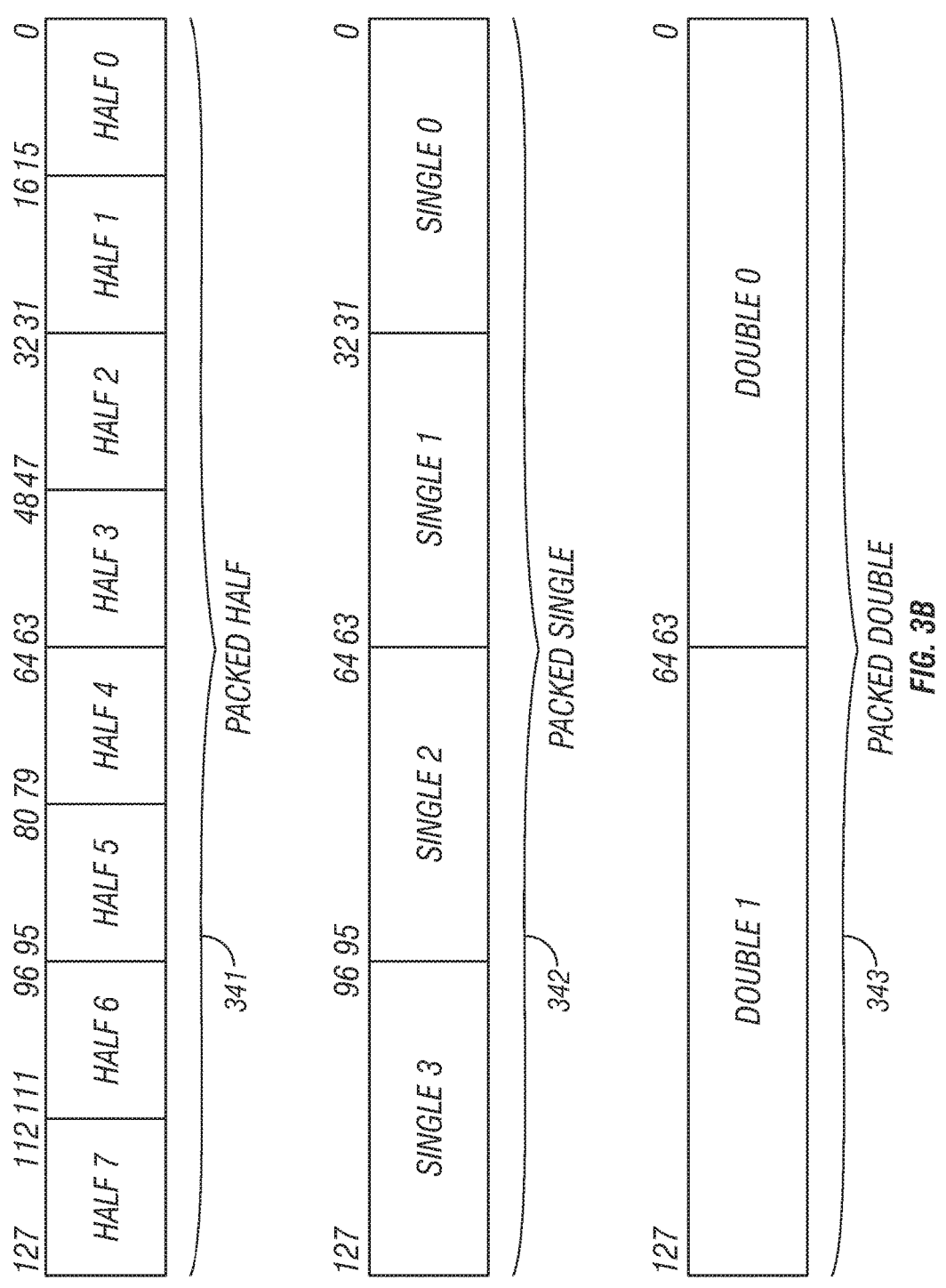

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel-.com/design/litcentr. In one embodiment, an instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

Figure 4A:
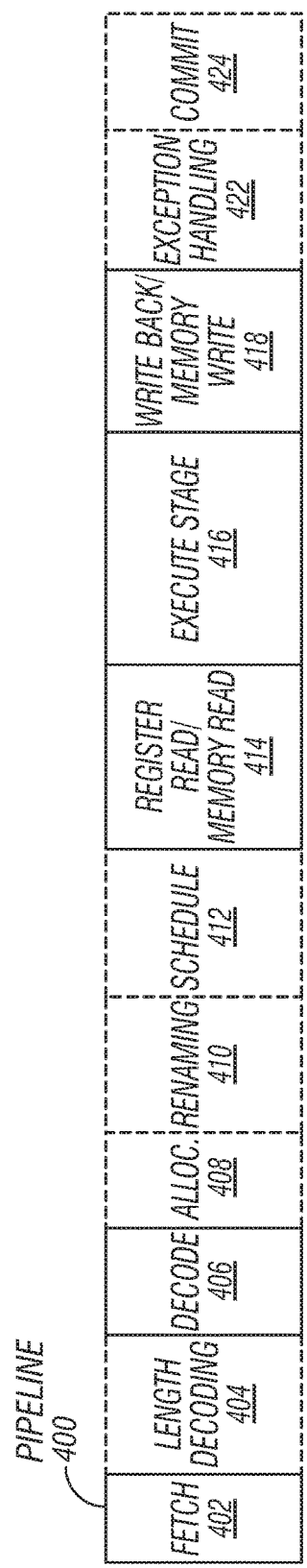
FIG. 4A is a block diagram illustrating an in-order pipeline and a register renaming stage, out-of-order issue/execution pipeline, in accordance with embodiments of the present disclosure.
Figure 4B:
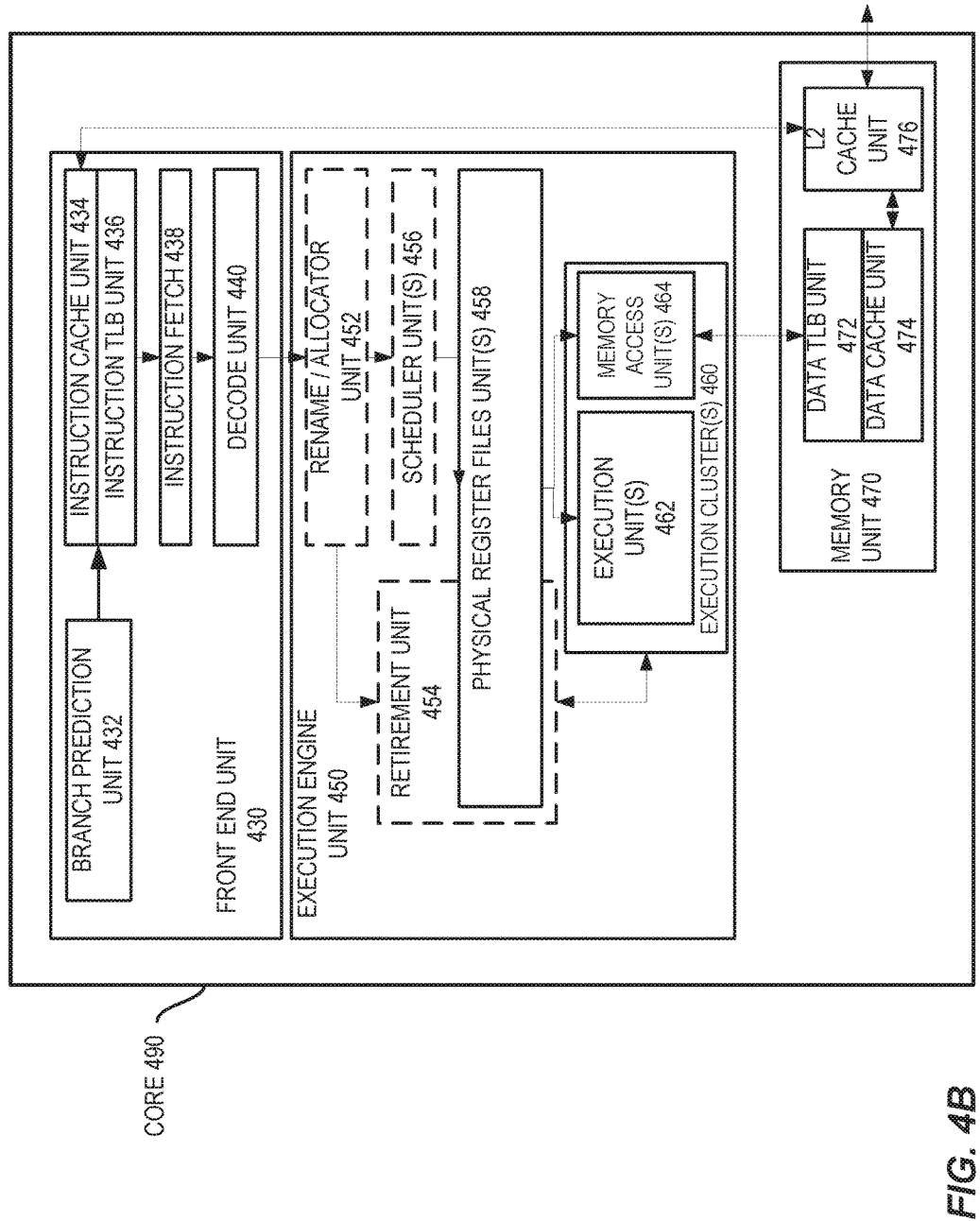
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a writeback/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 454 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 462 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory. While FIG. 4B illustrates an embodiment in which instruction cache unit 434, data cache unit 474, and level 2 (L2) cache unit 476 reside within core 490, in other embodiments one or more caches or cache units may be internal to a core, external to a core, or apportioned internal to and external to a core in different combinations.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the caches may be external to the core and/or the processor.

Figure 5A:
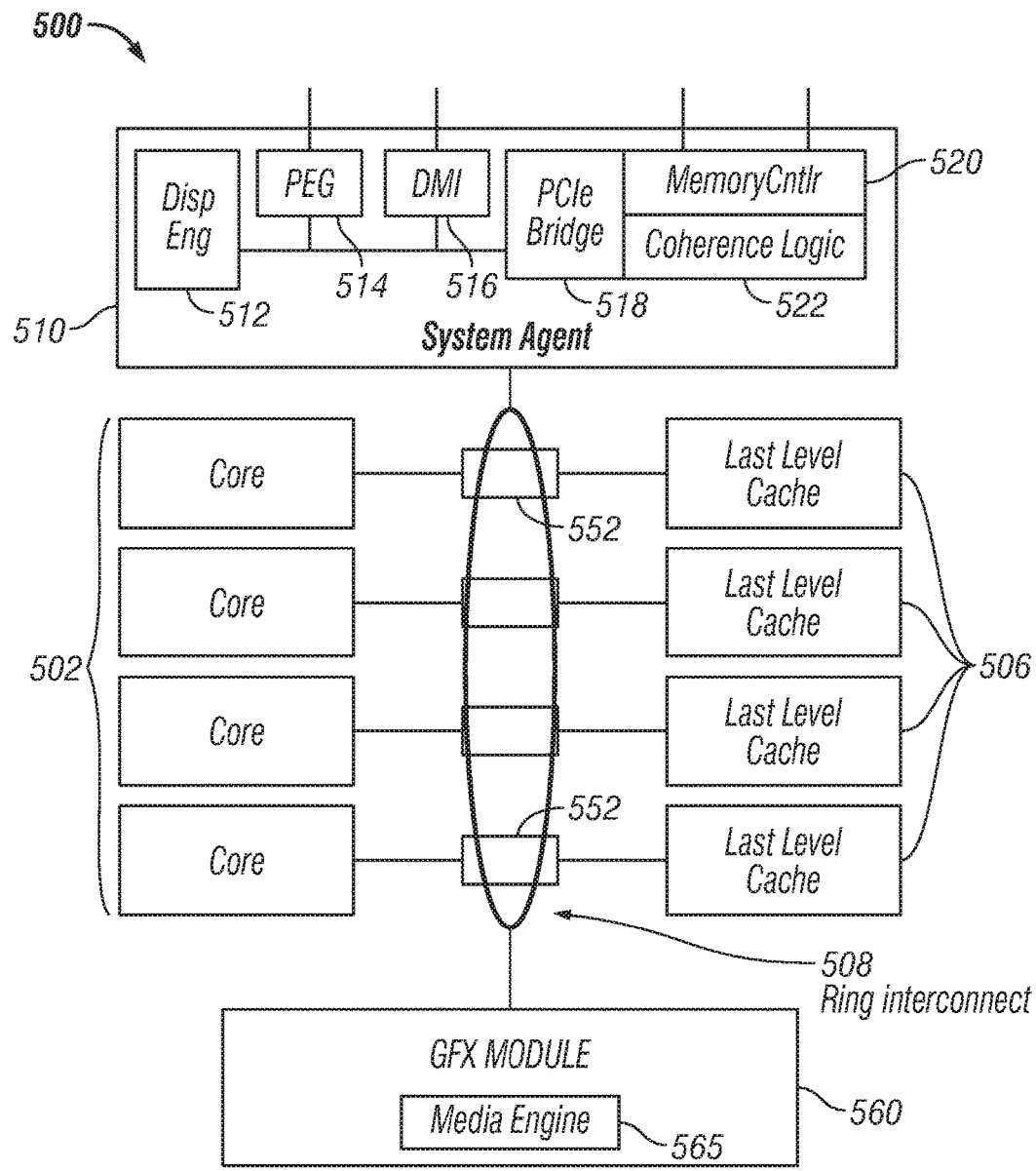
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface 514 for communications busses for graphics. In one embodiment, interface 514 may be implemented by PCI Express (PCIe). In a further embodiment, interface 514 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 518 for providing PCIe links to other elements of a computing system. PCIe bridge 518 may be implemented using a memory controller 520 and coherence logic 522.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
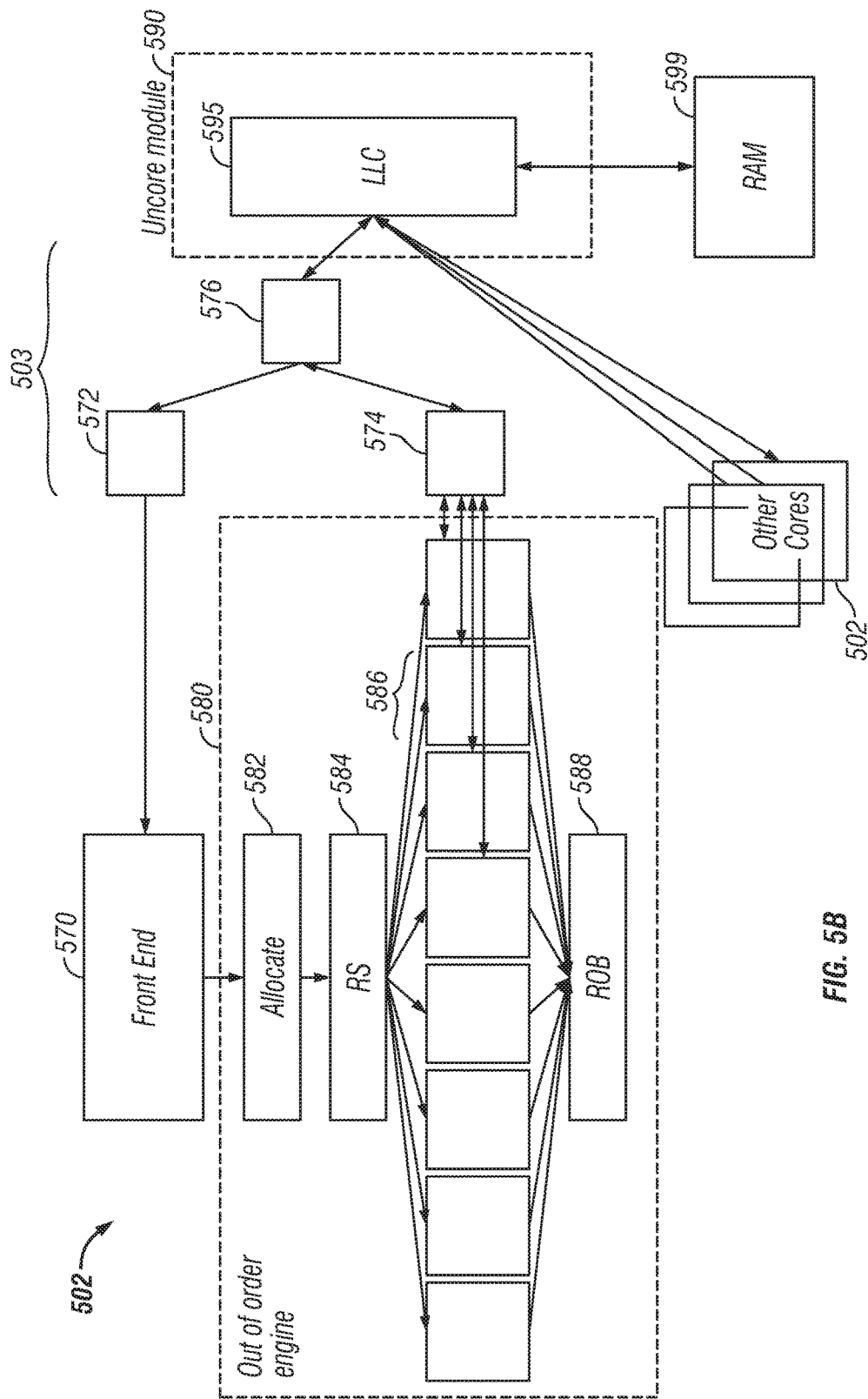
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 582. In one embodiment, allocate module 582 may allocate resources of processor 500 or other resources, such as registers or buffers, to execute a given instruction. Allocate module 582 may make allocations in schedulers, such as a memory scheduler, fast scheduler, or floating point scheduler. Such schedulers may be represented in FIG. 5B by resource schedulers 584. Allocate module 582 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574 through logic block 576. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
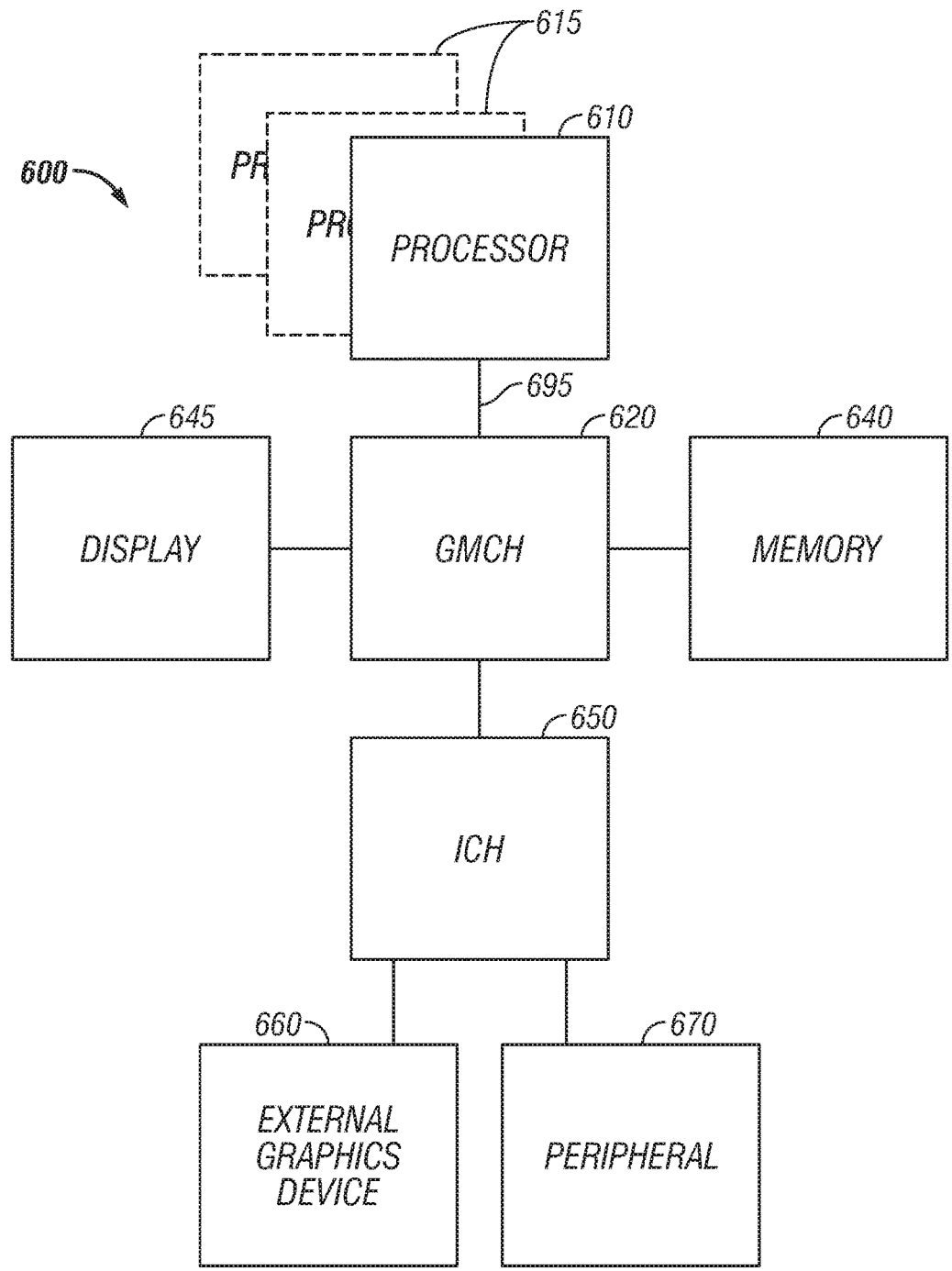
FIG. 6 is a block diagram of a system, in accordance with embodiments of the present disclosure.
Figure 7:
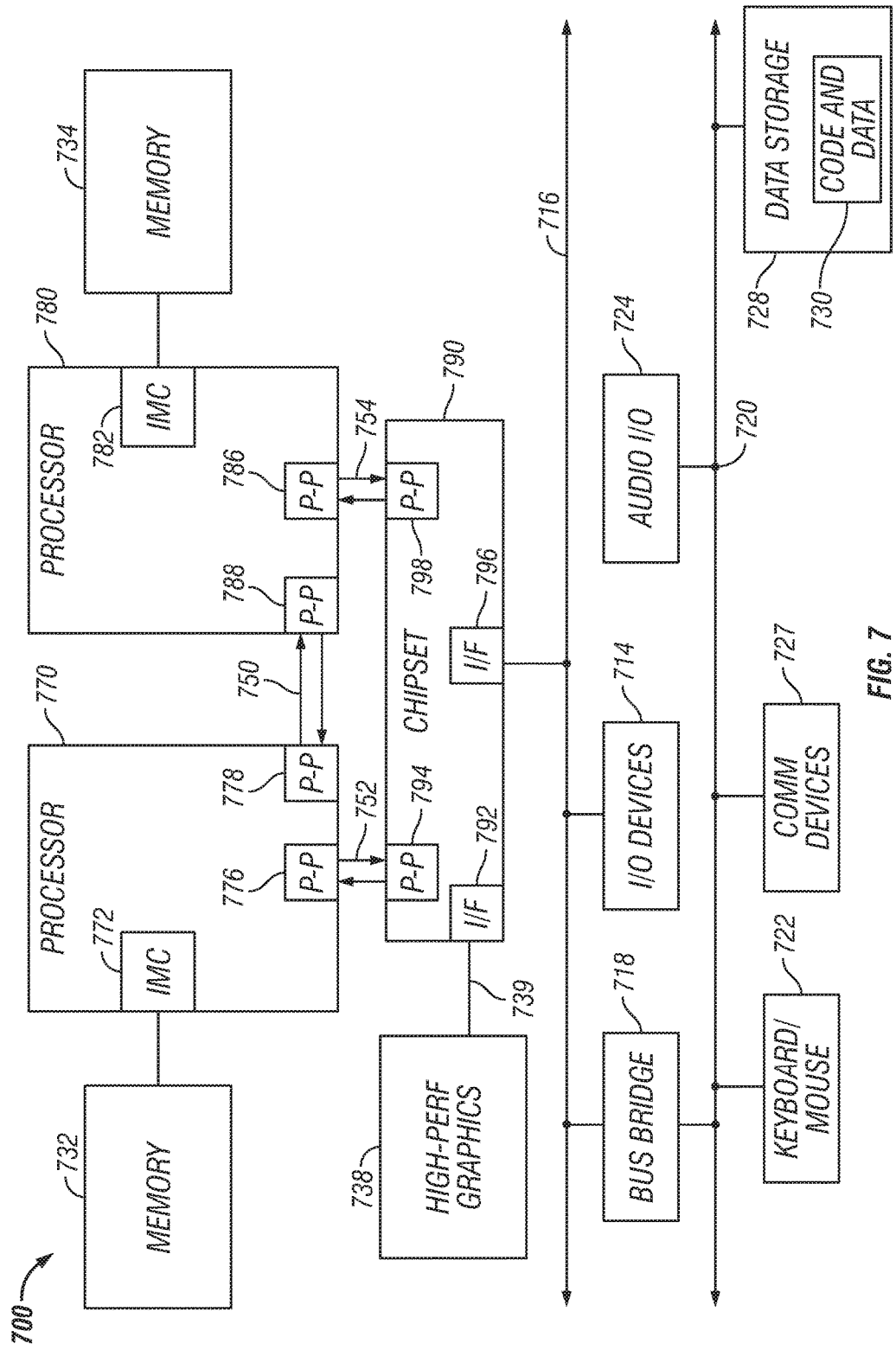
FIG. 7 is a block diagram of a second system, in accordance with embodiments of the present disclosure.
Figure 8:
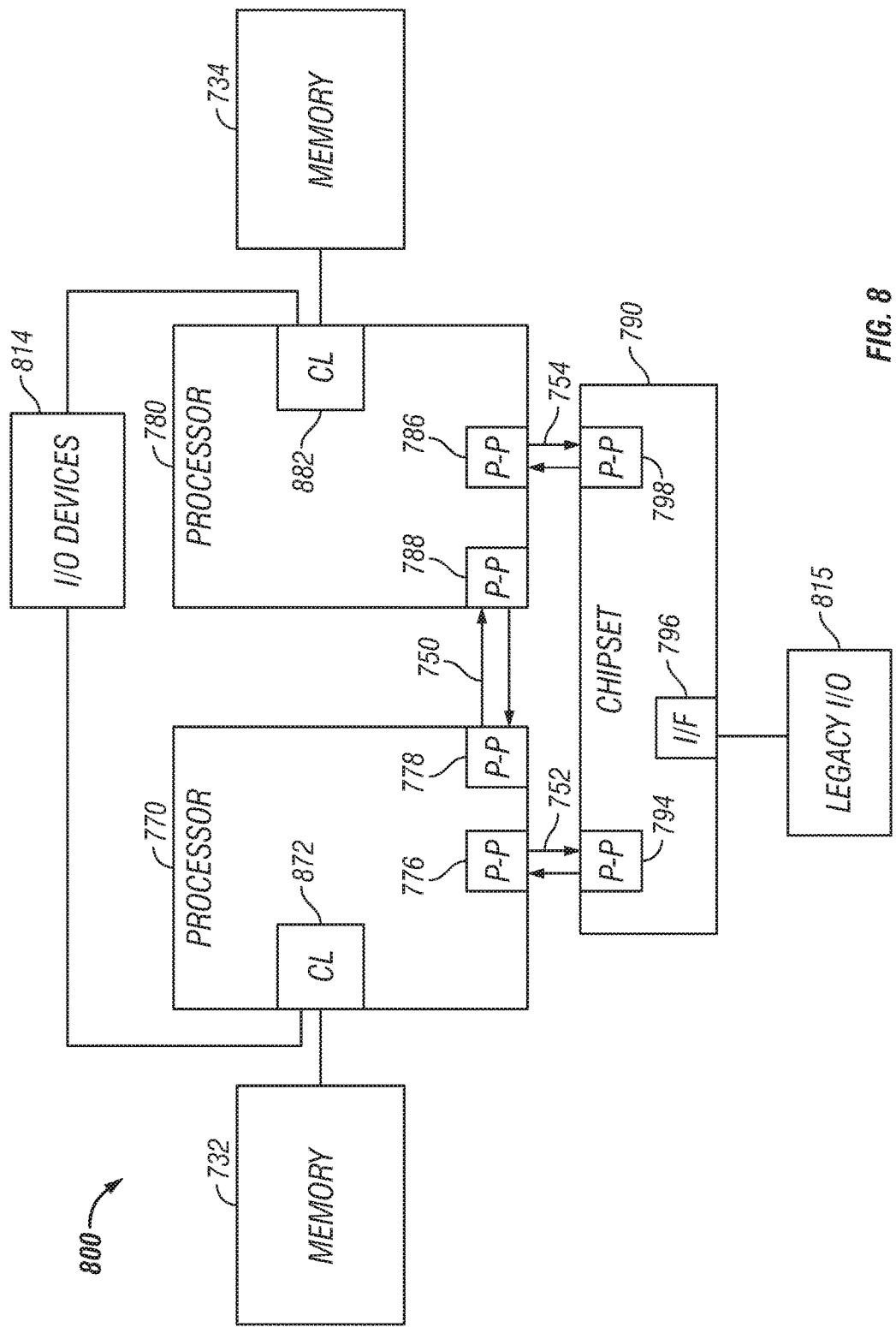
FIG. 8 is a block diagram of a third system in accordance with embodiments of the present disclosure.
Figure 9:
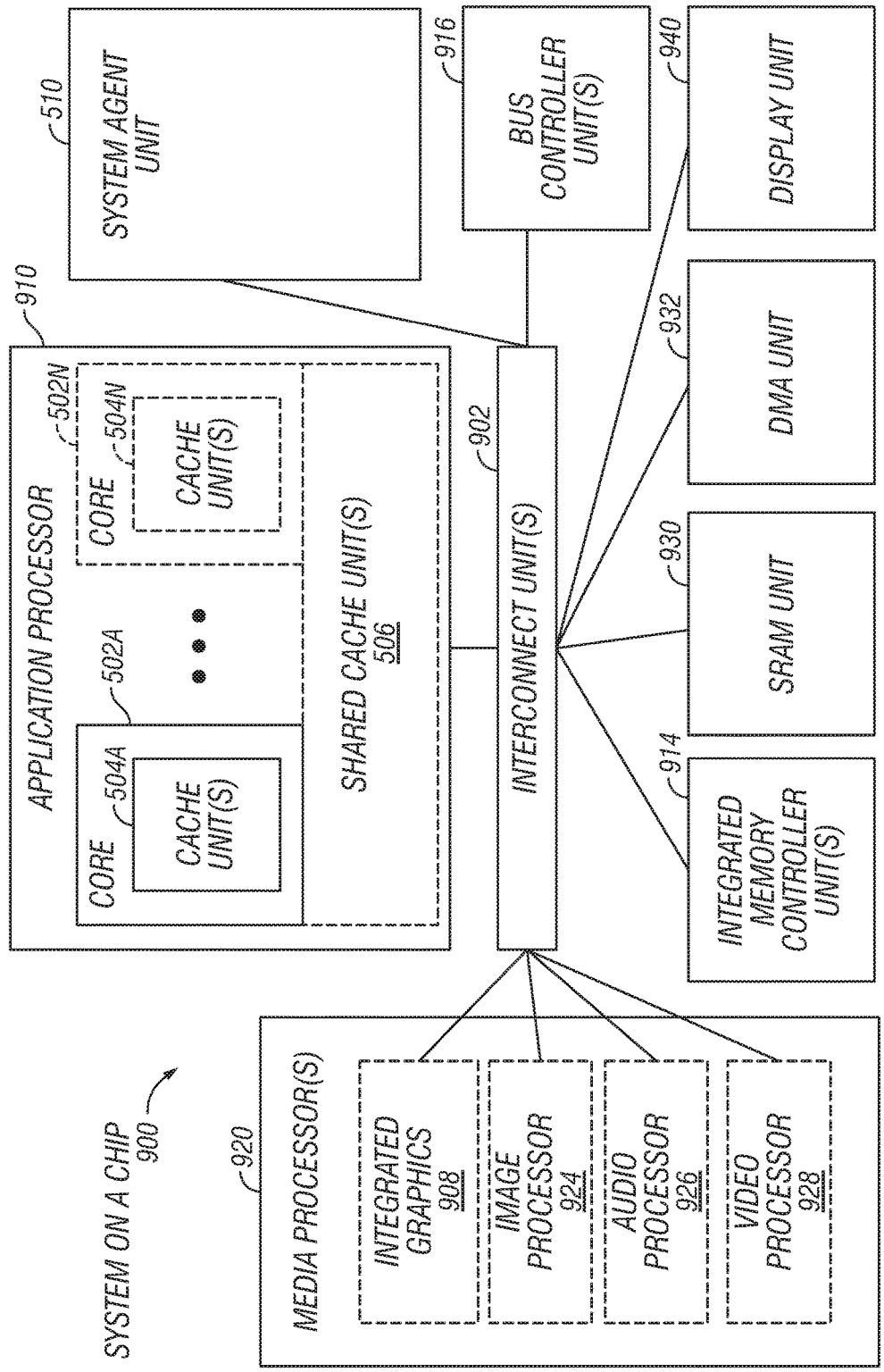
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610,615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH

620 may be further coupled to an input/output (I/O) controller hub (ICH) 650, which may be used to couple various peripheral devices to system 600. External graphics device 660 may include a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610,615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via interface 792 over a high-performance graphics bus 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 770, 780 may include integrated memory and I/O control logic ("CL") 872 and 882, respectively. For at least one embodiment, CL 872, 882 may include integrated memory controller units such as that described above in connection with FIGS. 5 and 7. In addition. CL 872, 882 may also include I/O control logic. FIG. 8 illustrates that not only memories 732, 734 may be coupled to CL 872, 882, but also that I/O devices 814 may also be coupled to control logic 872, 882. Legacy I/O devices 815 may be coupled to chipset 790.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 502A-N, including respective local caches 504A-N, and shared cache units 506; a system agent unit 510; a bus controller units 916; an integrated memory controller units 914; a set of one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
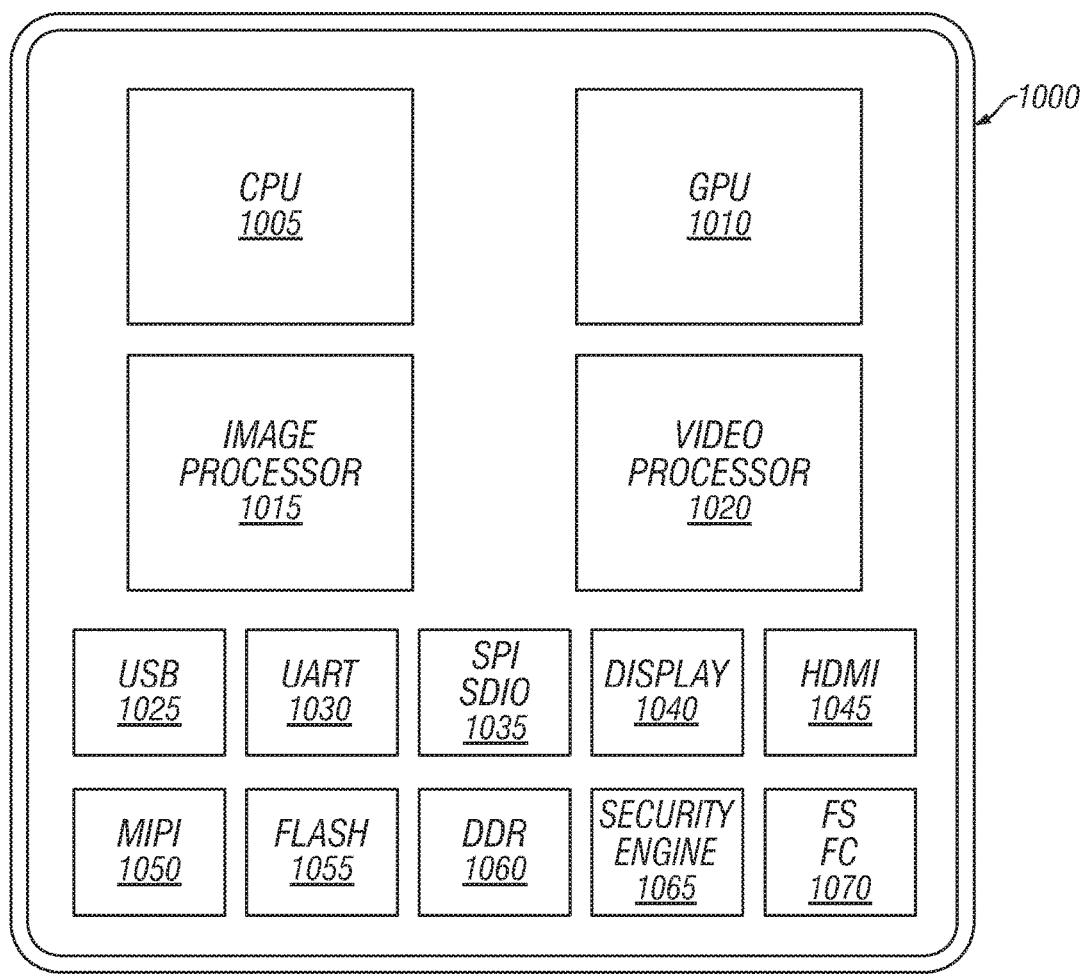
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and I²S/I²C controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
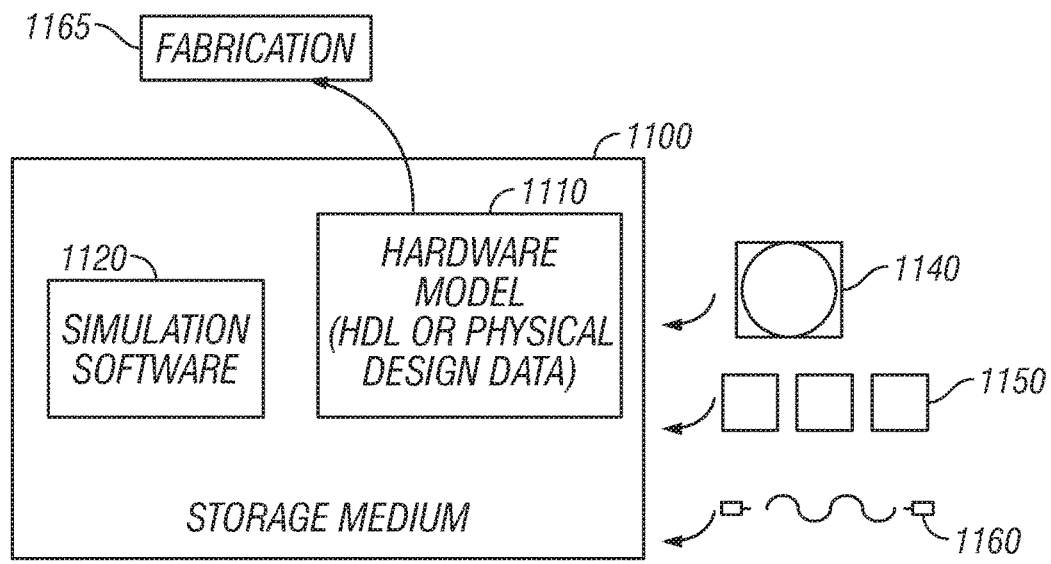
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1100 may include simulation software 1120 and/or hardware or software model 1110. In one embodiment, the data representing the IP core design may be provided to storage 1100 via memory 1140 (e.g., hard disk), wired connection (e.g., internet) 1150 or wireless connection 1160. The IP core information generated by the simulation tool and model may then be transmitted to a fabrication facility 1165 where it may be fabricated by a 3$^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
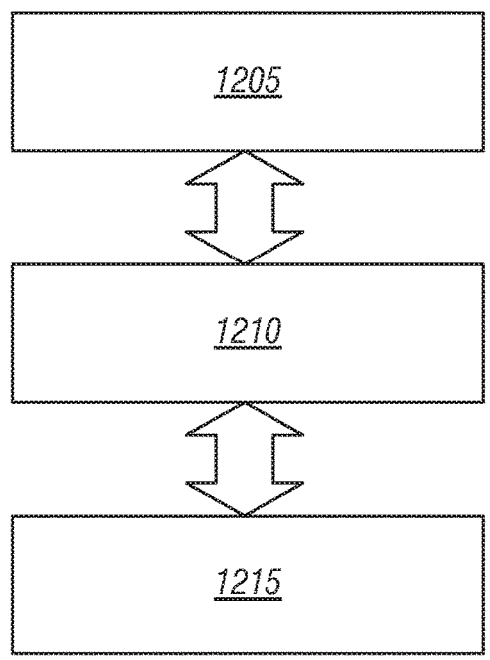
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
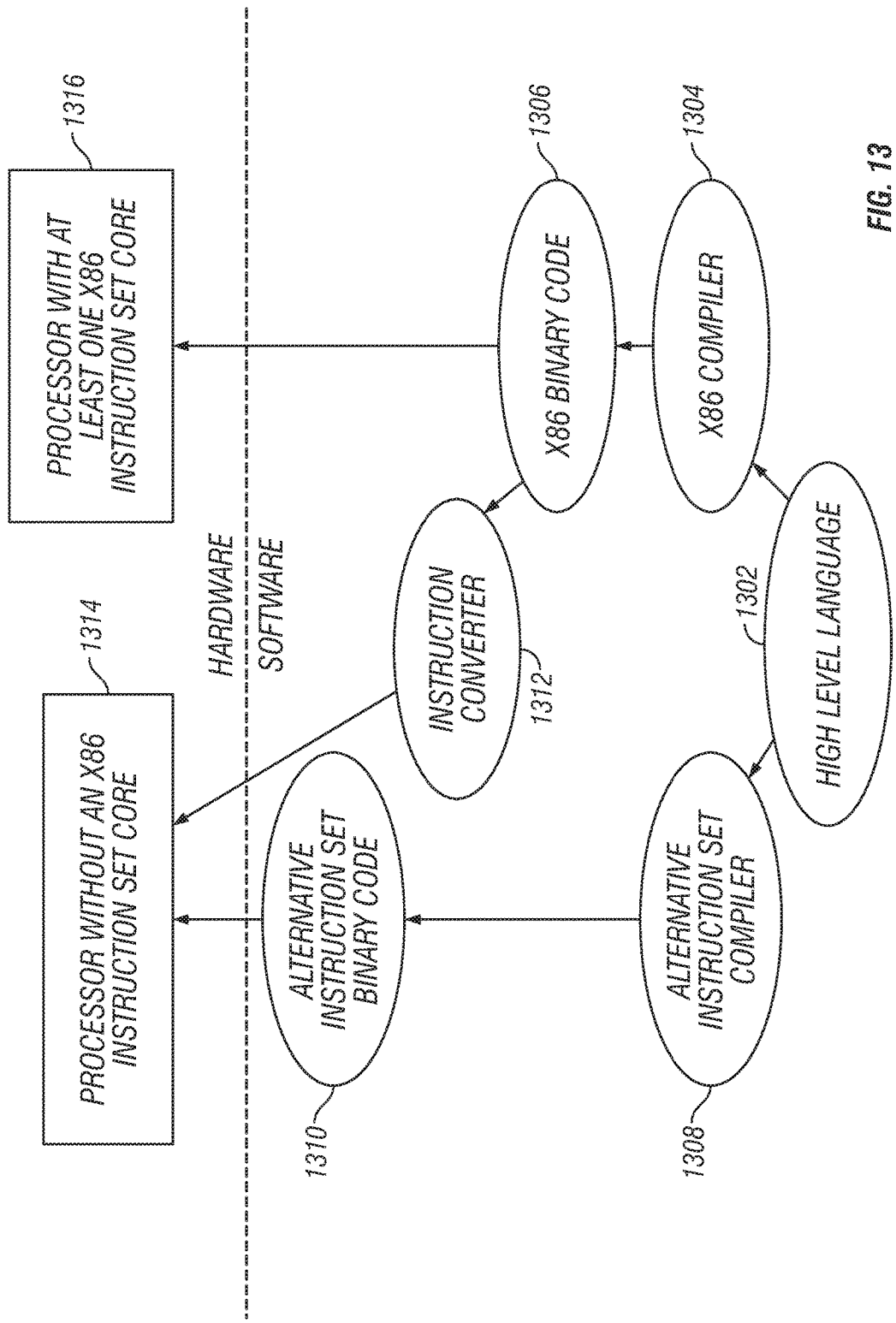
FIG. 13 illustrates a block diagram contrasting the use of a software instruction converter to convert binary instructions in a source instruction set to binary instructions in a target instruction set, in accordance with embodiments of the present disclosure.

FIG. 13 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. x86 compiler 1304 represents a compiler that may be operable to generate x86 binary code 1306 (e.g., object code) that may, with or without additional linkage processing, be executed on the processor with at least one x86 instruction set core 1316. Similarly, FIG. 13 shows the program in high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1312 may be used to convert x86 binary code 1306 into code that may be natively executed by the processor without an x86 instruction set core 1314. This converted code might not be the same as alternative instruction set binary code 1310; however, the converted code will accomplish the general operation and be made up of instructions from the alternative instruction set. Thus, instruction converter 1312 represents software, firmware, hardware, or a combination thereof that, through emulation, simulation or any other process, allows a processor or other electronic device that does not have an x86 instruction set processor or core to execute x86 binary code 1306.

Figure 14:
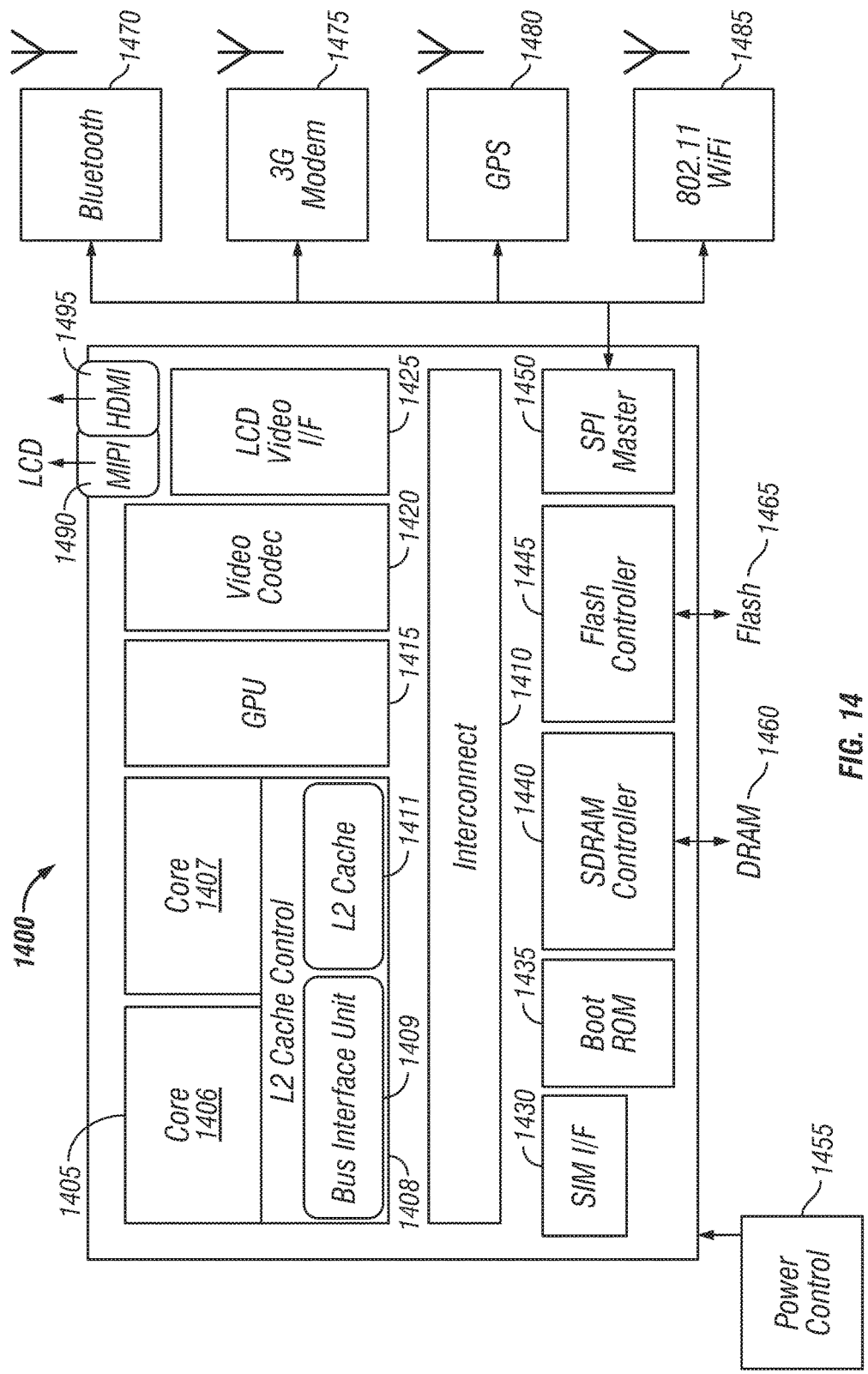
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 within a processor subsystem 1405, and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1411. Cores 1406, 1407 and graphics processing unit 1415 may be communicatively coupled to each other and to the remainder of instruction set architecture 1400 through interconnect 1410. In one embodiment, graphics processing unit 1415 may use a video codec 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module 1460. Flash controller 1445 may provide access to or from memory such as flash memory 1465 or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11. Instruction set architecture 1400 may also include a power control unit 1455.

Figure 15:
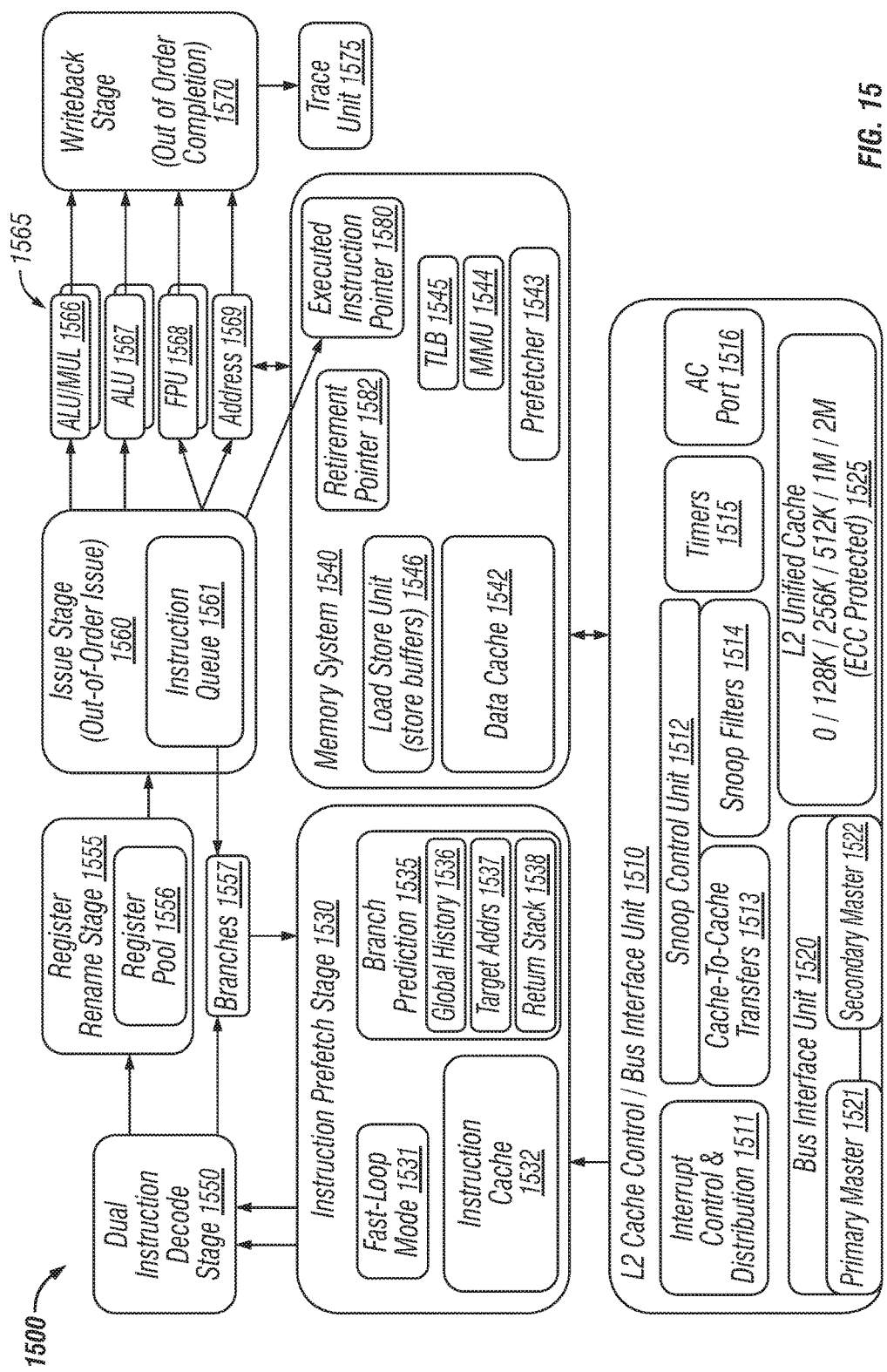
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1565 may be performed by one or more stages of execution. Such stages may include, for example, instruction prefetch stage 1530, dual instruction decode stage 1550, register rename stage 1555, issue stage 1560, and writeback stage 1570.

In one embodiment, memory system 1540 may include an executed instruction pointer 1580. Executed instruction pointer 1580 may store a value identifying the oldest, undispatched instruction within a batch of instructions. The oldest instruction may correspond to the lowest Program Order (PO) value. A PO may include a unique number of an instruction. Such an instruction may be a single instruction within a thread represented by multiple strands. A PO may be used in ordering instructions to ensure correct execution semantics of code. A PO may be reconstructed by mechanisms such as evaluating increments to PO encoded in the instruction rather than an absolute value. Such a reconstructed PO may be known as an "RPO." Although a PO may be referenced herein, such a PO may be used interchangeably with an RPO. A strand may include a sequence of instructions that are data dependent upon each other. The strand may be arranged by a binary translator at compilation time. Hardware executing a strand may execute the instructions of a given strand in order according to the PO of the various instructions. A thread may include multiple strands such that instructions of different strands may depend upon each other. A PO of a given strand may be the PO of the oldest instruction in the strand which has not yet been dispatched to execution from an issue stage. Accordingly, given a thread of multiple strands, each strand including instructions ordered by PO, executed instruction pointer 1580 may store the oldest—illustrated by the lowest number—PO in the thread.

In another embodiment, memory system 1540 may include a retirement pointer 1582. Retirement pointer 1582 may store a value identifying the PO of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128 k, 256 k, 512 k, 1M, or 2M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1510 may include an interrupt control and distribution unit 1511 for generating interrupts and other communications to other portions of a processor or electronic device. In one embodiment, bus interface unit 1510 may include a snoop control unit 1512 that handles cache access and coherency for multiple processing cores. In a further embodiment, to provide such functionality, snoop control unit 1512 may include a cache-to-cache transfer unit 1513 that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1540 may include a load store unit 1546 for storing information such as buffers written to or read back from memory or registers and a data cache 1542. In another embodiment, memory system 1540 may include a translation lookaside buffer (TLB) 1545 that provides look-up of address values between physical and virtual addresses. In yet another embodiment, memory system 1540 may include a memory management unit (MMU) 1544 for facilitating access to virtual memory. In still yet another embodiment, memory system 1540 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage 1550.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
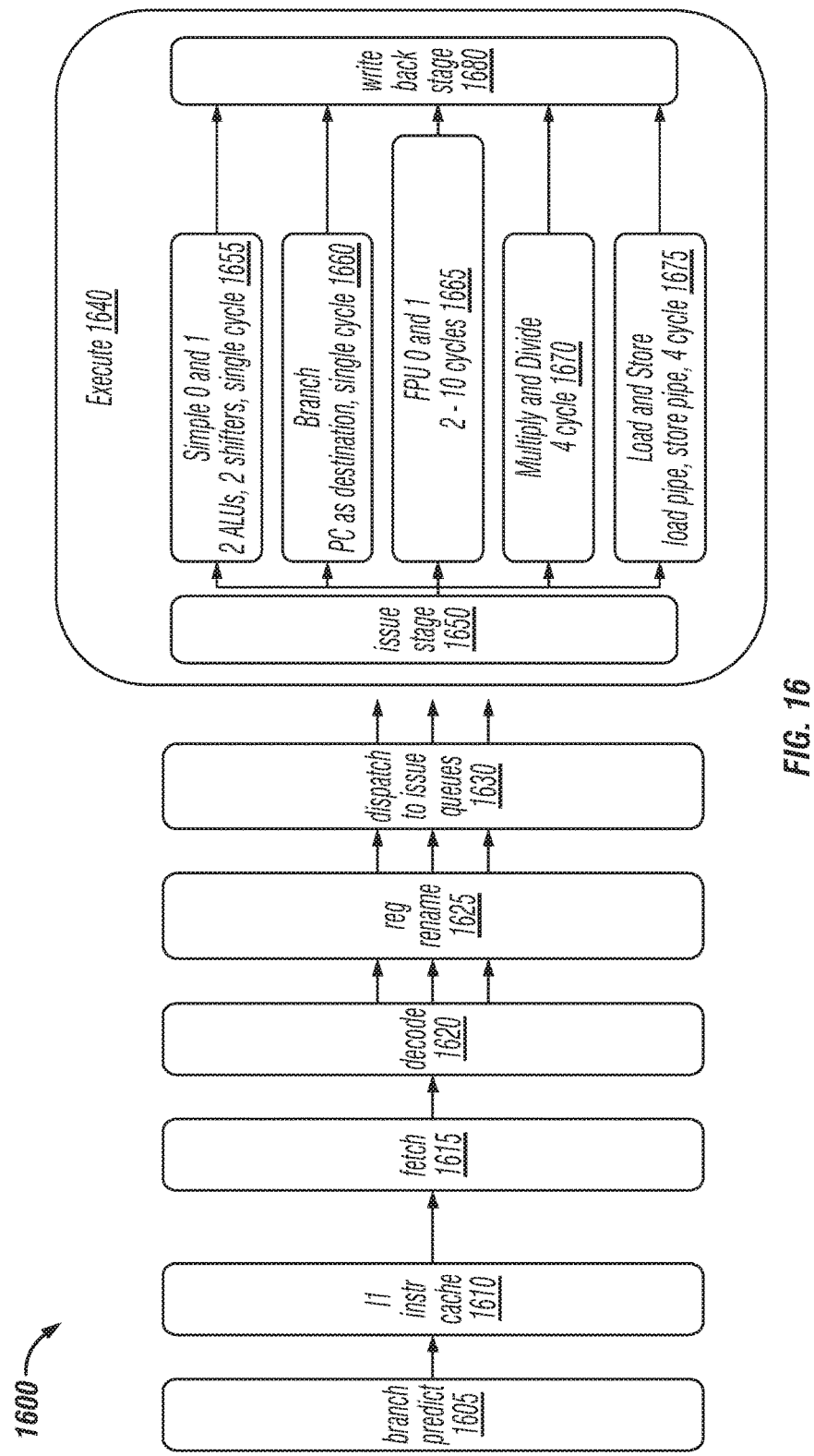
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
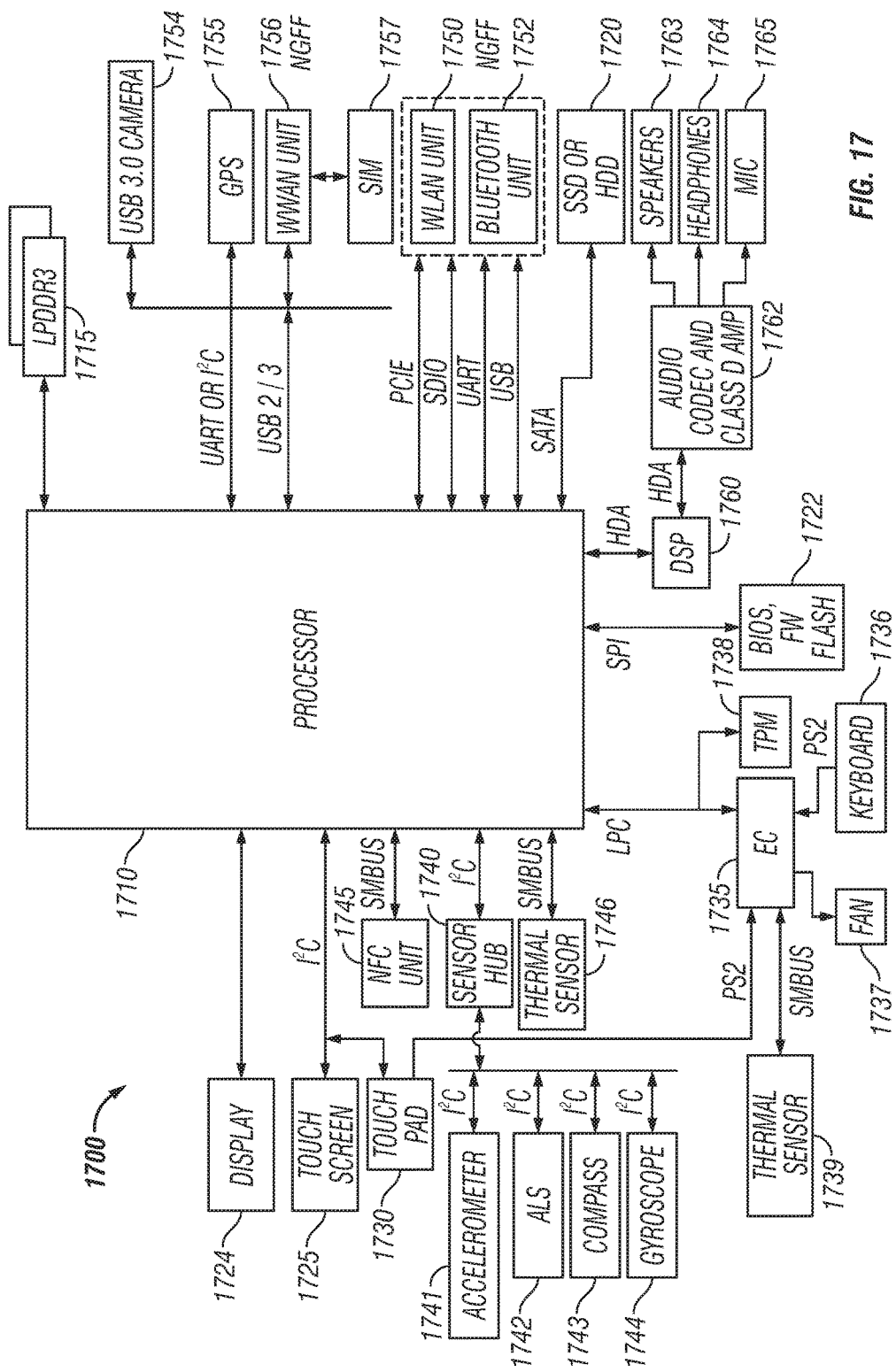
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as $I^2C$ bus, system management bus (SM- Bus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS) 1755, a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1736, and touch pad 1730 may be communicatively coupled to EC 1735. Speakers 1763, headphones 1764, and a microphone 1765 may be communicatively coupled to an audio unit 1762, which may in turn be communicatively coupled to DSP 1760. Audio unit 1762 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

Figure 18:
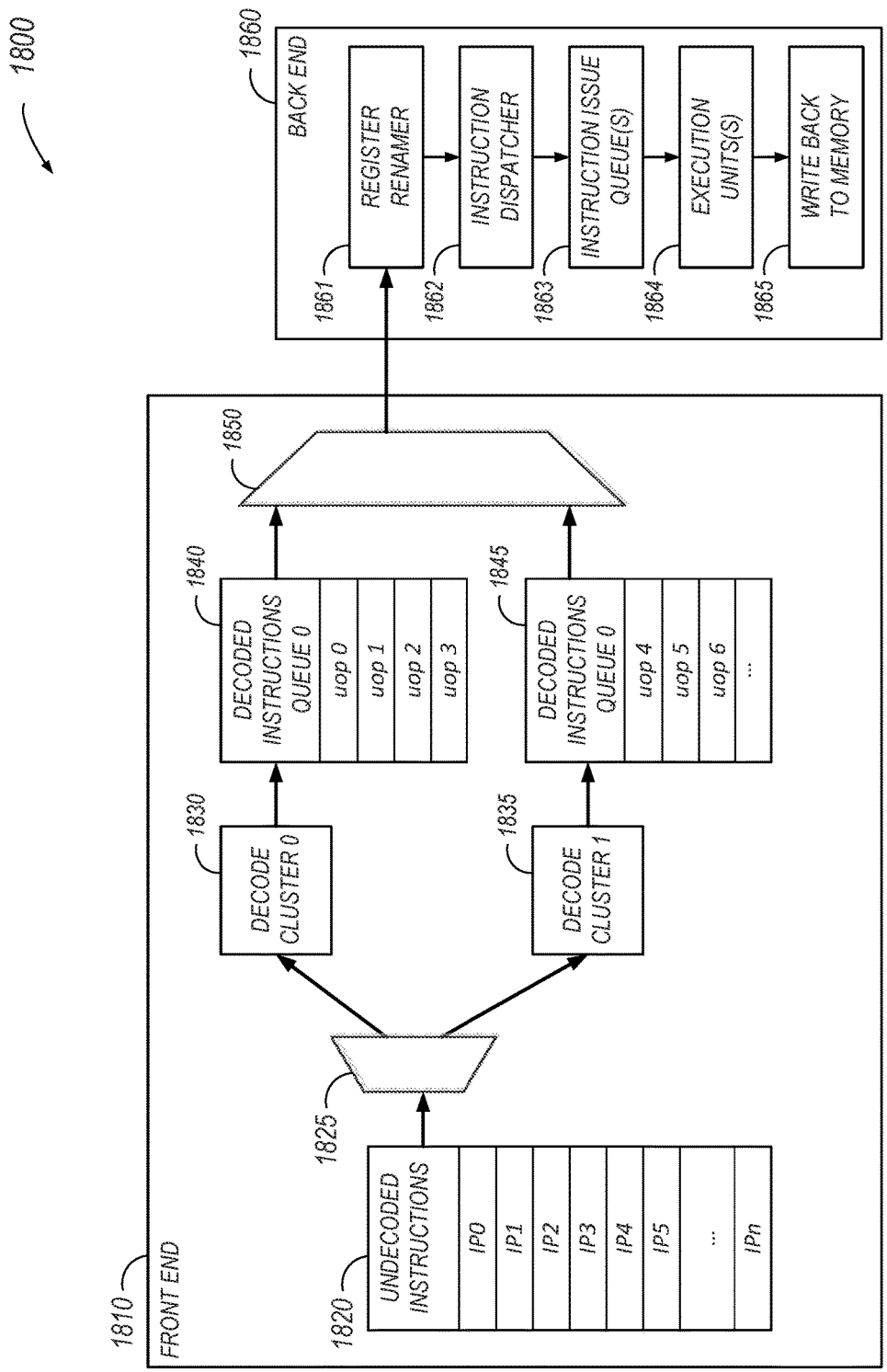
FIG. 18 is an illustration of an example system for out-of-order clustered decoding, according to embodiments of the present disclosure.

Some embodiments of the present disclosure involve out-of-order clustered decoding of instructions in a processor. FIG. 18 is an illustration of an example system 1800 for out-of-order clustered decoding, according to embodiments of the present disclosure. The systems and methods described herein may be used to parallelize decode operations at efficient points in the control flow. This approach may be used, in some embodiments, to increase the number of instructions that can be decoded in each cycle by allowing multiple groups of contiguous instructions to be decoded out of order by respective decode clusters in a processor core front end. The resulting decoded instructions may then be reassembled in program order before being passed to a processor core back end, or to an execution cluster thereof, for execution. For example, the decoded instructions produced by multiple decode clusters may be put back in program order prior to an allocation and register renaming stage of the processor core back end. In at least some embodiments, increased decode bandwidth may be provided through logic replication to support parallelism. For example, after components in the very earliest stages of the processor core front end create a stream of data elements representing the undecoded instructions of a program, in program order, the decode stage may be parallelized by decoding blocks of contiguous data elements that are broken up at points corresponding to instruction boundaries in multiple decode clusters. In one example embodiment, each of the data elements in the stream may include one or more bytes that collectively represent an instruction pointer value. A splitter component in the front end may direct different blocks of contiguous data elements to each of the multiple decode clusters. In some embodiments, the splitter may break up the stream of data elements after each predicted taken branch. In other embodiments, different criteria may be used by the splitter to determine the points in the stream of data elements at which it switches the decode cluster to which data elements are directed. In at least some embodiments, this approach may address frequency problems associated with serial dependencies. For example, it may allow serial logic chains to remain shorter by keeping each decode cluster relatively narrow. Each decode cluster may include multiple decoders that collectively perform n-wide decoding, where n is any integer.

System 1800 may include one or more processors, an SoC, an integrated circuit, or other mechanism. Although system 1800 is shown and described as an example in FIG. 18, any suitable mechanism may be used. For example, some or all of the functionality of system 1800 described herein may be implemented by a digital signal processor (DSP), circuitry, instructions for reconfiguring circuitry, a microcontroller, an application specific integrated circuit (ASIC), or a microprocessor having more, fewer, or different elements than those illustrated in FIG. 18. System 1800 may include any suitable mechanisms for performing pipelined prefetching to advance multiple data streams in parallel. In at least some embodiments, such mechanisms may be implemented in hardware. For example, in some embodiments, some or all of the elements of system 1800 illustrated in FIG. 18 and/or described herein may be implemented fully or in part using hardware circuitry. In some embodiments, this circuitry may include static (fixed-function) logic devices that collectively implement some or all of the functionality of system 1800. In other embodiments, this circuitry may include programmable logic devices, such as field programmable logic gates or arrays thereof, that collectively implement some or all of the functionality of system 1800. In still other embodiments, this circuitry may include static, dynamic, and/or programmable memory devices that, when operating in conjunction with other hardware elements, implement some or all of the functionality of system 1800. For example, system 1800 may include a hardware memory having stored therein instructions which may be used to program system 1800 to perform one or more operations according to embodiments of the present disclosure. Embodiments of system 1800 are not limited to any specific combination of hardware circuitry and software. System 1800 may be implemented fully or in part by the elements described in FIGS. 1-17.

In one embodiment, system 1800 may receive instructions for execution as an instruction stream. In one embodiment, system 1800 may include a processor core front end 1810 for fetching and decoding the instructions and a processor core back end 1860 for executing the decoded instructions. In embodiments in which system 1800 includes a multicore processor, each of multiple processor cores may include at least a portion of a front end 1810, and at least a portion of a back end 1860.

Front end 1810 may include a queue 1820 of data elements representing a sequence of undecoded instructions in program order that were received as an instruction stream or that were fetched from a memory (not shown). In one embodiment, the data elements may include instruction pointer values (shown as IP0-IPn). In another embodiment, the data elements may include encodings of instructions in the processor's instruction set architecture (ISA). In yet another embodiment, the data elements may represent instruction-related "text" to be decoded and/or interpreted by the processor to cause instructions in the processor's ISA to be executed. In another embodiment, the data elements may be raw bytes of data to be decoded and/or interpreted by the processor to cause instructions in the processor's ISA to be executed. In some embodiments, each of the data elements representing an undecoded instruction may be the same length. In other embodiments, at least some of the data elements representing undecoded instructions may be of different lengths.

Front end 1810 may include two decode clusters, shown as decode cluster 0 (1830) and decode cluster 1 (1835). Front end 1810 may also include a splitter 1825 that directs different subsets of the data elements in queue 1820 either to decode cluster 0 (1830) or to decode cluster 1 (1835) to be decoded. In one embodiment, splitter 1825 may include hardware circuitry or logic to determine whether and when to direct different subsets of the data elements in queue 1820 to decode cluster 0 (1830) and/or to decode cluster 1 (1835) for decoding. In some embodiments, each of the decode clusters may include hardware circuitry or logic to decode multiple ones of the data elements that are directed to it in parallel. For example, in one embodiment, each of the decode clusters may perform two-wide decoding. In general, each of the decode clusters may perform n-wide decoding, where n is any integer. In some embodiments, different decode clusters may include different numbers of decoders, i.e., they may not be symmetric. In some embodiments, different clusters may be better suited for decoding certain instructions than others. In some embodiments, splitter 1825 may factor these and/or other differences between the decode clusters into its determination of whether and when to direct different subsets of the data elements in queue 1820 to decode cluster 0 (1830) and/or to decode cluster 1 (1835) for decoding.

Front end 1810 may include a queue 1840 into which the outputs of decoding operations performed by decode cluster 0 (1830) are directed and a queue 1845 into which the outputs of decoding operations performed by decode cluster 1 (1835) are directed. In this example, queues 1840 and 1845 store decoded instructions in the form of micro-operations (uops). In some embodiments, the decoding of each of the data elements of queue 1820 that are directed to decode cluster 0 (1830) may generate a single uop in queue 1840. In other embodiments, for at least some of the data elements that are directed to decode cluster 0 (1830), the decoding may generate two or more uops in queue 1840. Similarly, in some embodiments the decoding of each of the data elements of queue 1820 that are directed to decode cluster 1 (1835) may generate a single uop in queue 1845. In other embodiments, for at least some of the data elements that are directed to decode cluster 1 (1835), the decoding may generate two or more uops in queue 1845.

Front end 1810 may also include a merging component 1850. As described in more detail herein, merging component 1850 may include hardware circuitry or logic to merge the outputs of decode cluster 0 (1830) and decode cluster 1 (1835) in queues 1840 and 1845, respectively, to produce an ordered sequence of decoded instructions. Following the merging of the outputs of decode cluster 0 (1830) and decode cluster 1 (1835), the order of the decoded instructions in the sequence of decoded instructions may reflect the program order of the corresponding undecoded instructions that were directed to the decode clusters from queue 1820. In this example, the in-order sequence of decoded instructions generated by merging component 1850 may be provided to processor core back end 1860 for execution. In one embodiment, the in-order sequence of decoded instructions generated by merging component 1850 may be provided to a register renaming stage of the processor core back end 1860 (shown as register renamer 1861).

Processor core back end 1860 may also include an instruction dispatcher 1862, one or more instruction issue queues 1863, one or more execution units 1864, and a write back stage 1865 for writing results of the instruction execution to memory. In one embodiment, at least one of the execution units 1864 may be an out-of-order execution engine. The decoded instructions received by the register renamer 1861 may be dispatched by instruction dispatcher 1862. They may be placed in one or more instruction issue queues 1863, from which they may be scheduled for execution by specific execution units 1864. In some embodiments, processor core back end 1860 may include additional components necessary for the execution of instructions (not shown). For example, in different embodiments, an uncore module of the processor core may include one or more caches, hardware interfaces, memory coherency coordinators, interprocessor interconnects, instruction pipelines, or memory controllers (not shown).

In another example embodiment, queue 1820 may be implemented as two physical queues into which data elements representing undecoded instructions are directed by a splitter (such as splitter 1825) for decoding by different ones of the decode clusters as these data elements are generated. In yet another example embodiment, queue 1820 may be implemented as two logical queues within a single physical queue. In this example, multiple pointers may be maintained to direct data elements into each of the logical queues by a splitter (such as splitter 1825) and to direct different groups of contiguous data elements to the multiple decode clusters.

Figure 19:
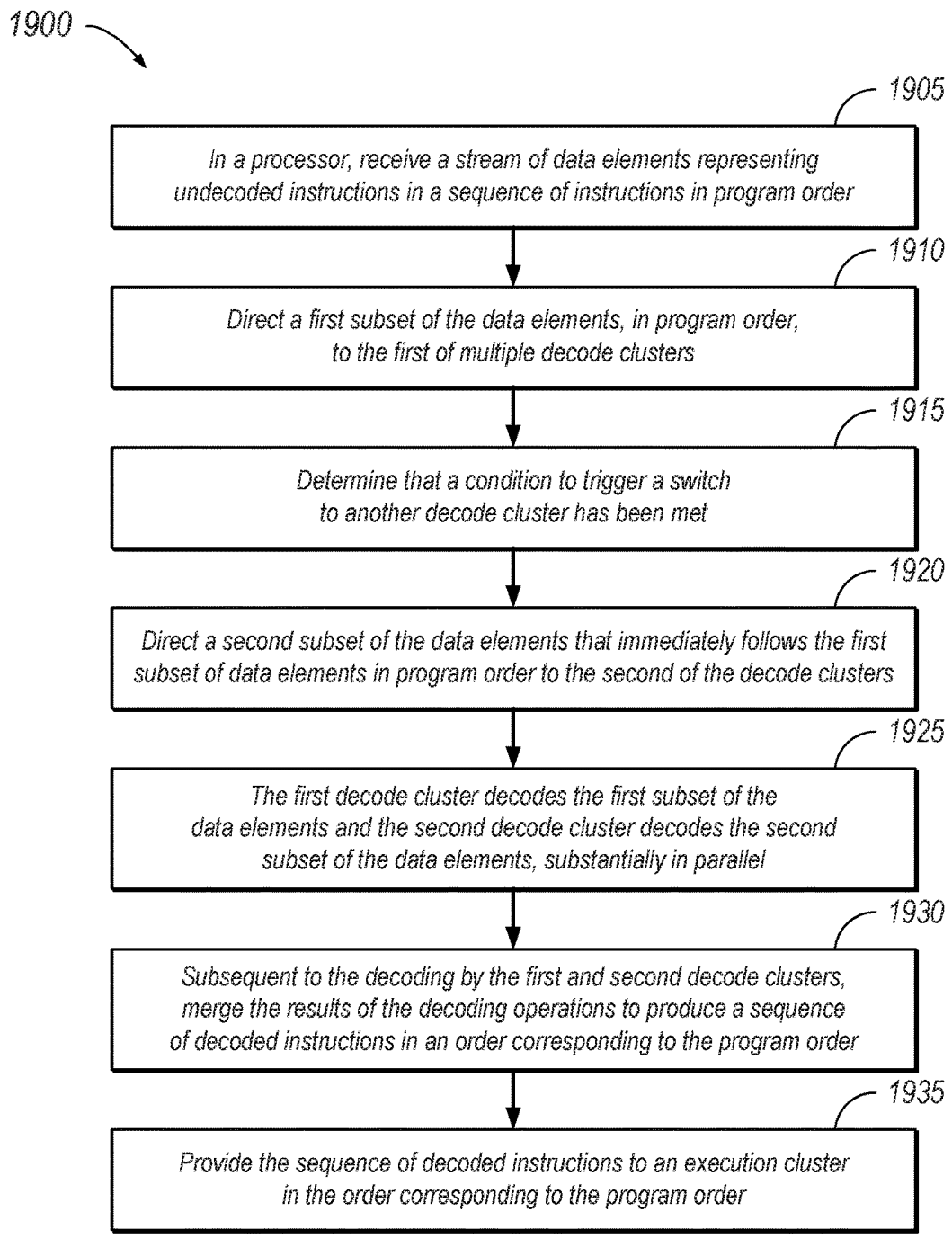
FIG. 19 is an illustration of a method for performing out-of-order clustered decoding, according to embodiments of the present disclosure.

FIG. 19 is an illustration of a method for performing out-of-order clustered decoding, according to embodiments of the present disclosure. Method 1900 may be implemented by any of the elements shown in FIGS. 1-18, FIG. 20, or FIG. 22. Method 1900 may be initiated by any suitable criteria and may initiate operation at any suitable point. In one embodiment, method 1900 may initiate operation at 1905. Method 1900 may include greater or fewer operations than those illustrated. Moreover, method 1900 may execute its operations in an order different than those illustrated below. Method 1900 may terminate at any suitable operation. Moreover, method 1900 may repeat operation at any suitable operation. Method 1900 may perform any of its operations in parallel with other operations of method 1900, or in parallel with operations of other methods. Furthermore, method 1900 may be executed multiple times to perform out-of-order clustered decoding for different streams of undecoded instructions. Method 1900 may be executed over time to decode instructions to implement one or more applications. During the execution of method 1900, other methods may be invoked, such as method 2100 and/or method 2300, described below. These additional methods may be invoked to perform at least some of the operations of method 1900.

At 1905, in one embodiment, a stream of data elements representing undecoded instructions in a sequence of instructions that are in program order is received in a processor. In one embodiment, the data elements may include instruction pointer values. In another embodiment, the data elements may include encodings of instructions in the processor's instruction set architecture (ISA). In yet another embodiment, the data elements may represent instruction-related "text" to be decoded and/or interpreted by the processor to cause instructions in the processor's ISA to be executed. In another embodiment, the data elements may be raw bytes of data to be decoded and/or interpreted by the processor to cause instructions in the processor's ISA to be executed. In some embodiments, each of the data elements representing an undecoded instruction may be the same length. In other embodiments, at least some of the data elements representing undecoded instructions may be of different lengths.

At 1910, a first subset of the data elements may be directed, in program order, to the first of multiple decode clusters. In some embodiments, the first subset of data elements may include one or more data elements representing a single instruction. In other embodiments, the first subset of data elements may include data elements representing two or more instructions. In various embodiments, the first subset of data elements may be defined by one or more instruction boundaries in the sequence of instructions. For example, in some embodiments, the first data element in the first subset of data elements may be the first data element in a representation of an instruction. The last data element in the first subset of data may be the last data element in a representation of the same instruction or another instruction.

At 1915, it may be determined that a condition to trigger a switch to another decode cluster has been met. At 1920, a second subset of the data elements (one that immediately follows the first subset of data elements in program order) may be directed, in program order, to the second decode cluster. In some embodiments, the second subset of data elements may include one or more data elements representing a single instruction. In other embodiments, the second subset of data elements may include data elements representing two or more instructions. In various embodiments, the second subset of data elements may be defined by one or more instruction boundaries in the sequence of instructions. For example, in some embodiments, the first data element in the second subset of data elements may be the first data element in a representation of an instruction. The last data element in the second subset of data may be the last data element in a representation of the same instruction or another instruction.

At 1925, the first decode cluster may decode the first subset of the data elements and the second decode cluster may decode the second subset of the data elements. In at least some embodiments, these decode operations may be performed substantially in parallel. At 1930, subsequent to the decoding by the first and second decode clusters, the results of the decoding operations performed by the two decode clusters may be merged to produce an ordered sequence of decoded instructions, with the order of the decoded instructions corresponding to the program order of the undecoded instructions. At 1935, the sequence of decoded instructions may be provided to an execution cluster in the order corresponding to the program order. In this example embodiment, operations 1910-1935 may be repeated continuously to decode the data elements in a stream of data elements representing undecoded instructions as they are received. In some embodiments, the execution cluster may be similar to execution cluster 460 illustrated in FIG. 4B. The execution cluster may include multiple execution units, such as execution units 462 in FIG. 4B or execution units 1864 in FIG. 18.

In at least some embodiments, one or more of operations 1905 through 1935 of method 1900 may be executed in hardware in the front end of a processor core.

In some embodiments, the systems described herein may exploit the fact that the primary branch prediction mechanism is placed early in the execution pipeline of a processor core and performance requirements dictating the ability to predict a taken branch during almost every cycle. For example, many modern high performance processors include large complex branch predictors. In these processors, as in some embodiments of the present disclosure, the predictor may be placed as early as possible in the pipeline to minimize the amount of wasted work whenever a taken branch is discovered. In some existing systems, the flow of instructions through the pipeline may proceed sequentially until a taken branch is predicted. Taken branches can occur quite frequently (every 8-10 instructions, for example). High performance processors, including some embodiments of the present disclosure, may include circuitry to identify taken branches as quickly as possible, since branch resolution typically takes more than a single cycle. In some embodiments, the prediction process may be further decoupled from the rest of the processor pipeline using a queue of instruction pointers (IPs) referred to a Branch Prediction Queue (BPQ). This may allow the granularity of the prediction process to be different than that of the fetch process, while providing a means to eliminate any bubbles caused by the latency of the prediction pipeline.

In some embodiments, given that these front-end mechanisms essentially create a stream of instruction pointers, the systems described herein may exploit known good instruction boundary points by clustering the fetch and decode pipelines beginning at the BPQ. For example, instead of including a single BPQ, a single fetcher for fetching raw bytes, and a single decode pipeline, the entire decode process may be replicated in multiple decode clusters beginning at the BPQ and ending at a queue of decoded uops (prior to in-order allocation). The decode clusters may work on a different sequential streams of undecoded instructions in parallel. The data elements in each subset of the data elements in the stream may be in program order. Subsets of the steam of data elements consecutively assigned to the same decode cluster may or may not be in program order.

Figure 20:
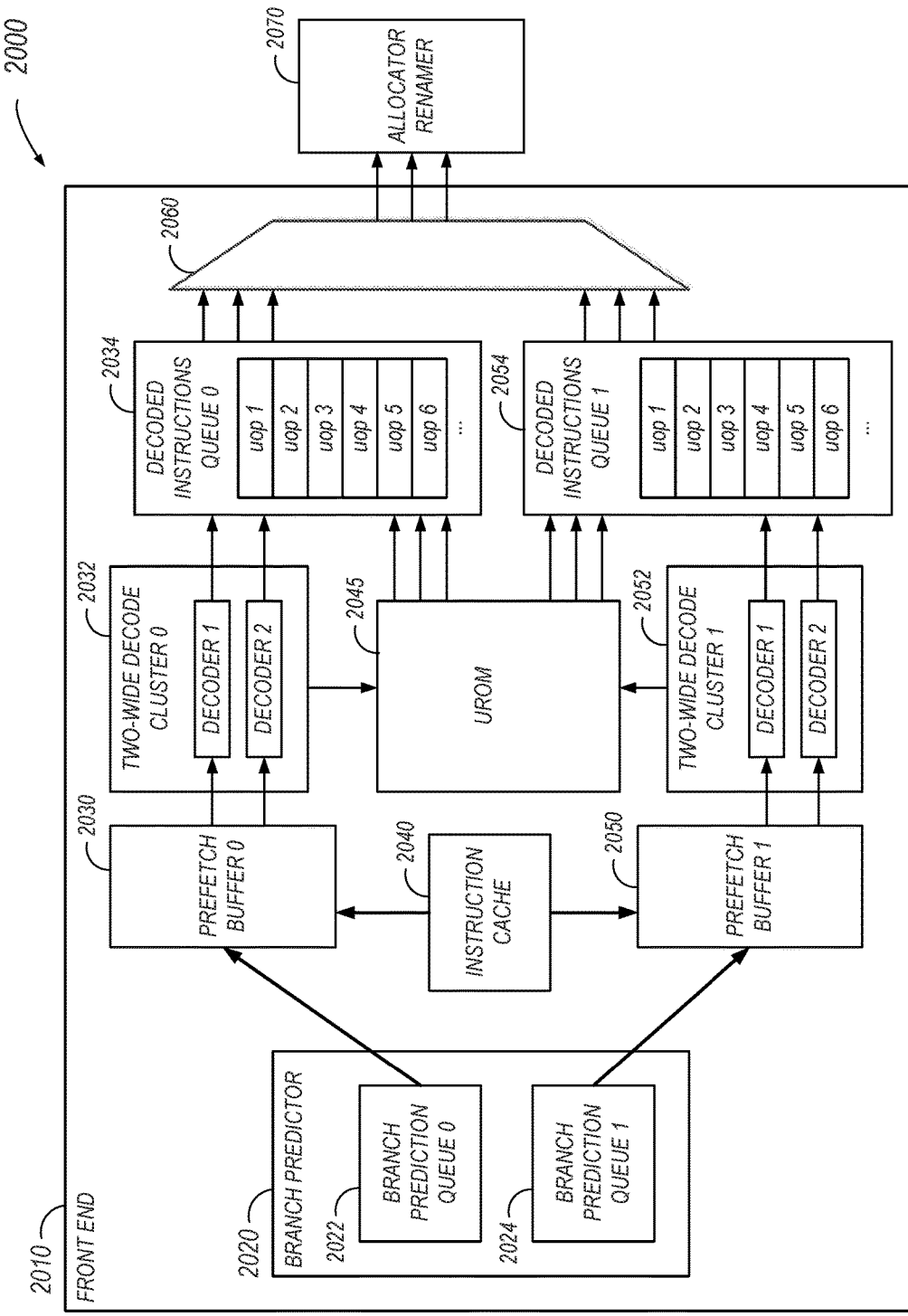
FIG. 20 is an illustration of an example processor core with a front end that includes multiple two-wide decode clusters, according to embodiments of the present disclosure.

FIG. 20 is an illustration of an example processor core 2000 with a front end that includes multiple two-wide decode clusters, according to embodiments of the present disclosure. More specifically, processor core 2000 includes a three-wide allocator/renamer and includes a four-wide clustered front end, which is implemented using two two-wide decode clusters. Although processor core 2000 is shown and described as an example in FIG. 20, any suitable mechanism may be used. For example, some or all of the functionality of processor core 2000 described herein may be implemented by a digital signal processor (DSP), circuitry, instructions for reconfiguring circuitry, a microcontroller, an application specific integrated circuit (ASIC), or a microprocessor having more, fewer, or different elements than those illustrated in FIG. 20. Processor core 2000 may include any suitable mechanisms for performing pipelined prefetching to advance multiple data streams in parallel. In at least some embodiments, such mechanisms may be implemented in hardware. For example, in some embodiments, some or all of the elements of processor core 2000 illustrated in FIG. 20 and/or described herein may be implemented fully or in part using hardware circuitry. In some embodiments, this circuitry may include static (fixed-function) logic devices that collectively implement some or all of the functionality of processor core 2000. In other embodiments, this circuitry may include programmable logic devices, such as field programmable logic gates or arrays thereof, that collectively implement some or all of the functionality of processor core 2000. In still other embodiments, this circuitry may include static, dynamic, and/or programmable memory devices that, when operating in conjunction with other hardware elements, implement some or all of the functionality of processor core 2000. For example, processor core 2000 may include a hardware memory having stored therein instructions which may be used to program processor core 2000 to perform one or more operations according to embodiments of the present disclosure. Embodiments of processor core 2000 are not limited to any specific combination of hardware circuitry and software. Processor core 2000 may be implemented fully or in part by the elements described in FIGS. 1-19.

In one embodiment, processor core 2000 may receive instructions for execution as an instruction stream. In one embodiment, processor core 2000 may include a front end 2010 for fetching and decoding the instructions and an allocator renamer 2070 to receive the decoded instructions. Front end 2010 may include two two-wide decode clusters, shown as decode cluster 0 (2032) and decode cluster 1 (2052). In one embodiment, allocator/renamer 2070 may be a component of a processor core back end that includes one or more execution units for executing the decoded instructions, and may be similar to register renamer 1861 illustrated in FIG. 18.

Front end 2010 may include a branch predictor 2020, which may include two branch prediction queues 2022 and 2024. In one embodiment, the data elements stored in prediction queues 2022 and 2024 may include instruction pointer values indicating instructions at which a branch was taken. In one embodiment, each of these branch prediction queues 2022 and 2024 may include storage for up to eight entries. In other embodiments, either or both of these branch prediction queues 2022 and 2024 may store other numbers of entries. Branch predictor 2022 may also include other elements required to perform branch prediction, such as hardware circuitry to implement branch prediction logic, one or more buffers or queues (including a branch target buffer), or other hardware circuitry and/or logic elements (not shown).

Front end 2010 may also include a prefetch buffer 2030 to store data elements representing undecoded instructions to be decoded by decode cluster 0 (2032) and a prefetch buffer 2050 to store data elements representing undecoded instructions to be decoded by decode cluster 1 (2052). Front end 2010 may also include an instruction cache 2040. In one embodiment, instruction cache 2040 may include storage for up to 32K bytes of data representing undecided instructions. In other embodiments, instruction cache 2040 may include storage for more or fewer entries. In some embodiments, instruction-related data elements representing undecoded instructions may be provided to the prefetch buffers 2030 and 2050 for subsequent decoding by decode clusters 2032 and 2034, respectively, from instruction cache 2040.

In this example, data elements including branch-related information about undecoded instructions to be decoded by front end 2010 may be provided to the prefetch buffers 2030 and 2050 from branch prediction queues 2022 and 2024 for use in subsequent decoding operations to be performed by decode clusters 2032 and 2034, respectively. In one embodiment, branch predictor 2020 may include hardware circuitry or logic to determine the data elements to be included in branch prediction queue 0 (2022) and branch prediction queue 1 (2024). In one embodiment, this information may be used to determine which data elements in instruction cache 2040 are to be directed to prefetch buffer 2030 and which data elements in instruction cache 2040 are to be directed to prefetch buffer 2050. In some embodiments, front end 2010 may include hardware circuitry or logic to determine which subsets of the data elements in instruction cache 2040 are to be directed to each of the prefetch buffers 2030 and 2050. In one example, data elements may be directed from instruction cache 2040 to one of the prefetch buffers 2030 or 2050 until one of the data elements in instruction cache 2040 corresponds to an entry in the corresponding branch predicator 2022 or 2024 indicating a predicted taken branch.

Front end 2010 may include a microcode ROM (shown as uROM 2045) that stores data elements representing micro-operations (uops) for performing various ones of the instructions received in the input instruction stream. In some embodiments, each of the decode clusters 2032 and 2052 may include hardware circuitry or logic to decode multiple ones of the data elements in its prefetch buffer in parallel. For example, the first decode cluster, shown as decode cluster 0 (2032), is a two-wide decode cluster includes two decoders, each of which can decode a different data element at substantially the same time. Decode cluster 2032 may decode the data elements that were directed to prefetch buffer 0 (2030). In some cases, the decoding operation may include generating one or more uops for each decoded data element. In other cases, the decoding operation may include obtaining one or more uops for each decoded data element from uROM 2045, e.g., if a result of a previous decoding operation for the same instruction is available in uROM 2045. Similarly, the second decode cluster, shown as decode cluster 1 (2052), is a two-wide decode cluster includes two decoders, each of which can decode a different data element at substantially the same time. Decode cluster 2052 may decode the data elements that were directed to prefetch buffer 1 (2050). In some cases, the decoding operation may include generating one or more uops for each decoded data element. In other cases, the decoding operation may include obtaining one or more uops for each decoded data element from uROM 2045, e.g., if a result of a previous decoding operation for the same instruction is available in uROM 2045.

Front end 2010 may include a queue 2034 into which the outputs of decode cluster 0 (2032) are directed and a queue 2054 into which the outputs of decode cluster 1 (2052) are directed. In this example, queues 2034 and 2054 store decoded instructions in the form of micro-operations (uops). In some embodiments, the decoding of each of the data elements of prefetch buffer 2030 that are directed to decode cluster 0 (2032) may generate a single uop in queue 2034. In other embodiments, for at least some of the data elements that are directed to decode cluster 0 (2032), the decoding may generate two or more uops in queue 2034. Similarly, in some embodiments the decoding of each of the data elements of prefetch buffer 2050 that are directed to decode cluster 1 (2052) may generate a single uop in queue 2054. In other embodiments, for at least some of the data elements that are directed to decode cluster 1 (2052), the decoding may generate two or more uops in queue 2054. As illustrated this example, as a result of a decoding operation, uops may be directed to queues 2034 and/or 2054 from the decode clusters 2032 and/or 2052 themselves, or from uROM 2045, depending on whether or not a result of a previous decoding operation for the same instruction is available in uROM 2045.

Front end 2010 may also include a merging component 2060. Merging component 2060 may include hardware circuitry or logic to merge the outputs of decode cluster 0 (2032) and decode cluster 1 (2052) in queues 2034 and 2054, respectively, to produce an ordered sequence of decoded instructions. Following the merging of the outputs of decode cluster 0 (2032) and decode cluster 1 (2052), the order of the decoded instructions in the sequence of decoded instructions may reflect the program order of the corresponding undecoded instructions that were directed to the decode clusters through their respective prefetch buffers. In this example, the in-order sequence of decoded instructions generated by merging component 2060 may be provided to an allocation and register renaming stage (shown as allocator/renamer 2070) of a processor core back end that also includes one or more execution units to execute the instructions.

In some embodiments of the present disclosure, splitter circuitry in the front end of the processor may operate to being directing data elements representing undecoded instructions to one of the decode clusters (or a queue that feeds the decode cluster) until a trigger condition indicating that the splitter should begin directing data elements to a different decode cluster (or queue that feeds the other decode cluster). In at least some embodiments, groups of data elements that are directed to one of the clusters may include contiguous data elements in program order beginning and ending at known instruction boundaries. Some processor ISAs include variable-length instructions, in which it may not be easy to determine such boundaries. In one embodiment, the cluster switching trigger condition may include detecting a predicted taken branch. In another embodiment, detecting the cluster switching trigger condition may include detecting a particularly long instruction (e.g., one that is represented by a large number of data elements in the instruction stream). This condition may trigger a switch to another decode cluster immediately before or after the data elements for the long instruction are directed to one of the decode clusters. In some ISAs, it may be guaranteed that the instruction stream includes an instruction boundary at least as often as a predetermined number of data elements has been received in the instruction stream. For example, in one ISA, an instruction boundary may be guaranteed in the instruction stream at least after every 32 bytes in the instruction stream. In this example, detecting the cluster switching trigger condition may include counting the number of bytes that are directed to each decode cluster and switching to another decode cluster each time 32 bytes, or a multiple of 32 bytes, has been directed to one of the decode clusters. In still other embodiments, other mechanisms may be used to identify instruction boundaries or other known good points in the instruction stream at which to switch to a different decode cluster. For example, in one embodiment, the data elements that represent undecoded instructions may be tagged with encoding indicating whether or not they are candidates for a cluster switching point by instruction pointer generation logic in the front end of the processor, and detecting the cluster switching trigger condition may include detecting an encoding identifying the data element as a candidate for a cluster switching point.

In various embodiments, the systems and methods described above for performing out-of-order clustered decoding may address issues in performance, frequency, and scalability. However, in embodiments in which the workload is not well balanced between the decode clusters, the performance of these systems may fall short of expectations. For example, systems that implement out-of-order clustered decoding may experience latency asymmetry. While the average performance of these systems may be acceptable in most cases, the performance of the systems due to a lack of load balancing for the clustered decoders under particular workloads may be more pronounced. In at least some embodiments of the present disclosure, load balancing implemented at the point of instruction pointer (IP) generation may help out-of-order clustered decoding implementations maximize the up-time of the decode hardware and the effective bandwidth of the clustered front end. In at least some embodiments, the load balancing mechanisms described herein for out-of-order clustered decoding may be implemented fully or partially in hardware circuitry or logic in the processor front end.

In various embodiments, different types of hardware circuitry or logic may be implemented for load balancing in out-of-order clustered decoding. For example, in some embodiments, cluster balancing circuitry may implement a back-pressure heuristic that depends on sufficient queuing throughout the processor core's execution pipeline to function correctly. In other embodiments, cluster balancing circuitry may employ, or take advantage of, branch predictor hardware to drive the assignment of undecoded instructions to particular decode clusters. These assignments may be made in a manner that attempts to balance the workloads of the decode clusters and/or to keep all of the decode clusters operating with full, or nearly full, input queues. In some embodiments, the cluster balancing circuitry may augment existing branch target buffer (BTB) entries for predicted taken branches with extra meta-data data to force or increase decode parallelism. In some embodiments, the cluster balancing circuitry may insert entries representing "fake predicted taken branches" and may augment these entries with meta data to force or increase decode parallelism.

In at least some embodiments, it may be important to track the absolute or relative ages of the blocks of instructions that are decoded by the different decode clusters for the use of any hardware circuitry or logic in the processor that relies on the instructions on which it operated being in program order. This may include, but is not limited to, hardware circuitry or logic to perform the re-ordering of the out-of-order stream of decoded instructions prior to in-order allocation and rename. In some embodiments, given that taken macro branches can no longer be used to implicitly track the age of each block of instructions, the block dispatcher in the IP generator may pass state associated with the explicit toggle points (i.e., the points at which a switch is made in the decode cluster to which instruction pointer values representing undecoded instruction are directed) regardless of the mechanism employed to determine when and whether to switch clusters. In some embodiments, this state information, rather than taken branch information, may be used further downstream in the execution pipeline to track block age.

Figure 21:
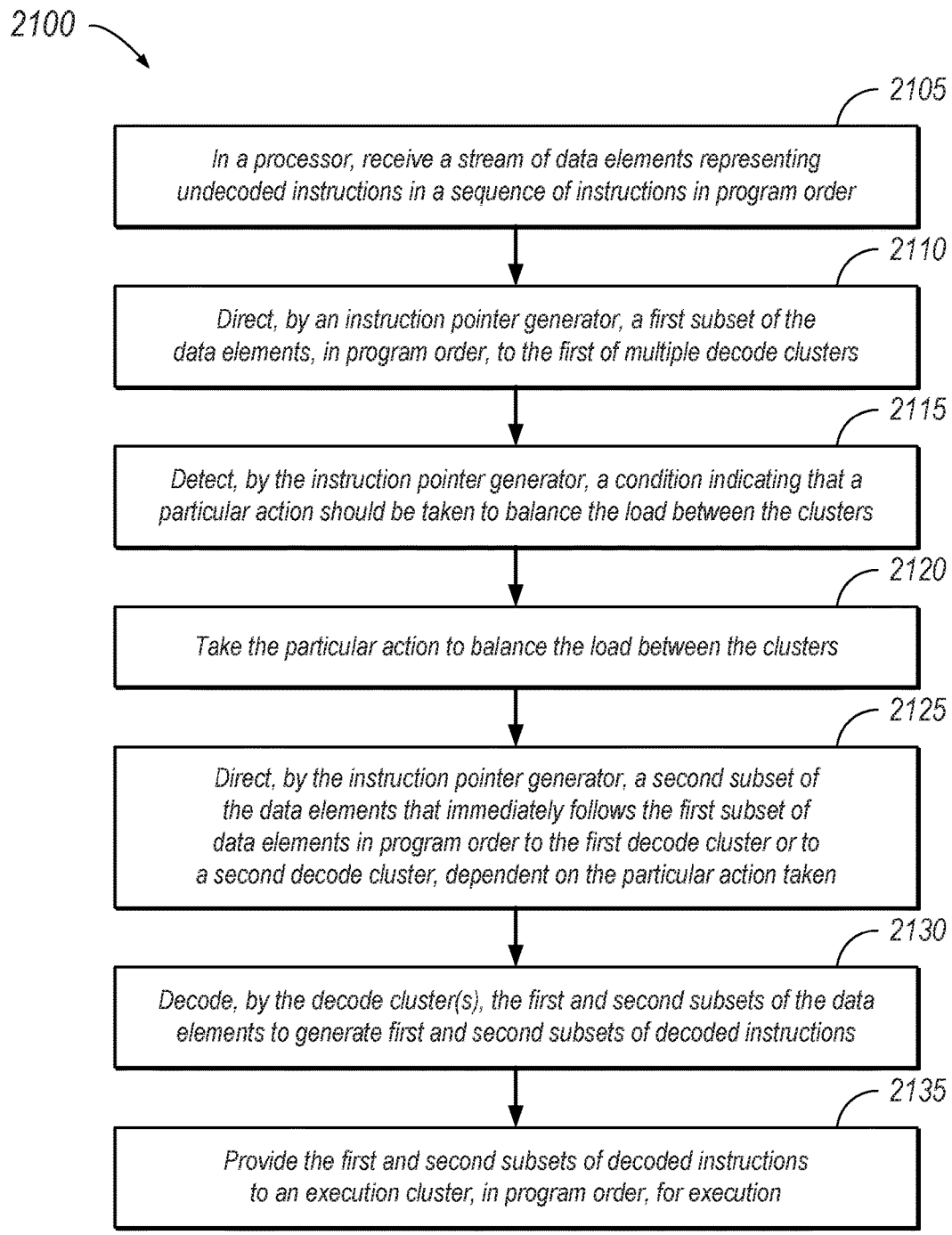
FIG. 21 is an illustration of a method for applying load balancing to out-of-order clustered decoding, according to embodiments of the present disclosure.

FIG. 21 is an illustration of a method for 2100 applying load balancing to out-of-order clustered decoding, according to embodiments of the present disclosure. Method 2100 may be implemented by any of the elements shown in FIGS. 1-20 or FIG. 22. Method 2100 may be initiated by any suitable criteria and may initiate operation at any suitable point. In one embodiment, method 2100 may initiate operation at 2105. Method 2100 may include greater or fewer operations than those illustrated. Moreover, method 2100 may execute its operations in an order different than those illustrated below. Method 2100 may terminate at any suitable operation. Moreover, method 2100 may repeat operation at any suitable operation. Method 2100 may perform any of its operations in parallel with other operations of method 2100, or in parallel with operations of other methods. Furthermore, method 2100 may be executed multiple times apply a load balancing mechanism to the assignment of different blocks of undecoded instructions to decode clusters in a system that implements out-of-order clustered decoding. Method 2100 may be executed over time during operations to apply a load balancing mechanism when decoding instructions to implement one or more applications. Based upon the results of method 2100, other methods may be invoked, such as method 2700, described below. For example, method 2700 may be invoked to decode the instruction information that is directed to particular decode clusters by the execution of method 2100, and to provide the results to an execution cluster of a processor core back end for execution.

At 2105, in one embodiment, a stream of data elements representing undecoded instructions in a sequence of instructions in program order may be received in a processor. At 2110, an instruction pointer generator may direct a first subset of the data elements, in program order, to the first of multiple decode clusters in the processor. At 2115, the instruction pointer generator may detect a condition indicating that a particular action should be taken to balance the load between the clusters. Various examples of these load balancing actions are described in more detail below, according to some embodiments. At 2120, in response to the detection of this condition, the particular action to balance the load between the clusters may be taken.

At 2125, the instruction pointer generator may direct a second subset of the data elements that immediately follows the first subset of data elements in program order to the first decode cluster or to a second decode cluster, dependent on the particular action taken. For example, if the detected condition indicates that a cluster switch is to take place, the instruction pointer generator may direct the second subset of the data elements to the second decode cluster. In another example, if the detected condition indicates that a cluster switch is to be suppressed, the instruction pointer generator may direct the second subset of the data elements to the first decode cluster, regardless of whether or not another condition associated with the first or second subsets of the data elements would otherwise trigger a cluster switch.

At 2130, the decode cluster or clusters to which the first and second subsets of the data elements were directed may decode those subsets of the data elements to generate first and second subsets of decoded instructions, respectively. At 2135, the first and second subsets of decoded instructions may be provided to an execution cluster of a processor core back end, in program order, for execution. In cases in which the first and second subsets of the data elements were decoded by different decode clusters, this may include merging subsets of decoded instructions obtained from the respective output queues of the decode clusters to generate a sequence of decoded instructions that reflects the program order of the corresponding undecoded instructions.

As described above, in at least some embodiments of the present disclosure, the fetch and decode pipelines of the processor may include a queuing point after the point at which the instruction cache is read. One or more queues at this point in the execution pipeline may, at least temporarily, hold raw cache lines and/or raw bytes along with other state information. For example, there may be a respective prefetch buffer associated with each decode cluster that holds data elements to be decoded by the decode cluster, at least some of which may be obtained from the instruction cache. In some embodiments, these prefetch buffers may be may be similar to, and may implement the functionality of, prefetch buffers 2030 and 2050 illustrated in FIG. 20. In at least some embodiments, another queue or parallel set of queues, depending on the microarchitecture, may exist after the decode stage of the execution pipeline, but before the allocation and renaming stage. One such post-decode queue may be implemented per decode cluster in systems that perform out-of-order clustered decode. For example, each of these decoded instructions queues may store uops that have been output by a respective one of the decode cluster, allowing the out-of-order uops to be read from these queues and put back in program order prior to passing them to the allocation and renaming stage. In some embodiments, these decoded instructions queues, which may sometimes be referred to as "uop queues", may be similar to, and may implement the functionality of, decoded instructions queues 2034 and 2054 illustrated in FIG. 20. In some embodiments, the processor may also include a respective queue per cluster prior to the fetch stage that, at least temporarily, holds instruction pointer addresses fed from the branch predictor. In some embodiments, these queues be may be similar to, and may implement the functionality of, branch prediction queues 2022 and 2024 illustrated in FIG. 20.

In systems that implement out-of-order clustered decoding, but that do not include cluster balancing mechanisms, work may be assigned to each of the decode clusters in a round robin fashion and cluster switches may occur only on predicted taken branches. In one example, when a high performance, yet imbalanced stream of instructions, is fetched and decoded in a processor that includes two decode clusters, the decoded instructions queue of the first cluster may drain away while the decoded instructions queue of the second cluster may be full, or nearly so. This may occur when the first cluster, whose performance is limited by its width, has been assigned too much of the workload. In this case, since the decode latency of the first cluster is high, the prefetch buffer associated with the first cluster will fill up, as will the branch prediction queue associated with the first cluster. On the other hand, the prefetch buffer and branch prediction queue for the second cluster, which has been assigned too little of the workload, are able to drain and may be empty or near empty. More specifically, this scenario may occur when the in-order IP generation circuitry or logic that feeds the branch prediction queues stalls due to the branch prediction queue associated with the first cluster becoming full.

In some embodiments of the present disclosure in which load balancing is applied in out-of-order clustered decoding, cluster balancing hardware or logic may track the state of the queues in the execution pipeline. For example, the occupancy level of a queue, the rate at which a queue is filled, or the rate at which a queue is drained may be detected by hardware at the queue and an indication of this information may be provided to, and tracked by, circuitry or logic at the IP generation point of the fetch and decode pipeline. In some such embodiments, cluster balancing performed at the IP generation point may include comparing the state of one or more queues against each another. In embodiments in which the branch prediction queues are deep, the cluster balancing mechanism may be dependent solely, or largely, on the absolute or relative occupancies of the branch prediction queues associated with each decode cluster. In some embodiments, the processor may include two decode clusters and the IP generation circuitry or logic may send a toggle indication (e.g., it may assert a toggle bit) to force a cluster switch when attempting to balance the workload between the two decode clusters. In embodiments in which the processor includes more than two clusters, such a toggle bit may be accompanied by an indication of the cluster assignment (e.g., a cluster ID) for the next block of instructions to be decoded. This may allow a dispatcher within the IP generation circuitry or logic to assign blocks however necessary to balance the workload between all of the decode clusters, rather than operating solely in a round robin fashion. In one example, if the occupancy of the branch prediction queue associated with the first decode cluster exceeds a threshold while the occupancy of the branch prediction queue associated with the second decode cluster does not exceed this threshold, the dispatcher may suppress a natural toggle point (e.g., a point corresponding to a predicted taken branch or other block boundary) while directing undecoded instructions to the second decode cluster. This may cause two consecutive blocks (in program order) to be directed to the second decode cluster, rather than one of the blocks being directed to each of the decode clusters, which may serve to better balance the workload between the decode clusters.

In some systems, the branch prediction queue depth may be too shallow to allow the IP generation circuitry or logic to respond quickly enough to prevent performance degradation due to an imbalanced decode workload. For example, in some CISC architectures, the number of uops mapped to each of the raw instruction bytes fed to the decoders may be highly variable. In some such embodiments, information from queuing points further downstream in the execution pipeline may be used when determining when and whether to apply a cluster load balancing action. In one embodiment, the earliest warning may be obtained as feedback from the decoded instructions queue at the end of the fetch and decode pipeline. In such an embodiment, when the decoded instructions queue associated with one of the decode clusters drains faster than the decoded instructions queue associated with the other decode cluster, the workload may be imbalanced and the dispatcher within the IP generation circuitry or logic may bias away from the decode cluster whose decoded instructions queue is draining faster. In some embodiments, similar information obtained from a queuing point in the middle of the fetch and decode pipeline, such as the prefetch buffers associated with each of the decode clusters, may also be considered when determining when and whether to apply a cluster load balancing action, and the use of this additional information may raise the confidence level of the applied bias. In some embodiments, due to the lag between effecting a change in the cluster assignment biasing at the IP generation point and seeing the effects of this change in the downstream queues, a triggered bias action may be configured to prevent further bias actions for a period sufficient to ensure that a desired change has taken effect. In some embodiments, this may be determined by measuring and tracking deallocations from one or more of the queues.

Figure 22:
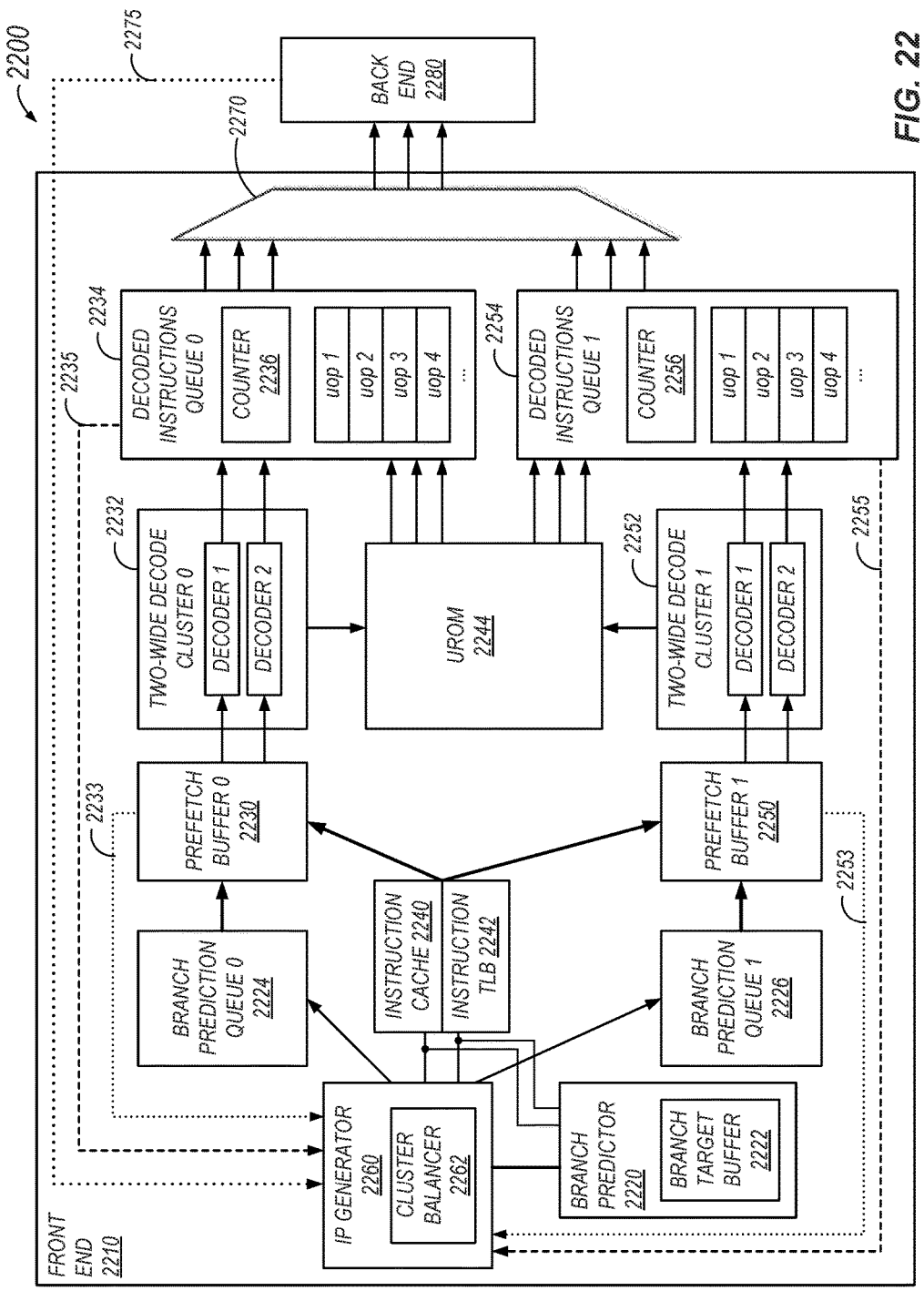
FIG. 22 is an illustration of an example processor core for applying load balancing in out-of-order clustered decoding, according to embodiments of the present disclosure.

FIG. 22 is an illustration of an example processor core 2200 for applying load balancing in out-of-order clustered decoding, according to embodiments of the present disclosure. In the example embodiment illustrated in FIG. 22, processor core 2200 includes a processor core front end 2210 and a processor core back end 2280. Front end 2210 includes an instruction pointer (IP) generator 2260, which includes a cluster balancer 2262, a branch predictor 2220, which includes a branch target buffer (BTB) 2222, and a merging component 2270. In various embodiments, branch predictor 2220 may be similar to, and may implement the functionality of, branch prediction unit 432 in FIG. 4B, branch prediction unit 1535 illustrated in FIG. 15, or branch predictor 2020 illustrated in FIG. 20 and described above. In some embodiments, merging component 2270 may be similar to, and may implement the functionality of, merging component 2060 illustrated in FIG. 20 and described above.

In this example embodiment, front end 2210 also includes a microcode ROM (shown as uROM 2244), an instruction cache 2240, and an instruction translation lookaside buffer (TLB) 2242. In some embodiments, uROM 2244 may be similar to, and may implement the functionality of, uROM 2045 illustrated in FIG. 20 and described above. In some embodiments, instruction cache 2240 may be similar to, and may implement the functionality of, instruction cache unit 434 illustrated in FIG. 4B or instruction cache 2040 illustrated in FIG. 20 and described above. In some embodiments, instruction TLB 2242 may be similar to, and may implement the functionality of, instruction TLB 436 illustrated in FIG. 4B.

In the example embodiment illustrated in FIG. 22, front end 2210 also includes two two-wide decode clusters (shown as decode clusters 2232 and 2252), each of which is associated with a prefetch buffer (shown as prefetch buffers 2230 and 2250, respectively), a branch prediction queue (shown as branch prediction queues 2224 and 2226, respectively), and a decoded instructions queue (shown as decoded instructions queues 2234 and 2254, respectively). In some embodiments, decode clusters 2232 and 2252 may be similar to, and may implement the functionality of, decode clusters 2032 and 2052 illustrated in FIG. 20 and described above. In some embodiments, prefetch buffers 2230 and 2250 may be similar to, and may implement the functionality of, prefetch buffers 2030 and 2050 illustrated in FIG. 20 and described above. In some embodiments, branch prediction queues 2224 and 2226 may be similar to, and may implement the functionality of, branch prediction queues 2022 and 2024 illustrated in FIG. 20 and described above. In some embodiments, decoded instructions queues 2234 and 2254 may be similar to, and may implement the functionality of, decoded instructions queues 2034 and 2054 illustrated in FIG. 20 and described above.

As illustrated in this example embodiment, the inputs to IP generator 2260, or to cluster balancer 2262 thereof, may include information obtained from branch predictor 2220, such as one or more branch target buffer entries. The inputs to IP generator 2260, or to cluster balancer 2262 thereof, may also include feedback 2275 from back end 2280. This feedback may include, for example, an indication of the execution latency of individual blocks of instructions decoded by decode cluster 2232 or decode cluster 2252. The inputs to IP generator 2260, or to cluster balancer 2262 thereof, may also include feedback from decoded instructions queues 2234 and 2254, shown as feedback 2235 and 2255, respectively. This feedback may include, for example, the occupancy level of the queue, the rate at which the queue is filled, the rate at which the queue is drained, or a count of the number of uops provided to back end 2280 from the queue for individual blocks of instructions decoded by the corresponding decode cluster, in different embodiments. The count of the number of uops provided to back end 2280 from the queue for each individual block of instructions may be reflected in the value of the respective counter in the decoded instructions queues 2234 and 2254 (shown as counters 2236 and 2256, respectively).

The inputs to IP generator 2260, or to cluster balancer 2262 thereof, may also include feedback from prefetch buffers 2230 and 2250, shown as feedback 2233 and 2253, respectively. This feedback may include, for example, the occupancy level of the queue, the rate at which the queue is filled, or the rate at which the queue is drained, in different embodiments. In some embodiments, the inputs to IP generator 2260, or to cluster balancer 2262 thereof, may include feedback from branch prediction queues 2224 and 2226 (not shown in FIG. 22). This feedback may include, for example, the occupancy level of the queue, the rate at which the queue is filled, or the rate at which the queue is drained, in different embodiments. In some embodiments, the inputs to IP generator 2260, or to cluster balancer 2262 thereof, may also include feedback from decode clusters 2232 and 2252 (not shown in FIG. 22). This feedback may include, for example, an indication of the decode latency for a block of instructions, in some embodiments. In various embodiments, the feedback received from back end 2280 or from any of the other components of front end 2210 may be used to inform cluster balancing decisions, as described in detail herein.

As illustrated in this example embodiment, IP generator 2260 may be coupled to instruction cache 2240 and/or to instruction TLB 2242, and may obtain information from one or both of these component of front end 2210 that may be used to inform cluster balancing decisions, as described herein. In some embodiments, branch predictor 2220 may be coupled to instruction cache 2240 and/or to instruction TLB 2242 and may exchange information with one or both of these components to inform branch predictions.

A heuristic-based form of decode cluster load balancing, such as that described above, may work well to prevent imbalances between decode clusters in the face of high instructions-per-cycle workloads that loop through multiple basic blocks having uneven uop counts whose beat patterns align to the number of decode clusters in the processor. For example, one such workload may include a loop in which a long basic block (which includes 12 uops) is followed by a short basic block (which includes 4 uops) with taken branches in between. In this example, the processor on which the loop is executing includes two decode clusters, each of which includes two decoders, and a four-wide backend (execution core). The loop may be capable of running at four instructions per cycle. However, without load balancing, whichever decode cluster is initially assigned to decode the first basic block (cluster A) will always be assigned to decode the first basic block as the loop is executed, and the other decode cluster (cluster B) will always be assigned to decode the second basic block. In this example, the performance of the loop may be closer to two instructions per cycle than to four instructions per cycle, with decode cluster A being the bottleneck impeding performance.

In this example, if the cluster balancing mechanisms described herein are applied, a dispatcher within the IP generation circuitry or logic may detect, based on feedback received from the decoded instructions queues associated with each of the decode clusters, that the decoded instructions queue associated with cluster A is draining faster than the decoded instructions queue associated with cluster B. However, multiple consecutive 12 uop sequences remain sitting in the prefetch buffer associated with cluster A and are not flushed. In at least some embodiments in which the IP generator includes a cluster balancer, the cluster balancer may cause the dispatcher to bias toward decode cluster B by suppressing the toggle action that would otherwise be caused by the next predicted taken branch when writing into the branch prediction queue associated with cluster B. At this point, further bias actions may be, at least temporarily, blocked. This load balancing action causes the dispatcher to assign both the 4 uop block and next 12 uop block to be assigned to cluster B. Subsequently, the dispatcher may continue to assign basic blocks in a round robin fashion, assigning the 4 uop blocks to cluster A and the 12 uop blocks to cluster B. Once enough blocks have deallocated to reduce the pressure on cluster A, the bias logic may be re-enabled. Eventually, as the cluster balancer detects that the decoded instructions queue associated with cluster B starts draining faster than that of cluster A, a second load balancing action may be triggered to bias toward cluster A by again suppressing the toggle action that would otherwise take place between the blocks. In some embodiments, with sufficient depth in each uop queue and ample work in the queues prior to the high instructions-per-cycle portion of the workload, this example workload may be able to reach its upper limit of four instructions-per-cycle.

The cluster balancing algorithm described above is one of a variety of potential algorithms that may be implanted by a cluster balancer within an IP generator to perform load balancing in a clustered out-of-order fetch and decode pipeline. In at least some embodiments of the present disclosure, at a minimum, a "toggle" bit may be sent from the IP generator, through the pipeline, along with the data representing each basic block so that the blocks passing through the decode clusters can be properly aged. In embodiments in which there are many decode clusters (e.g., three or more), the IP generator may, based on an algorithm implemented by the cluster balancer, attach a target cluster ID along with the toggle bit, which may allow the dispatcher to assign basic blocks to the decode clusters in a manner other than an implicit round robin scheme.

While, in many cases, the cluster balancing scheme described above may work well to balance what would otherwise be imbalanced workloads, this approach depends on the presence of predicated taken branches. However, some workloads, such as those including long unrolled loops of vectorized code, for example, may have many tens of instructions prior to a taken branch. In order to balance this type of workload using the cluster balancing algorithm described above would require queues much larger than would be practical in typical processor designs. A second approach, described below, may be better suited for balancing this and other types of workloads.

In this second cluster balancing approach, circuitry or logic may be added to the end of each decode pipeline to track the number of uops delivered from the corresponding decode cluster to the back end, or to an execution cluster thereof, per assigned block. In one example embodiment, this circuitry may include a 5-bit counter whose value reflects the number of uops delivered per block when the number of delivered uops is less than 32. In this example embodiment, blocks from which 32 uops or more are delivered to the core are assigned a value of 0x0. The value of this counter is sent into the back-end of the machine along with information about taken branches for the block, and a corresponding entry in the BTB is updated if the value varies from the previous count value by predetermined amount (e.g., a programmable threshold amount). Under this approach, uop count information may be sent from the BTB down the decode pipeline in order to suppress unnecessary updates to the BTB. In this example, count values annotated into entries in the BTB may have an initial value of 0x0.

In this example embodiment, when and if the number of uops delivered within a block exceeds a threshold value (e.g., a threshold value that is less than 32 and is programmable), a "fake" taken branch may be inserted into the BTB. This fake branch may be given a branch type encoding within the BTB that is unique to fake branches so as to not trigger bogus branch behavior. Here, the term "bogus branch" may refer to a predicted taken branch on a non-branch, which may typically occur due to alias issues in the BTB. When bogus branches are detected, the prediction in the BTB may be invalidated. By contrast, a "fake branch" indication may be passed down the decode pipeline and, as is done with predicted taken branch updates, the fake branch entry in the BTB may be annotated with the final uop count (or with a value of 0x0 if the final uop count exceeds 32) and may include as the target address the next sequential instruction pointer. Unlike in an entry for a normal ("real") predicted taken branch, the allocation point for a fake branch may be prior to instruction execution (e.g., at the branch address calculation point, in some embodiments). In some embodiments, in a variation of this second cluster balancing approach, fake branch insertion may be restricted to blocks that hit in the instruction cache. In such embodiments, another piece of state may be carried with a block from prediction time through to the end of the decode pipeline. In yet another variation, this cluster balancing approach may be approximated by simply tracking that there have been recent instruction cache misses.

In some embodiments of the present disclosure, by employing fake branches when balancing workloads that include long basic blocks (and microcode flows), and by employing an added field in the BTB in which to annotate block latency, the dispatcher with the IP generator may rely entirely on the BTB to provide information needed to perform cluster load balancing with near optimal balancing.

While consuming entries within the BTB for cluster balancing purposes can, when considered in isolation, negatively affect performance, there may be very little impact on performance for workloads with long basic blocks due to their BTB pressure being lower than is typical. For example, systems that include large processors may employ out-of-order clustered decoding in order to keep the execution core(s) fed. Systems that include this class of processor may typically include a BTB that is close to the size of the instruction cache For example, the BTB may include on the order of 2 k entries. In such systems, the addition of a few bits per entry may not be significant in terms of area or performance.

Figure 23:
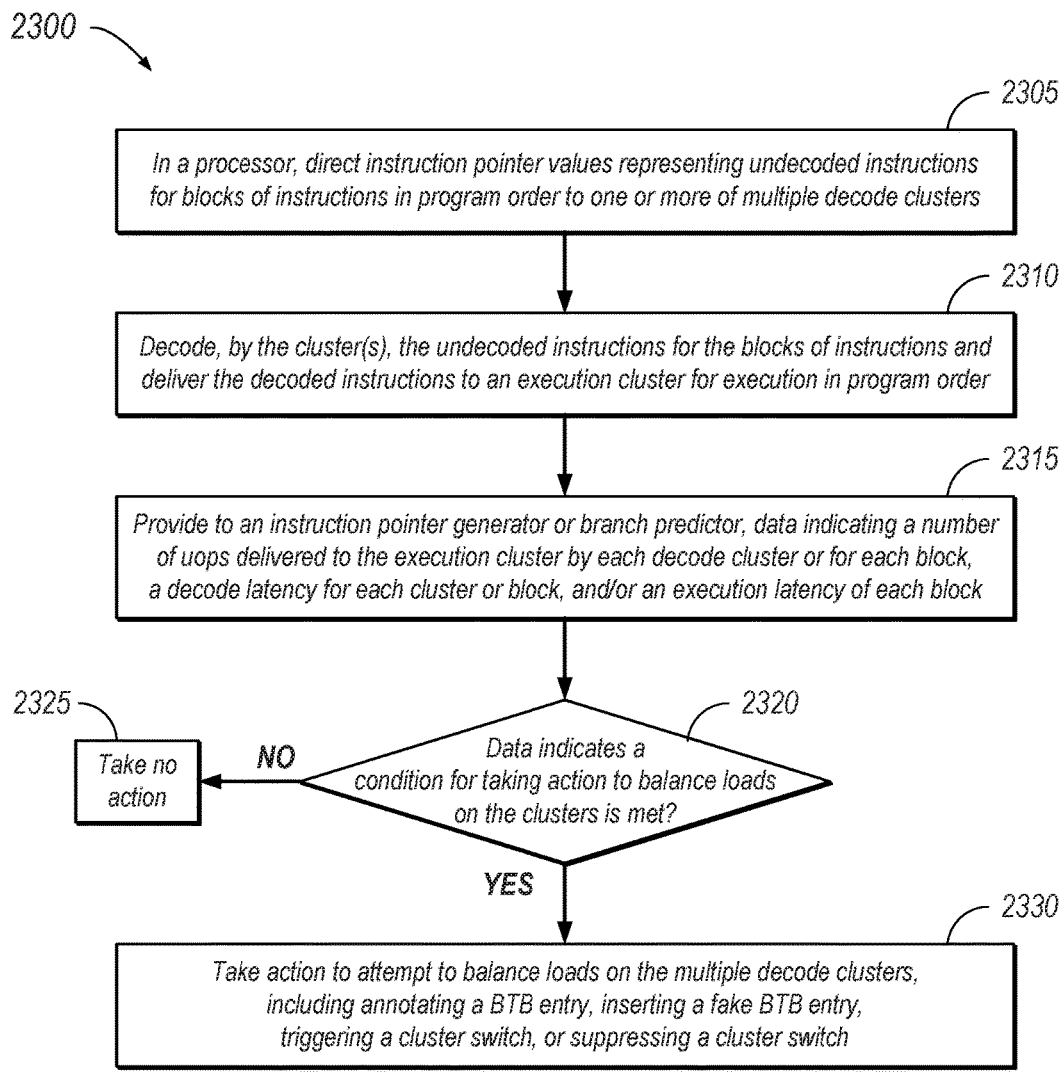
FIG. 23 is an illustration of a method for generating a load-balancing trigger condition for out-of-order clustered decoding, according to embodiments of the present disclosure.

FIG. 23 is an illustration of a method 2300 for generating a load-balancing trigger condition for out-of-order clustered decoding, according to embodiments of the present disclosure. Method 2300 may be implemented by any of the elements shown in FIGS. 1-22. Method 2300 may be initiated by any suitable criteria and may initiate operation at any suitable point. In one embodiment, method 2300 may initiate operation at 2305. Method 2300 may include greater or fewer operations than those illustrated. Moreover, method 2300 may execute its operations in an order different than those illustrated below. Method 2300 may terminate at any suitable operation. Moreover, method 2300 may repeat operation at any suitable operation. Method 2300 may perform any of its operations in parallel with other operations of method 2300, or in parallel with operations of other methods. Furthermore, method 2300 may be executed multiple times to generate load-balancing trigger conditions for out-of-order clustered decoding of multiple collections of data elements representing undecoded blocks of instructions. Method 2300 may be executed over time during operations to generate load-balancing trigger conditions when decoding instructions to implement one or more applications. Based upon the results of method 2300, other methods may be invoked, such as method 2700, described below. For example, method 2700 may be invoked to decode the instruction information that is directed to particular decode clusters based on the execution of method 2300, and to provide the results to an execution cluster of a processor core back end for execution.

At 2305, in one embodiment, instruction pointer values representing undecoded instructions for blocks of instructions in program order may be directed to one or more of multiple decode clusters in a processor. At 2310, the cluster or clusters to which the instruction pointer values are directed may decode the undecoded instructions for the blocks of instructions and deliver the decoded instructions to an execution cluster of a processor core back end, in program order, for subsequent execution. At 2315, data from one or more downstream components of the execution pipeline, such as data indicating the number of uops delivered to the execution cluster by each decode cluster or for each block, a decode latency for each cluster or block, and/or an execution latency of each block, may be provided to an instruction pointer generator or branch predictor. At 2320, it may be determined whether or not this data indicates that a condition for taking action to balance the loads on the decode clusters is met. If not, no load balancing actions are taken, as in 2325. If so, method 2300 continues at 2330. At 2330, action may be taken to attempt to balance the loads on the multiple decode clusters. In various embodiments, this action may include, but is not limited to, annotating a BTB entry with meta-data usable in determining that a cluster switch should be triggered or suppressed, inserting a fake BTB entry, explicitly triggering a cluster switch, or explicitly suppressing a cluster switch.

Figure 24:
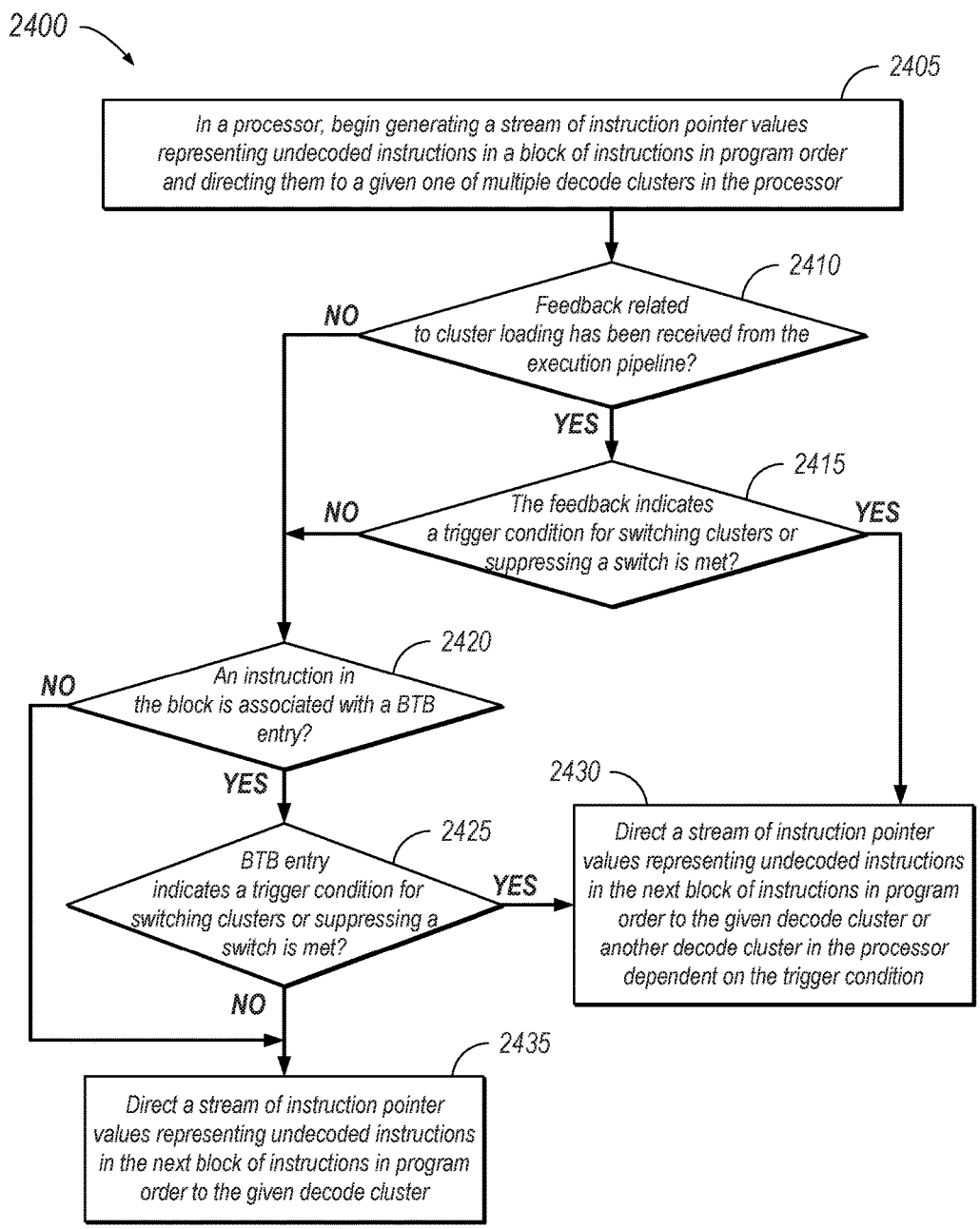
FIG. 24 is an illustration of a method for performing out-of-order clustered decoding dependent on a load-balancing trigger condition, according to embodiments of the present disclosure.

FIG. 24 is an illustration of a method 2400 for performing out-of-order clustered decoding dependent on a load-balancing trigger condition, according to embodiments of the present disclosure. Method 2400 may be implemented by any of the elements shown in FIGS. 1-23. Method 2400 may be initiated by any suitable criteria and may initiate operation at any suitable point. In one embodiment, method 2400 may initiate operation at 2405. Method 2400 may include greater or fewer operations than those illustrated. Moreover, method 2400 may execute its operations in an order different than those illustrated below. Method 2400 may terminate at any suitable operation. Moreover, method 2400 may repeat operation at any suitable operation. Method 2400 may perform any of its operations in parallel with other operations of method 2400, or in parallel with operations of other methods. Furthermore, method 2400 may be executed multiple times to perform out-of-order clustered decoding dependent on a load-balancing trigger condition when decoding multiple collections of data elements representing undecoded blocks of instructions. Method 2400 may be executed over time during operations to decode instructions to implement one or more applications. Based upon the results of method 2400, other methods may be invoked, such as method 2700, described below. For example, method 2700 may be invoked to decode the instruction information that is directed to particular decode clusters based on the execution of method 2400, and to provide the results to an execution cluster of a processor core back end for execution.

At 2405, in one embodiment, hardware circuitry or logic within a processor may begin generating a stream of instruction pointer values representing undecoded instructions in a block of instructions in program order and directing them to a given one of multiple decode clusters in the processor. At 2410, if it is determined that feedback related to cluster loading has been received from one or more downstream components of the execution pipeline, method 2400 continues at 2415. Otherwise, method 2400 proceeds to 2420. At 2415, if it is determined that the feedback indicates that a trigger condition for switching between decode clusters or for suppressing a cluster switch has been met, method 2400 continues at 2430. Otherwise, method 2400 proceeds to 2420.

At 2420, if it is determined that an instruction in the block of instruction is associated with a branch target buffer (BTB) entry, method 2400 continues at 2425. Otherwise, method 2400 proceeds to 2435. At 2425, if it is determined that the BTB entry indicates that a trigger condition for switching between decode clusters or for suppressing a cluster switch has been met, method 2400 continues at 2430. Otherwise, method 2400 proceeds to 2435. At 2430, a stream of instruction pointer values representing undecoded instructions in the next block of instructions in program order is directed to the given decode cluster or to another decode cluster in the processor. The decode cluster to which the next block is directed may be dependent on the trigger condition. Alternatively, at 2435, a stream of instruction pointer values representing undecoded instructions in the next block of instructions in program order is directed to the given decode cluster.

FIG. 25 is an illustration of an example branch target buffer 2500 in which entries are annotated with information usable to trigger a load balancing action between decode clusters, according to embodiments of the present disclosure. In this example, branch target buffer 2500 is configured to store information about real and fake predicted taken branches. Branch target buffer 2500 includes at least the five entries shown in detail in FIG. 25. In this example, a first field of each entry (in column 2510) stores data representing a branch instruction address, which is used to access the entry. Another field of each entry (in column 2520) stores data representing a predicted target address for the branch instruction whose address is represented by the data in the first field of the entry. In the case of entries corresponding to fake predicted branches, such as the entries corresponding to branch address C and branch address E in FIG. 25, the data stored in column 2520 may represent the address of the next instruction in program order, rather than a predicted branch address.

In this example embodiment, the third field of each entry (in column 2530) stores data representing a load-balancing weight value. For example, the value in this field may indicate the relative value of data received from downstream components of the execution pipeline indicating the number of uops delivered to the processor core back end, or to an execution cluster thereof, by each cluster or for each block, a decode latency for each cluster or block, and/or an execution latency of each block when compared to one or more threshold values. In one embodiment, a "high" value in this field may indicate that the obtained data may exceed a threshold value for taking a particular load balancing action (such as forcing a cluster switch or suppressing a cluster switch), a "low" value in this field may indicate that the obtained value is less than a threshold value below which a different load balancing action may be taken, and a "medium" value in this field may indicate that no load balancing action should be taken based on the data obtained from downstream components of the execution pipeline. A fourth field in each entry (in column 2535) may be configured to store data representing one or more other tags associated with the corresponding predicted taken branch, in different embodiments. In the example illustrated in FIG. 25, this field stores data indicating whether the corresponding entry represents an actual predicted taken branch (shown as "REAL") or a fake predicted taken branch (shown as "FAKE").

In general, the entries in a branch target buffer, such as branch target buffer 2500, may be annotated with any type of information usable to determine whether and when to switch clusters or suppress a cluster switch that would otherwise be made, or to bias a decision about whether and when to switch clusters or suppress a cluster switch that would otherwise be made. In other embodiments, each entry in branch target buffer 2500 may include more, fewer, or different fields than those illustrated in FIG. 25. In some embodiments, different numbers of fields may be populated within different entries in target buffer 2500. For example, some fields may not be applicable for certain branch instruction encodings. In some embodiments, the types of information that may be included in each entry of a branch target buffer such as branch target buffer 2500 may include numerical data representing uop counts, latency values, instruction cache misses, instruction TLB misses, or any other information that may be indicative of an imbalanced workload between multiple decode clusters. In some embodiments, the data in one or more fields may represent weighting values calculated by the cluster balancer, IP generator, or branch predictor based on a heuristic that is a function of two or more pieces of information obtained from downstream components of the execution pipeline, the branch predicator, the instruction cache, the instruction TLB, or elsewhere. These weighting values may then be compared to one or more threshold weighting values to determine whether and when to take particular load balancing actions. In one example, when an instruction TLB miss occurs, the IP generator may force a cluster switch in order to direct instruction pointer values within the same page to be decoded by the same decode cluster.

In one embodiment, the data in one field included in each entry of a branch target buffer such as branch target buffer 2500 may explicitly indicate that a cluster switch should be performed when the corresponding branch instruction is encountered. A value may be written into this field by the IP generator or the cluster balancer, under particular conditions, to force the cluster switch. In another embodiment, the data in one field included in each entry of a branch target buffer such as branch target buffer 2500 may explicitly indicate that a cluster switch that would otherwise be performed when the corresponding branch instruction is encountered should instead be suppressed. A value may be written into this field by the IP generator or the cluster balancer, under particular conditions, to force the suppression of the cluster switch.

Figure 26:
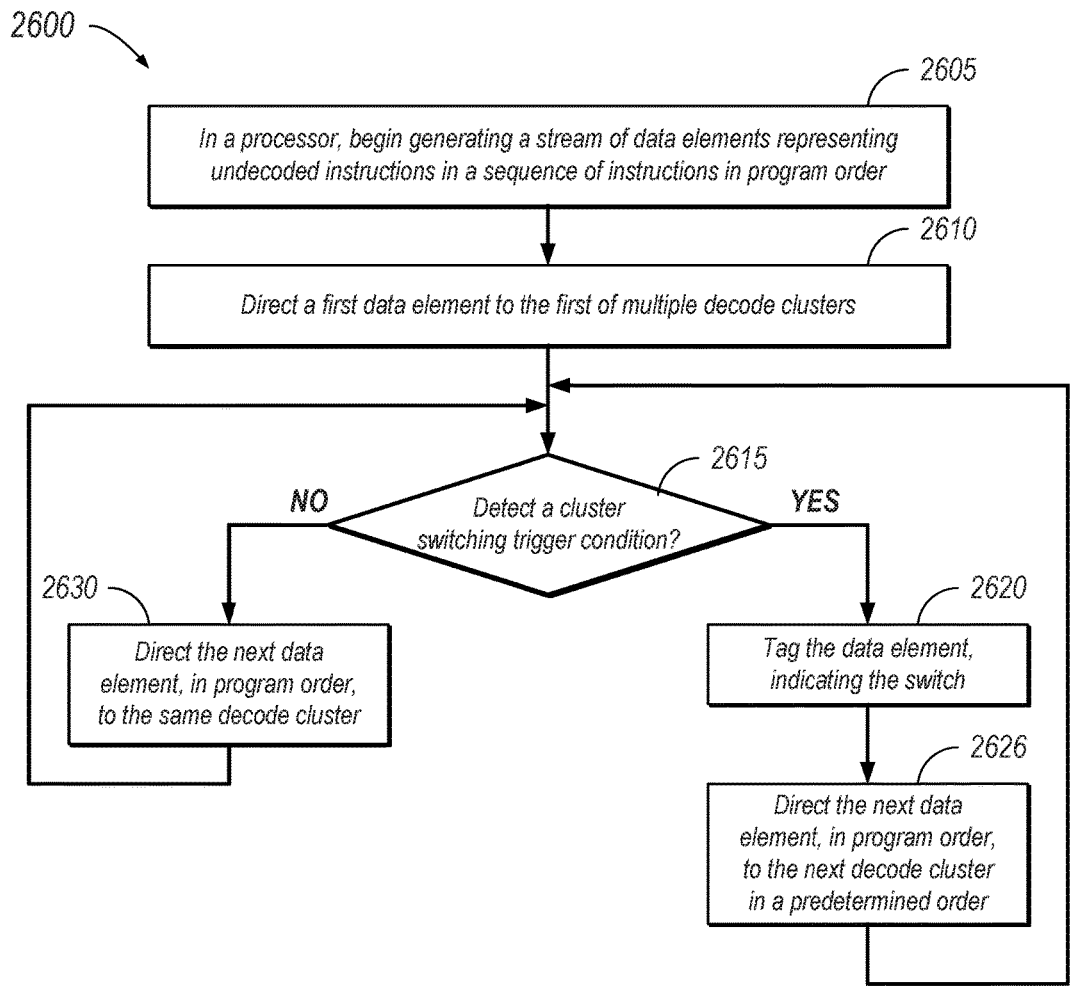
FIG. 26 is an illustration of a method for clustering instruction-related data elements for parallel decoding, according to embodiments of the present disclosure.

FIG. 26 is an illustration of a method 2600 for clustering instruction-related data elements for parallel decoding, according to embodiments of the present disclosure. Method 2600 may be implemented by any of the elements shown in FIGS. 1-25. Method 2600 may be initiated by any suitable criteria and may initiate operation at any suitable point. In one embodiment, method 2600 may initiate operation at 2605. Method 2600 may include greater or fewer operations than those illustrated. Moreover, method 2600 may execute its operations in an order different than those illustrated below. Method 2600 may terminate at any suitable operation. Moreover, method 2600 may repeat operation at any suitable operation. Method 2600 may perform any of its operations in parallel with other operations of method 2600, or in parallel with operations of other methods. Furthermore, method 2600 may be executed multiple times to cluster instruction information for parallel decoding for different streams of undecoded instructions. Method 2600 may be executed over time during operations to decode instructions to implement one or more applications. Based upon the results of method 2600, other methods may be invoked, such as method 2700, described below. For example, method 2700 may be invoked to decode the instruction information that is clustered by the execution of method 2600, and to provide the results to an execution cluster of a processor core back end for execution.

At 2605, in one embodiment, generation of a stream of data elements representing undecoded instructions in a sequence of instructions in program order may begin in a processor. In one embodiment, the data elements may include instruction pointer values. In another embodiment, the data elements may include encodings of instructions in the processor's instruction set architecture (ISA). In yet another embodiment, the data elements may represent instruction-related "text" to be decoded and/or interpreted by the processor to cause instructions in the processor's ISA to be executed. In another embodiment, the data elements may be raw bytes of data to be decoded and/or interpreted by the processor to cause instructions in the processor's ISA to be executed. In some embodiments, each of the data elements representing an undecoded instruction may be the same length. In other embodiments, at least some of the data elements representing undecoded instructions may be of different lengths. At 2610, a first data element in the stream of data elements may be directed to the first of multiple decode clusters.

In one embodiment, at 2615 it may be determined whether a condition to trigger a switch to another decode cluster has been met. If so, method 2600 may proceed to 2620. Otherwise, method 2600 may proceed to 2630. In at least some embodiments, a detected condition to trigger cluster switch may be generated by the IP generated based on the application of a cluster load balancing mechanism. The cluster load balancing mechanism may be any of those described herein or another cluster load balancing mechanism, in different embodiments.

At 2620, since the cluster switching trigger condition was met, the data element may be tagged with information indicating that the cluster switching trigger condition was met. For example, in one embodiment, a toggle bit may be included in the encodings of the data element to indicate whether or not a condition to trigger a switch to another decode cluster has been met. In this example, the toggle bit included in the data element encoding may be set (e.g., to a value of "1" or a value representing "true") to indicate that a condition to trigger a switch to another decode cluster has been met. However, in embodiments in which a switch to another decode cluster may be triggered by a count of the number of bytes that are directed to each decode cluster, if there is a one-to-one correspondence between undecoded instructions and decoded instructions, there may be no need to include such a toggle bit in the data element encoding. Similarly, in embodiments in which a switch to another decode cluster may be triggered by a count of the number of undecoded instructions that are directed to each decode cluster, there may be no need to include such a toggle bit in the data element encodings if an undecoded length indication accompanies each decoded instruction. In another embodiment, the value of another encoding in the data element may be modified to indicate that a condition to trigger a switch to another decode cluster has been met. In still other embodiments, other mechanisms may be used to tag the data element to indicate that a trigger condition for cluster switching has been met. As described herein, any of a variety of trigger conditions may be used to determine when and if to switch to a different decode cluster, in different embodiments. In some embodiments, a single tag value (which may be represented by a flag or a single bit) may be used to indicate that a cluster switch occurred. In other embodiments, the data element may be tagged with different values depending on the condition that triggered the cluster switch. For example, in some embodiments, one tag value may indicate that a cluster switch was triggered by a real predicted taken branch, and another tag value may indicate that a cluster switch was triggered by the insertion of a fake predicted taken branch entry in the BTB. Still other tag values may indicate that a cluster switch was based on a uop count, a count of instruction cache misses, a count of instruction TLB misses, decode latency, or execution latency.

At 2625, the next data element, in program order, may be directed to the next decode cluster in a predetermined order. For example, in embodiments in which there are only two decode clusters, a splitting component, IP generator, or cluster balancer of the processor front end may toggle between the two each time a trigger condition is detected. In embodiments in which there are more than two decode clusters, the splitting component, IP generator, or cluster balancer may rotate between the decode clusters in a round robin fashion, or may direct data elements to particular decode clusters based on a target cluster ID value that is attached, along with a toggle bit, to a data element within a block of instructions. At 2630, the next data element, in program order, may be directed to the same decode cluster. In either case, the method may continue at 2615, and the operations 2615-2630 may be repeated one or more times as undecoded instructions continue to be received and decoded. In at least some embodiments, one or more of operations 2605 through 2630 of method 2600 may be executed in hardware in the front end of a processor core.

In some embodiments, in order to facilitate the reassembly of the decoded instructions in program order prior to providing them to the processor core back end, or to an execution cluster thereof, for execution, decoded instructions that correspond to a cluster switch point may be tagged with an encoding indicating this fact. In some embodiments, a toggle indicator may be encoded into each decoded instruction to indicate whether or not the decoded instruction corresponds to a cluster switch point by the decoder. For example, the value of a single toggle bit encoded in the decoded instruction may be set to "1" if the decoded instruction corresponds to a cluster switch point and may be set to "0" if the decoded instruction does not correspond to a cluster switch point.

In at least some embodiments, when reassembling the decoded instructions in program order, the merging component may receive (or retrieve) decoded instructions (uops) from the respective output queue for each of the decode clusters and may the order in which the uops are to be included in the decoded instruction stream based, at least in part, on the state of a toggle indicator associated with each of the uops. For example, in an embodiment in which the processor core has a three-wide allocation/renaming stage in its execution pipeline, the merging component may receive (or retrieve) three decoded instructions (uops) from each of the output queues and may select three of the uops to be included in a first decoded instruction grouping in the decoded instruction stream. The merging component may place the first available uop in program order in the first position in a grouping of uops to be provided to the core for execution. The merging component may continue to place contiguous uops selected from the output queue from which the first available uop was selected until it encounters a uop whose toggle bit is set or until three uops have been assembled for presentation to the core. If a uop whose toggle bit is set is encountered prior to assembling three uops, the merging component may switch to the next output queue in a predetermined order (e.g., the same order in which decode clusters are filled when a cluster switching condition is detected) to select one or more additional uops for the decoded instruction grouping. In some embodiments, if another uop whose toggle bit is set is encountered following a switch to another output queue, the merging component may switch again to select one or more additional uops for the decoded instruction grouping. In other embodiments, only one output queue switch may be support during the assembly of a single decoded instruction grouping. In such embodiments, the merging component may fill the decoded instruction grouping with uops from an output queue that immediately follow a uop whose toggle bit is set, and may mark these uops as invalid.

In other embodiments, the merging component may select the uops from the respective output queues of the multiple decode clusters using other mechanisms or information about the uops. In some embodiments, the merging component may base its selection and ordering of the uops on other information encoded in the uops. For example, each uop may be encoded with an indication of its age, and the merging component may select uops from the output queues based on their ages and place them in each grouping of decoded instructions by age.

Figure 27:
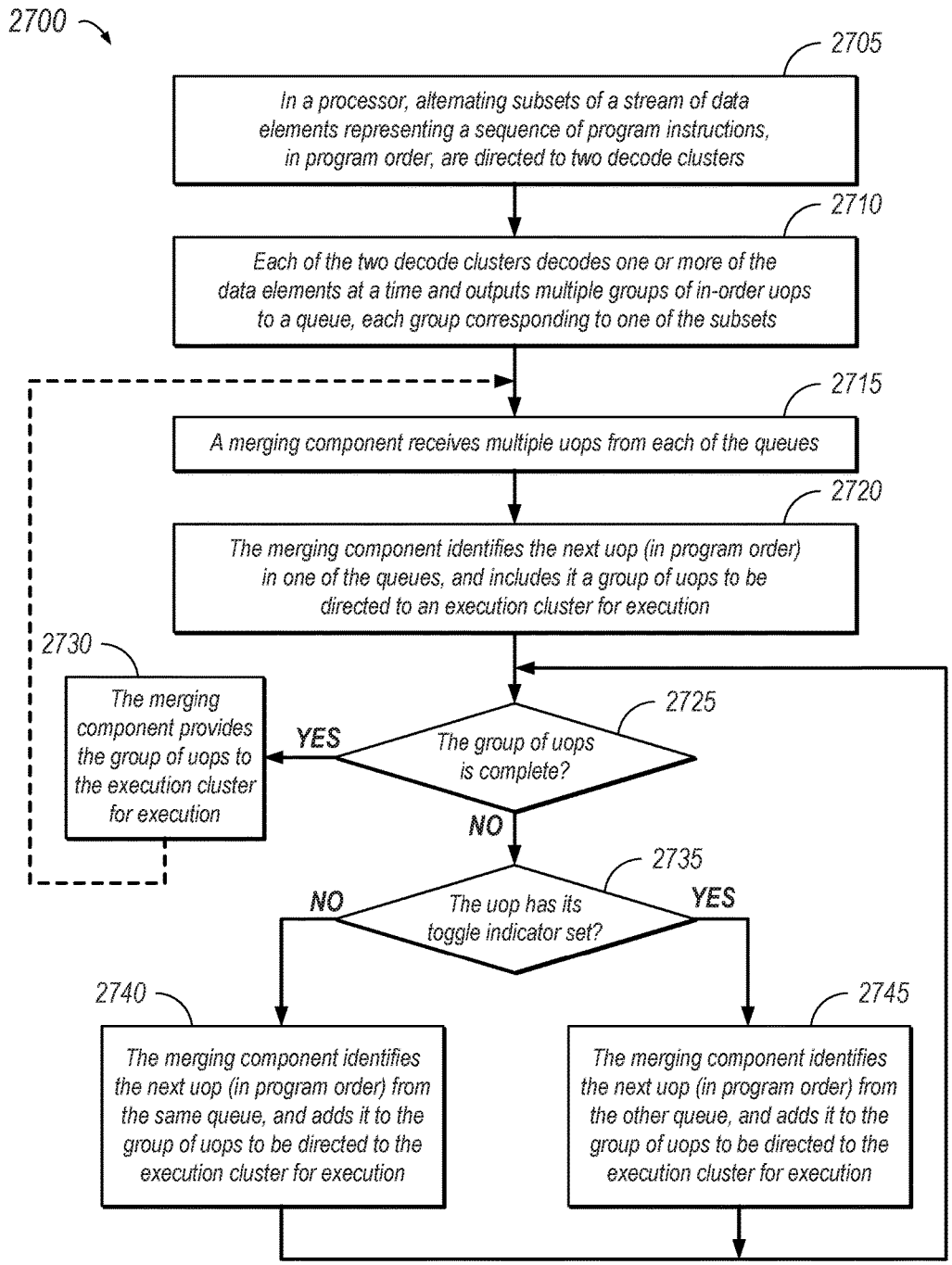
FIG. 27 is an illustration of a method for decoding out-of-order subsets of instruction-related data elements and merging the results to provide an in-order collection of uops to an execution cluster of a processor core back end for execution, according to embodiments of the present disclosure.

FIG. 27 is an illustration of a method 2700 for decoding out-of-order subsets of instruction-related data elements and merging the results to provide an in-order collection of uops to an execution cluster of a processor core back end for execution, according to embodiments of the present disclosure. Method 2700 may be implemented by any of the elements shown in FIGS. 1-26. Method 2700 may be initiated by any suitable criteria and may initiate operation at any suitable point. In one embodiment, method 2700 may initiate operation at 2705. Method 2700 may include greater or fewer operations than those illustrated. Moreover, method 2700 may execute its operations in an order different than those illustrated below. Method 2700 may terminate at any suitable operation. Moreover, method 2700 may repeat operation at any suitable operation. Method 2700 may perform any of its operations in parallel with other operations of method 2700, or in parallel with operations of other methods. Furthermore, method 2700 may be executed multiple times to decode out-of-order subsets of instruction-related data elements for different streams of undecoded instructions, merge the results, and provide them to an execution cluster of a processor core back end for execution. Method 2700 may be executed over time during operations to decode, merge, and/or provide instructions to an execution cluster of a processor core back end to implement one or more applications. Method 2700 may be invoked based upon the results of any of methods 2100, 2300, 2400, or 2600, described above. For example, method 2700 may be invoked to decode the instruction information that is clustered by the execution of method 2100, method 2300, method 2400, or method 2600, and to provide the results to an execution cluster of a processor core back end for execution.

At 2705, in one embodiment, alternating subsets of a stream of data elements representing a sequence of program instructions, in program order, may be directed to two decode clusters in a processor. At 2710, each of the two decode clusters may decode one or more of the data elements at a time and may output multiple groups of in-order uops to a queue. Each group of uops may correspond to one of the subsets of data elements. In at least some embodiments, once at least some of the data elements have been decoded, a merging component may begin assembling a group of uops for execution in an order corresponding to program order from each of the queues. For example, at 2715, a merging component may receive (or retrieve) multiple uops from each of the queues. In one embodiment, the number of uops received (or retrieved) by the merging component from the output queues of each decode cluster may be equal to the width of the allocation/renaming stage of the execution pipeline in the processor core back end. The number of uops selected from those uops for presentation to an execution cluster of the processor core back end in a decoded instruction grouping may also be equal to the width of the allocation/renaming stage of the execution pipeline in the processor core back end.

At 2720, the merging component may identify the next uop (in program order) to be executed in one of the queues, and may include it in a group of uops to be directed to an execution cluster of a processor core back end for execution. In one embodiment, at 2725 it may be determined whether the group of uops is complete. If so, method 2700 may proceed to 2730. Otherwise, method 2700 may proceed to 2735. At 2730, the merging component may provide the assembled group of uops to the execution cluster for execution.

In one embodiment, at 2735, it may be determined whether the most recently added uop has its toggle indicator set. If so, method 2700 may proceed to 2745. Otherwise, method 2700 may proceed to 2740. At 2745, the merging component may identify the next uop (in program order) from a queue other than the queue from which the most recently added uop was retrieved, and may add it to the group of uops to be directed to the execution cluster of the processor core back end for execution. At 2740, the merging component may identify the next uop (in program order) from the same queue as the queue from which the most recently added uop was retrieved, and may add it to the group of uops to be directed to the execution cluster for execution.

The operations shown as 2725-2745 may be repeated one or more times, as appropriate, until the group of uops is complete and has been provided to the execution cluster of the processor core back end for execution. As illustrated by the dashed line from operation 2730 to operation 2715, operations 2715 to 2745 may be repeated any number of times, as appropriate, as data elements continue to be decoded by the two decode clusters and the resulting uops are directed to the corresponding queues for retrieval by the merging component. In at least some embodiments, one or more of operations 2705 through 2745 of method 2700 may be executed in hardware in the front end of a processor core.

FIGS. 28A-28D illustrate an example of the application of out-of-order clustered decoding, according to embodiments of the present disclosure. More specifically, FIG. 28A illustrates a queue 2810, within a processor, of data elements representing a sequence of undecoded instructions in program order. In this example, queue 2810 includes a first sequence of related data elements A0-A5. In one embodiment, these data elements may collectively represent a single instruction. In another embodiment, these data elements may collectively represent a sequence of two or more instructions in program order. The data elements A0 and A5, in this example, may represent instruction boundaries in a sequence of instructions. For example, data element A0 may be the first data element associated with an instruction and data element A5 may be the last data element associated with an instruction (either the same instruction or a different instruction than the instruction with which data element A0 is associated). In this example, data element A5 represents a predicted taken branch instruction or an instruction pointer value identifying a predicted taken branch.

In this example, queue 2810 includes a second sequence of related data elements B0-B4. In one embodiment, these data elements may collectively represent a single instruction. In another embodiment, these data elements may collectively represent a sequence of two or more instructions in program order. The data elements B0 and B3, in this example, may represent instruction boundaries in a sequence of instructions. For example, data element B0 may be the first data element associated with an instruction and data element B3 may be the last data element associated with an instruction (either the same instruction or a different instruction than the instruction with which data element B0 is associated). In this example, data element B4 represents a fake predicted taken branch instruction or an instruction pointer value representing a fake predicted taken branch that was inserted following the instruction boundary at data element B3 based on the application of a cluster load balancing mechanism such as any of those described herein.

In this example, queue 2810 includes a third sequence of related data elements C0-C3. In one embodiment, these data elements may collectively represent a single instruction. In another embodiment, these data elements may collectively represent a sequence of two or more instructions in program order. The data elements C0 and C3, in this example, may represent instruction boundaries in a sequence of instructions. For example, data element C0 may be the first data element associated with an instruction and data element C3 may be the last data element associated with an instruction (either the same instruction or a different instruction than the instruction with which data element C0 is associated). In this example, none of the data elements C0-C3 represents a real or fake predicted taken branch instruction nor an instruction pointer value representing a real or fake predicted taken branch, nor are any of data elements C0-C3 associated with any other trigger condition or indication that a cluster switch should be performed or suppressed following its execution.

In this example, queue 2810 includes a fourth sequence of related data elements D0-D3. In one embodiment, these data elements may collectively represent a single instruction. In another embodiment, these data elements may collectively represent a sequence of two or more instructions in program order. The data elements D0 and D3, in this example, may represent instruction boundaries in a sequence of instructions. For example, data element D0 may be the first data element associated with an instruction and data element D3 may be the last data element associated with an instruction (either the same instruction or a different instruction than the instruction with which data element D0 is associated). In this example, data element D3 has been annotated with a value indicating a high weighting for the sequence of related data elements D0-D3 with respect to load balancing. For example, this data element, or the block of instructions represented by data elements D0-D3 may be associated with a large uop count or a long decode latency, and the annotation may reflect this condition.

In this example, queue 2810 also includes a fifth sequence of related data elements, a portion of which is illustrated as E0-E2. In one embodiment, these data elements and other data elements not shown may collectively represent a single instruction. In another embodiment, these data elements and other elements not shown may collectively represent a sequence of two or more instructions in program order. The data element E0, in this example, may represent an instruction boundary in a sequence of instructions. For example, data element E0 may be the first data element associated with an instruction. Data elements E2 and E3 may be associated with the same instruction or may be associated with a different instruction than the instruction with which data element E0 is associated). In this example, none of the data elements E0-E2 represents a real or fake predicted taken branch instruction nor an instruction pointer value representing a real or fake predicted taken branch.

In this example, the data elements shown in queue 2810 in program order are directed to two decode clusters in the front end of the processor for out-of-order clustered decoding. In one embodiment, the splitting of the data elements in queue 2810 may be performed in a manner similar to that illustrated in FIG. 26 and described herein. In another embodiment, a different mechanism and/or a different cluster switching trigger condition may be applied by a splitting component, IP generator, or cluster balancer to direct the data elements in queue 2810 to the two decode clusters for out-of-order clustered decoding.

FIG. 28B illustrates a prefetch buffer 2820 for the first decode cluster and a prefetch buffer 2825 for the second decode cluster, after subsets of the data elements in queue 2810 have been directed to these buffers by a splitting component, IP generator, or cluster balancer of the front end of the processor. In this example, the splitting component, IP generator, or cluster balancer has directed the first subset of the data elements (shown as A0-A5) to the prefetch buffer 2820 for the first decode cluster. Since data element A5 represents a predicted taken branch instruction or an instruction pointer value identifying a predicted taken branch, the splitting component, IP generator, or cluster balancer switched to the second decode cluster. Therefore, the second subset of data elements (shown as B0-B4) was directed to the prefetch buffer 2825 for the second decode cluster. Since data element B4 represents a fake predicted taken branch instruction or an instruction pointer value representing a fake predicted taken branch, the splitting component, IP generator, or cluster balancer switched back to the first decode cluster. Therefore, the third subset of data elements (shown as C0-C3) was directed to the prefetch buffer 2820 for the first decode cluster. Since data element C3 does not represent a real or fake predicted taken branch instruction nor an instruction pointer value representing a real or fake predicted taken branch, nor is it associated with any other trigger condition or indication that a cluster switch should be performed or suppressed following its execution, the splitting component, IP generator, or cluster balancer did not switch decode clusters, but instead directed the fourth subset of data elements (shown as D0-D3) to the prefetch buffer 2820 for the first decode cluster. Finally, since data element D3 has been annotated with a value indicating a high weighting for the sequence of related data elements D0-D3 with respect to load balancing, the splitting component, IP generator, or cluster balancer again switched to the second decode cluster, and at least the portion of the fifth subset of data elements shown as E0-E2 was directed to the prefetch buffer 2825 for the second decode cluster.

In this example, the two decode clusters in the processor decode the data elements that have been directed to their respective prefetch buffers (2820 and 2825) substantially in parallel. In at least some embodiments, the decoded instructions (uops) corresponding to data elements that represent a real or fake predicted taken branch instruction or an instruction pointer value representing a real or fake predicted taken branch, or that were annotated with a high weighting values with respect to load balancing may be tagged with an indication of the cluster switch that occurred following their direction to one of the decode clusters. In this example, each of the decoded instructions (uops) associated with data elements A5, B4, and/or D3 may be tagged with such an indication. In this example, a toggle bit included in the data element encoding may be set (e.g., to a value of "1" or a value representing "true") to indicate that a condition to trigger a switch to another decode cluster was met and that a cluster switch was performed by the splitting component, IP generator, or cluster balancer. In other embodiments, other mechanisms may be used to tag various data elements to indicate that a trigger condition for cluster switching was met. In some embodiments, each of the decode clusters may include hardware circuitry or logic to decode multiple ones of the data elements in its prefetch buffer in parallel. For example, each of the decode clusters may perform two-wide decoding or n-wide decoding (where n is 3 or more), in different embodiments.

FIG. 28C illustrates a queue 2830 of decoded instructions (uops) output by the first decode cluster for some of the data elements in prefetch buffer 2820 and a queue 2835 of decoded instructions (uops) output by the second decode cluster for some of the data elements in prefetch buffer 2825. In some embodiments, queues 2830 and 2835 may store decoded instructions (uops) that are received (or retrieved) by a merging component for potential inclusion in an instruction buffer 2840, as described below. In this example, because the processor core back end to which decoded instructions are to be provided includes a three-wide allocator/renamer, the merging component may, on each cycle, receive (or retrieve) the next three decoded instructions (uops) from each of the prefetch buffers (2820 and 2825) for possible inclusion in instruction buffer 2840.

FIG. 28D illustrates instruction buffer 2840, which stores decoded instructions to be presented to the allocator or renaming stage in a processor core back end following the selection and re-ordering of these decoded instructions (uop) by the merging component. In at least some embodiments, the merging of the decoded instructions (uops) may be performed by the merging component in a manner similar to that illustrated in FIG. 27 and described herein. In another embodiment, a different mechanism and/or a different cluster switching indication may be employed by the merging component to select the decoded instructions (uops) to be included in instruction buffer 2840.

In this example, the merging component has identified the first element of queue 2830 as containing the next decoded instruction to be executed (shown as the uop corresponding to data element A4) and has added it to instruction buffer 2840. Since this element does not include a toggle bit that is set, the merging component adds the second element of queue 2830 (shown as the uop corresponding to data element A5) to instruction buffer 2840. However, since the second element of queue 2830 (shown as the uop corresponding to data element A5) includes a toggle bit that is set, the merging component does not add this element to instruction buffer 2840. Instead, the merging element identifies the first unexecuted (decoded) instruction in queue 2835 (shown as the uop for data element B0) and adds this element to instruction buffer 2840.

In this example, after providing the contents of instruction buffer 2840 to the processor core back end, storage for various queues entries may be de-allocated, and their pointers may advance. Subsequently, the merging component may begin assembling the next group of four decoded instructions (uops) in a similar fashion, starting with the decoded instruction (uop) corresponding to data element B1.

In some embodiments, there may not be a one-to-one mapping between the data elements that are decoded by the decode clusters and the uops that are generated as a result of the decoding. In one example, a data element may be decoded into three uops. In at least some embodiments of the present disclosure, these three uops may be placed in the output queue of the decode cluster that performed the decoding in the order in which they should be executed. If a cluster switch trigger condition was associated with the undecoded data element, the last of three uops in the output queue may be tagged with a toggle indicator.

In at least some embodiments, the systems and methods described herein for out-of-order clustered decoding may provide improvements over the front end stages of existing systems. For example, while instruction caches must be built aligned to a memory format, code blocks can begin and end at arbitrary boundaries (in some ISAs). In existing systems, the more contiguous bytes that are required to feed a wide decode pipeline, the more bytes must be read per cycle from the instruction cache. Given arbitrary starting and ending points, the wider the contiguous read, the less efficient the array read becomes as the amount of wasted data increases and the costs of the array increase. For example, a 6-wide decoder utilizing fixed 4-byte instructions requires 24 B of contiguous data. If the instruction cache is configured to read aligned 32 B, besides potentially wasting 25% of the data, potentially only 4 B of the 32 B is useful. To guarantee 24 contiguous bytes, the array must support unaligned reads on a 4 B boundary. While banking can be done to support this, problems may still present themselves as the read crosses cache line boundaries.

However, by building clustered fetch and decode mechanisms, such as those described herein, inefficiencies caused by wide fetch may be reduced by more than half, in some embodiments. With clustered decode, contiguous instruction cache read requirements may be as 50% lower than in existing systems, while simultaneously providing more useful bytes per access. Using the mechanisms described herein, assuming an unaligned 24 B based instruction cache read physically built with banks of aligned 16 B sub-arrays, the same topology may be utilized to read two independent instruction streams.

In at least some embodiments, the front end stage of the systems described herein may be improved over those of existing systems, by decode clustering, in the context of the rotation of raw data to align subsequent decode logic correct instruction boundaries. For example, wide decode (even in a fixed-length instruction set) requires a rotation process to align the memory formatted instruction cache data with the beginning of the decode boundary in order to achieve full bandwidth per cycle from the decoders. As the rotation gets longer, the timing requirements of the logic increase. For example, aligning the first byte from a memory aligned 32 B cache read in a 32 bit fixed-length ISA requires an 8-to-1 mux while doing so on a 16 B read requires only a 4-to-1 mux. The 8-to-1 mux requirements include a serially longer datapath, and the controls for the muxes also have higher loading throughout the stage. By breaking this into parallel 16 B independent streams using out-of-order decode clustering, as described herein, while the total number of logical gates may not be lower, the timing requirements may be reduced. In some existing system with non-fixed-length ISAs, there can also be problems with aligning the data for each instruction decode and understanding where the first byte is for the following cycle. This problem is essentially a "find $N^{th}$" problem in which each subsequent value of N requires more and more logic depth to compute. In these existing systems, even if the bytes have been pre-marked with instruction boundaries, simply processing these markers results in a serial dependency chain. With clustered decoding, as described herein, the load on each cluster may represent only a portion of the total. For example, instead of requiring circuitry for up to a "find 6", two decode clusters may each include circuitry for a "find 3" operation. In some embodiments, since this operation must be performed in a single cycle, this approach may result in the elimination of a common critical path in some processors.

In at least some embodiments, rather than stopping a decode flow at a predicted taken branch, the systems and methods described herein may allow the processor to decode past a predicated taken branch in the same cycle. For example, with clustered decoding, the decode logic may be replicated at a higher level than in existing system. This may allow each decode cluster to handle each block of data elements it receives as contiguous data elements while providing for the ability to decode as many noncontiguous regions as there are decode clusters. In one example, a stream of three instruction basic blocks may only run above 3.0 instructions-per-cycle (IPC) in machines with decoded uop caches or trace caches. In some cases, the stream may loop, allowing for loop streaming detectors to be applied. However, a processor that includes two two-wide decode clusters may work at peak efficiency and fully deliver 4 instructions per cycle, in some embodiments.

In some systems, some instructions are more complex than others and they cannot be provided by every decoder in the system. For example, some instructions require alignment to a specific decoder (decoder 0, for example, in certain microarchitectures) while others require transitions into microcode. In some embodiments of the systems described herein that include clustered decoding, the penalties associated with these inefficiencies may be parallelized. Basic blocks that require multiple decoder 0 alignments, for example, may be parallelized such that multiple specific instructions that require decoder 0 can be addressed in the same cycle while lowering the wasted decode slots that cannot be consumed due to these requirements. In some embodiments of the present disclosure, for instruction streams with jumps to microcode, the detection of these microcode flows may also parallelized. In some embodiments, certain short microcode flows may be serviced out of order. In general, clustered decoding, as described herein, may reduce, or even eliminate, the entry and/or exit penalties associated with microcode flows. For example, in one microarchitecture, several positive performance gains of greater than +15% have been observed that were specifically due to the ability of the clustered decoders to increase the utilization of the microcode sequencer in high IPC code that contained repeated jumps into microcode.

The techniques described herein for performing out-of-order clustered decoding may be applied to any of a variety of processor architectures, in different embodiments. However, systems with non-fixed-length ISAs may achieve more performance gains than systems with fixed-length ISAs. Utilizing this approach, the design of a processor front end may be scaled to any desired width via large block replication without the extensive design modification and timing convergence requirements typically required to implement a monolithic width increase or the addition of a decoded uop cache. For example, in one embodiment, by parameterizing the design of the decode pipeline, it may be compiled to include multiple two-wide decode clusters or multiple n-wide decode clusters (where n is 3 or more). Utilizing this same base design, processor front ends may be quickly implemented that support total decoding bandwidths of 2-wide (one decode cluster), 3-wide (one decode cluster), 4-wide (two decode clusters, each of which is 2-wide), and 6-wide (two decode clusters, each of which is 3-wide) with little to no impact to previous timing critical single cycle loops. In addition, with only minor modifications, up to a 12-wide decode bandwidth may be implemented using this approach. In at least some embodiments, any timing impacts resulting from this scaling may be pipelined as necessary to meet frequency requirements.

As described in detail here, systems and methods for performing out-of-order clustered decoding may address issues related to wide instruction fetch and decode, particularly in non-fixed-length architectures. For example, these systems may apply out-of-order techniques to instruction fetch and decode to remove many of the most problematic serial dependencies in existing systems. In at least some embodiments of the present disclosure this approach may enable increased decode bandwidth via parallelism within a single threaded context that is comparable to a traditional width increase, while providing efficiency benefits that traditional scaling cannot provide. The implementation of a cluster load balancing mechanism, such as those described herein, may improve the decode parallelism, and thus the performance, of workloads in which instruction pointer values for blocks of instructions would otherwise be directed to decode clusters in an imbalanced manner.

Embodiments of the mechanisms disclosed herein may be implemented in hardware, software, firmware, or a combination of such implementation approaches. Some embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Some embodiments of the present disclosure include a processor. In at least some of these embodiments, the processor may include an execution cluster including one or more execution units to execute decoded instructions, and first and second decode clusters, each including one or more decoders. The processor may also include circuitry to receive a plurality of data elements, each representing an undecoded instruction in an ordered sequence of undecoded instructions of a program in program order, and circuitry to direct a first subset of the plurality of data elements to the first decode cluster, the data elements in the first subset of data elements to be in program order. The first decode cluster may include circuitry to decode the first subset of data elements to generate a first subset of decoded instructions. The processor may also include circuitry to detect a condition indicating that a particular cluster load balancing action is to be taken, take the particular cluster load balancing action, determine, dependent on the particular cluster load balancing action taken, whether a second subset of the plurality of data elements that immediately follows the first subset of data elements in program order is to be directed to the first decode cluster or to the second decode cluster, and direct the second subset of data elements to the determined one of the first and second decode clusters, the data elements in the second subset of data elements to be in program order. The determined one of the decode clusters may include circuitry to decode the second subset of data elements to generate a second subset of decoded instructions. The processor may also include circuitry to provide the first and second subsets of decoded instructions to the execution cluster in program order for execution. In combination with any of the above embodiments, the processor may further include a branch target buffer, and to detect a condition indicating that a particular cluster load balancing action is to be taken, the processor may further include circuitry to detect that an entry in the branch target buffer associated with the first subset of data elements may include an annotation whose value is indicative of a load balancing trigger condition. In any of the above embodiments, the annotation may represent a load balancing weight value, the load balancing weight value being dependent on a count of decoded instructions generated by the first decode cluster or the second decode cluster, or a decode latency observed for the first decode cluster or the second decode cluster. To detect a condition indicating that a particular cluster load balancing action is to be taken, the processor may further include circuitry to determine that the load balancing weight value exceeds a threshold value for triggering performance of the particular cluster load balancing action. In any of the above embodiments, the entry in the branch target buffer associated with the first subset of data elements is an entry representing a fake predicted taken branch that was inserted into the branch target buffer, and the annotation may include an indication that the entry represents a fake predicted taken branch rather than an actual predicted taken branch. In combination with any of the above embodiments, the processor may further include a branch target buffer, and the particular cluster load balancing action may include an operation to insert an entry representing a fake predicted taken branch into the branch target buffer. In any of the above embodiments, the particular cluster load balancing action may include an operation to force a cluster switch, and the processor may further include circuitry to direct the second subset of data elements to the second decode cluster in response to performance of the operation to force a cluster switch. In any of the above embodiments, the particular cluster load balancing action may include an operation to suppress a cluster switch, and the processor may further include circuitry to direct the second subset of data elements to the first decode cluster in response to performance of the operation to suppress a cluster switch. In combination with any of the above embodiments, the processor may further include a first queue associated with the first decode cluster, the first queue to hold data representing undecoded instructions to be decoded by the first decode cluster or decoded instructions generated by the first decoder, and a second queue associated with the second decode cluster, the second queue to hold data representing undecoded instructions to be decoded by the second decode cluster or decoded instructions generated by the second decoder. To detect a condition indicating that a particular cluster load balancing action is to be taken, the processor may further include circuitry to receive, from the first queue, data indicating a state of the first queue, receive, from the second queue, data indicating a state of the second queue, and compare the state of the first queue and the state of the second queue. In combination with any of the above embodiments, the processor may further include a first output queue associated with the first decode cluster, and a second output queue associated with the second decode cluster. The first decode cluster may further include circuitry to store the first subset of decoded instructions in the first output queue. The second decode cluster may include circuitry to decode the second subset of data elements to generate a second subset of decoded instructions, and to store the second subset of decoded instructions in the second output queue. To provide the first and second subsets of decoded instructions to the execution cluster in program order for execution, the processor may further include circuitry to merge at least a subset of the decoded instructions stored in the first output queue and at least a subset of the decoded instructions stored in the second output queue to generate the sequence of decoded instructions in program order.

Some embodiments of the present disclosure include a method. In at least some of these embodiments, the method may include, in a processor, receiving a plurality of data elements, each representing an undecoded instruction in an ordered sequence of undecoded instructions of a program in program order, directing a first subset of the plurality of data elements to a first decode cluster in the processor, the data elements in the first subset of data elements being in program order, decoding, by the first decode cluster, the first subset of data elements to generate a first subset of decoded instructions, detecting a trigger condition indicating that a particular cluster load balancing action is to be taken, taking the particular cluster load balancing action, determining, dependent on the particular cluster load balancing action taken, whether a second subset of the plurality of data elements that immediately follows the first subset of data elements in program order is to be directed to the first decode cluster or to a second decode cluster in the processor, directing the second subset of data elements to the determined one of the first and second decode clusters, the data elements in the second subset of data elements being in program order, decoding, by the determined one of the decode clusters, the second subset of data elements to generate a second subset of decoded instructions, and providing the first and second subsets of decoded instructions to an execution cluster of the processor in program order for execution. In any of the above embodiments, detecting a trigger condition indicating that a particular cluster load balancing action is to be taken may include detecting that an entry in a branch target buffer associated with the first subset of data elements may include an annotation whose value is indicative of a load balancing trigger condition. In any of the above embodiments, the annotation may represent a load balancing weight value, the load balancing weight value being dependent on a count of decoded instructions generated by the first decode cluster or the second decode cluster, or a decode latency observed for the first decode cluster or the second decode cluster, and detecting a trigger condition indicating that a particular cluster load balancing action is to be taken may include determine that the load balancing weight value exceeds a threshold value for triggering performance of the particular cluster load balancing action. In any of the above embodiments, the entry in the branch target buffer associated with the first subset of data elements is an entry representing a fake predicted taken branch that was inserted into the branch target buffer, and the annotation may include an indication that the entry represents a fake predicted taken branch rather than an actual predicted taken branch. In any of the above embodiments, the particular cluster load balancing action may include an operation to insert an entry representing a fake predicted taken branch into the branch target buffer. In any of the above embodiments, the particular cluster load balancing action may include an operation to force a cluster switch or to suppress a cluster switch. In any of the above embodiments, the particular cluster load balancing action may include an operation to force a cluster switch, and the method may include directing the second subset of data elements to the second decode cluster in response to performance of the operation to force a cluster switch. In any of the above embodiments, the particular cluster load balancing action may include an operation to suppress a cluster switch, and the method may further include directing the second subset of data elements to the first decode cluster in response to performance of the operation to suppress a cluster switch. In any of the above embodiments, detecting a trigger condition indicating that a particular cluster load balancing action is to be taken may include receiving, from a first queue that is associated with the first decode cluster and that holds data representing undecoded instructions to be decoded by the first decode cluster or decoded instructions generated by the first decoder, data indicating a state of the first queue, receiving, from a second queue that is associated with the second decode cluster and that holds data representing undecoded instructions to be decoded by the second decode cluster or decoded instructions generated by the second decoder, data indicating a state of the second queue, and comparing the state of the first queue and the state of the second queue. In combination with any of the above embodiments, the method may further include storing the first subset of decoded instructions in a first output queue associated with the first decode cluster, decoding, by the second decode cluster, the second subset of data elements to generate the second subset of decoded instructions, and storing the second subset of decoded instructions in a second output queue associated with the second decode cluster. Providing the first and second subsets of decoded instructions to the execution cluster of the processor in program order for execution may include merging at least a subset of the decoded instructions stored in the first output queue and at least a subset of the decoded instructions stored in the second output queue to generate the sequence of decoded instructions in program order.

Some embodiments of the present disclosure include a system. In at least some of these embodiments, the system may include an execution cluster including one or more execution units to execute decoded instructions, and first and second decode clusters, each including one or more decoders. The system may also include circuitry to receive a plurality of data elements, each representing an undecoded instruction in an ordered sequence of undecoded instructions of a program in program order, and to direct a first subset of the plurality of data elements to the first decode cluster, the data elements in the first subset of data elements to be in program order. The first decode cluster may include circuitry to decode the first subset of data elements to generate a first subset of decoded instructions. The system may also include circuitry to detect a condition indicating that a particular cluster load balancing action is to be taken, take the particular cluster load balancing action, determine, dependent on the particular cluster load balancing action taken, whether a second subset of the plurality of data elements that immediately follows the first subset of data elements in program order is to be directed to the first decode cluster or to the second decode cluster, and direct the second subset of data elements to the determined one of the first and second decode clusters, the data elements in the second subset of data elements to be in program order. The determined one of the decode clusters may include circuitry to decode the second subset of data elements to generate a second subset of decoded instructions. The system may also include a circuitry to provide the first and second subsets of decoded instructions to the execution cluster in program order for execution. In combination with any of the above embodiments, the system may further include a branch target buffer, and to detect a condition indicating that a particular cluster load balancing action is to be taken, the system may further include circuitry to detect that an entry in the branch target buffer associated with the first subset of data elements may include an annotation whose value is indicative of a load balancing trigger condition. In any of the above embodiments, the annotation may represent a load balancing weight value, the load balancing weight value to be dependent on a count of decoded instructions generated by the first decode cluster or the second decode cluster, or a decode latency observed for the first decode cluster or the second decode cluster, and to detect a condition indicating that a particular cluster load balancing action is to be taken, the system may further include circuitry to determine that the load balancing weight value exceeds a threshold value for triggering performance of the particular cluster load balancing action. In any of the above embodiments, the entry in the branch target buffer associated with the first subset of data elements is an entry representing a fake predicted taken branch that was inserted into the branch target buffer, and the annotation may include an indication that the entry represents a fake predicted taken branch rather than an actual predicted taken branch. In any of the above embodiments, the system may further include a branch target buffer, and the particular cluster load balancing action may include an operation to insert an entry representing a fake predicted taken branch into the branch target buffer. In any of the above embodiments, the particular cluster load balancing action may include an operation to force a cluster switch or to suppress a cluster switch, and system may further include circuitry to direct the second subset of data elements to the second decode cluster in response to performance of an operation to force a cluster switch, and to direct the second subset of data elements to the first decode cluster in response to performance of an operation to suppress a cluster switch. In combination with any of the above embodiments, the system may further include a first queue associated with the first decode cluster, the first queue to hold data representing undecoded instructions to be decoded by the first decode cluster or decoded instructions generated by the first decoder, and a second queue associated with the second decode cluster, the second queue to hold data representing undecoded instructions to be decoded by the second decode cluster or decoded instructions generated by the second decoder. To detect a condition indicating that a particular cluster load balancing action is to be taken, the system may further include circuitry to receive, from the first queue, data indicating a state of the first queue, receive, from the second queue, data indicating a state of the second queue, and compare the state of the first queue and the state of the second queue. In combination with any of the above embodiments, the system may further include a first output queue associated with the first decode cluster, and a second output queue associated with the second decode cluster. The first decode cluster may further include circuitry to store the first subset of decoded instructions in the first output queue. The second decode cluster may include circuitry to decode the second subset of data elements to generate a second subset of decoded instructions, and to store the second subset of decoded instructions in the second output queue. To provide the first and second subsets of decoded instructions to the execution cluster in program order for execution, the system may further include circuitry to merge at least a subset of the decoded instructions stored in the first output queue and at least a subset of the decoded instructions stored in the second output queue to generate the sequence of decoded instructions in program order.

Some embodiments of the present disclosure include an apparatus. In at least some of these embodiments, the apparatus may include means for receiving a plurality of data elements, each representing an undecoded instruction in an ordered sequence of undecoded instructions of a program in program order, means for directing a first subset of the plurality of data elements to a first decode cluster in a processor, the data elements in the first subset of data elements being in program order, means for decoding, by the first decode cluster, the first subset of data elements to generate a first subset of decoded instructions, means for detecting a trigger condition indicating that a particular cluster load balancing action is to be taken, means for taking the particular cluster load balancing action, means for determining, dependent on the particular cluster load balancing action taken, whether a second subset of the plurality of data elements that immediately follows the first subset of data elements in program order is to be directed to the first decode cluster or to a second decode cluster in the processor, means for directing the second subset of data elements to the determined one of the first and second decode clusters, the data elements in the second subset of data elements being in program order, means for decoding, by the determined one of the decode clusters, the second subset of data elements to generate a second subset of decoded instructions, and means for providing the first and second subsets of decoded instructions to an execution cluster of the processor in program order for execution. In combination with any of the above embodiments, the means for detecting a trigger condition indicating that a particular cluster load balancing action is to be taken may include means for detecting that an entry in a branch target buffer associated with the first subset of data elements may include an annotation whose value is indicative of a load balancing trigger condition. In any of the above embodiments, the annotation may represent a load balancing weight value, the load balancing weight value being dependent on a count of decoded instructions generated by the first decode cluster or the second decode cluster, or a decode latency observed for the first decode cluster or the second decode cluster, and the means for detecting a trigger condition indicating that a particular cluster load balancing action is to be taken may include means for determining that the load balancing weight value exceeds a threshold value for triggering performance of the particular cluster load balancing action. In any of the above embodiments, the entry in the branch target buffer associated with the first subset of data elements is an entry representing a fake predicted taken branch that was inserted into the branch target buffer, and the annotation may include an indication that the entry represents a fake predicted taken branch rather than an actual predicted taken branch. In any of the above embodiments, the particular cluster load balancing action may include an operation to insert an entry representing a fake predicted taken branch into the branch target buffer. In any of the above embodiments, the particular cluster load balancing action may include an operation to force a cluster switch or to suppress a cluster switch. In combination with any of the above embodiments, the particular cluster load balancing action may include an operation to force a cluster switch, and the apparatus may include means for directing the second subset of data elements to the second decode cluster in response to performance of the operation to force a cluster switch. In any of the above embodiments, the particular cluster load balancing action may include an operation to suppress a cluster switch, and the apparatus may further include means for directing the second subset of data elements to the first decode cluster in response to performance of the operation to suppress a cluster switch. In combination with any of the above embodiments, the means for detecting a trigger condition indicating that a particular cluster load balancing action is to be taken may include means for receiving, from a first queue that is associated with the first decode cluster and that holds data representing undecoded instructions to be decoded by the first decode cluster or decoded instructions generated by the first decoder, data indicating a state of the first queue, means for receiving, from a second queue that is associated with the second decode cluster and that holds data representing undecoded instructions to be decoded by the second decode cluster or decoded instructions generated by the second decoder, data indicating a state of the second queue, and means for comparing the state of the first queue and the state of the second queue. In combination with any of the above embodiments, the apparatus may further include means for storing the first subset of decoded instructions in a first output queue associated with the first decode cluster, means for decoding, by the second decode cluster, the second subset of data elements to generate the second subset of decoded instructions, and means for storing the second subset of decoded instructions in a second output queue associated with the second decode cluster. The means for providing the first and second subsets of decoded instructions to the execution cluster of the processor in program order for execution may include means for merging at least a subset of the decoded instructions stored in the first output queue and at least a subset of the decoded instructions stored in the second output queue to generate the sequence of decoded instructions in program order.

What is claimed is:

1. A processor, comprising:
an execution cluster including one or more execution units to execute decoded instructions;
first and second decode clusters, each including one or more decoders, each decoder including circuitry to decode data elements to generate decoded instructions;
a branch target buffer; and
circuitry coupled to the execution cluster, the first and second decode clusters, and the branch target buffer, the circuitry to:
receive a plurality of data elements, each to represent an undecoded instruction in an ordered sequence of undecoded instructions of a program in program order;
direct a first subset of the plurality of data elements to the first decode cluster for generation of a first subset of decoded instructions, the data elements in the first subset of data elements to be in program order;
detect a condition that indicates that a particular cluster load balancing action is to be taken based on an entry in the branch target buffer associated with the first subset of data elements that includes an annotation whose value is indicative of a load balancing trigger condition;
take the particular cluster load balancing action;
determine, dependent on the particular cluster load balancing action taken, whether a second subset of the plurality of data elements that immediately follows the first subset of data elements in program order is to be directed to the first decode cluster or to the second decode cluster;
direct the second subset of data elements to the determined one of the first and second decode clusters for generation of a second subset of decoded instructions, the data elements in the second subset of data elements to be in program order; and
provide the first and second subsets of decoded instructions to the execution cluster in program order for execution.

2. The processor of claim 1, wherein:
the annotation represents a load balancing weight value, the load balancing weight value to be dependent on a count of decoded instructions generated by the first decode cluster or the second decode cluster, or a decode latency observed for the first decode cluster or the second decode cluster; and
to detect a condition that indicates that a particular cluster load balancing action is to be taken, the processor circuitry is further to:
determine that the load balancing weight value exceeds a threshold value for triggering performance of the particular cluster load balancing action.

3. The processor of claim 1, wherein:
the entry in the branch target buffer associated with the first subset of data elements is an entry representing a fake predicted taken branch that was inserted into the branch target buffer;
the annotation comprises an indication that the entry represents a fake predicted taken branch rather than an actual predicted taken branch.

4. The processor of claim 1, wherein:
the particular cluster load balancing action comprises an operation to insert an entry representing a fake predicted taken branch into the branch target buffer.

5. The processor of claim 1, wherein:
the particular cluster load balancing action comprises an operation to force a cluster switch; and
the processor circuitry is further to direct the second subset of data elements to the second decode cluster responsive to performance of the operation to force a cluster switch.

6. The processor of claim 1, wherein:
the particular cluster load balancing action comprises an operation to suppress a cluster switch; and
the processor circuitry is further to direct the second subset of data elements to the first decode cluster responsive to performance of the operation to suppress a cluster switch.

7. The processor of claim 1, wherein:
the processor further includes:
a first queue associated with the first decode cluster, the first queue to hold data representing undecoded instructions to be decoded by the first decode cluster or decoded instructions generated by the first decoder; and
a second queue associated with the second decode cluster, the second queue to hold data representing undecoded instructions to be decoded by the second decode cluster or decoded instructions generated by the second decoder; and
to detect a condition that indicates that a particular cluster load balancing action is to be taken, the processor circuitry is further to:
receive, from the first queue, data indicating a state of the first queue;
receive, from the second queue, data indicating a state of the second queue; and
compare the state of the first queue and the state of the second queue.

8. The processor of claim 1, wherein:
the processor further includes:
a first output queue associated with the first decode cluster; and a second output queue associated with the second decode cluster;
the first decode cluster circuitry is further to:
store the first subset of decoded instructions in the first output queue;
the second decode cluster circuitry is further to:
store the second subset of decoded instructions in the second output queue;
to provide the first and second subsets of decoded instructions to the execution cluster in program order for execution, the processor circuitry is further to:
merge at least a subset of the decoded instructions stored in the first output queue and at least a subset of the decoded instructions stored in the second output queue to generate the sequence of decoded instructions in program order.

9. A method, comprising, in a processor:
receiving a plurality of data elements, each representing an undecoded instruction in an ordered sequence of undecoded instructions of a program in program order;
directing a first subset of the data elements to a first decode cluster in the processor;
generating, from the first subset of data elements, a first subset of decoded instructions;
detecting a trigger condition for a particular cluster load balancing action, wherein detecting the trigger condition comprises detecting that an entry in a branch target buffer associated with the first subset of data elements includes an annotation whose value is indicative of a load balancing trigger condition;
taking the particular cluster load balancing action;
determining, dependent on the action taken, whether a second subset of the data elements that immediately follows the first subset of data elements in program order is to be directed to the first decode cluster or to the second decode cluster in the processor;
directing the second subset of data elements to the determined decode cluster;
generating, from the second subset of data elements, a second subset of decoded instructions;
providing the first and second subsets of decoded instructions to an execution cluster of the processor in program order for execution.

10. The method of claim 9, wherein:
the annotation represents a load balancing weight value, the load balancing weight value being dependent on a count of decoded instructions generated by the first decode cluster or the second decode cluster, or a decode latency observed for the first decode cluster or the second decode cluster;
detecting a trigger condition for a particular cluster load balancing action includes determining that the load balancing weight value exceeds a threshold value for triggering performance of the particular cluster load balancing action.

11. The method of claim 9, wherein:
the entry in the branch target buffer associated with the first subset of data elements is an entry representing a fake predicted taken branch that was inserted into the branch target buffer;
the annotation comprises an indication that the entry represents a fake predicted taken branch rather than an actual predicted taken branch.

12. The method of claim 9, wherein:
the particular cluster load balancing action comprises an operation to force a cluster switch or to suppress a cluster switch.

13. The method of claim 9, wherein:
the first queue holds data representing undecoded instructions to be decoded by the first decode cluster or decoded instructions generated by the first decoder;
the second queue holds data representing undecoded instructions to be decoded by the second decode cluster or decoded instructions generated by the second decoder; and
detecting a trigger condition for a particular cluster load balancing action includes:
receiving, from the first queue, data indicating a state of the first queue;
receiving, from the second queue, data indicating a state of the second queue; and
comparing the state of the first queue and the state of the second queue.

14. A system, comprising:
first and second decode clusters, each including one or more decoders that comprise circuitry to decode data elements to generate decoded instructions;
a branch target buffer; and
circuitry coupled to the first and second decode clusters and the branch target buffer, the circuitry to:
receive a plurality of data elements, each to represent an undecoded instruction in an ordered sequence of undecoded instructions of a program in program order;
direct a first subset of the plurality of data elements to the first decode cluster for generation of a first subset of decoded instructions, the data elements in the first subset of data elements to be in program order;
detect a condition that indicates that a particular cluster load balancing action is to be taken based on an entry in the branch target buffer associated with the first subset of data elements that includes an annotation whose value is indicative of a load balancing trigger condition;
take the particular cluster load balancing action;
determine, dependent on the particular cluster load balancing action taken, whether a second subset of the plurality of data elements that immediately follows the first subset of data elements in program order is to be directed to the first decode cluster or to the second decode cluster;
direct the second subset of data elements to the determined one of the first and second decode clusters for generation of a second subset of decoded instructions, the data elements in the second subset of data elements to be in program order; and
provide the first and second subsets of decoded instructions to an execution cluster in program order for execution.

15. The system of claim 14, wherein:
the entry in the branch target buffer associated with the first subset of data elements is an entry representing a fake predicted taken branch that was inserted into the branch target buffer;
the annotation comprises an indication that the entry represents a fake predicted taken branch rather than an actual predicted taken branch.

16. The system of claim 14, wherein:
the particular cluster load balancing action comprises an operation to force a cluster switch or to suppress a cluster switch;
the system circuitry is further to:

direct the second subset of data elements to the second decode cluster responsive to performance of an operation to force a cluster switch;

direct the second subset of data elements to the first decode cluster responsive to performance of an operation to suppress a cluster switch.

17. The system of claim 14, wherein:

the system further includes:

a first queue associated with the first decode cluster, the first queue is to hold data representing undecoded instructions to be decoded by the first decode cluster or decoded instructions generated by the first decoder;

a second queue associated with the second decode cluster, the second queue is to hold data representing undecoded instructions to be decoded by the second decode cluster or decoded instructions generated by the second decoder; and to detect a condition that indicates that a particular cluster load balancing action is to be taken, the system circuitry is further to:

receive, from the first queue, data indicating a state of the first queue;

receive, from the second queue, data indicating a state of the second queue; and compare the state of the first queue and the state of the second queue.

\* \* \* \* \*